United States Patent [19]

Anastas et al.

[11] 4,319,321

[45] Mar. 9, 1982

[54] TRANSITION MACHINE—A GENERAL PURPOSE COMPUTER
[75] Inventors: Mark S. Anastas, Auburn; Russell F. Vaughan, Enumclaw, both of Wash.
[73] Assignee: The Boeing Company, Seattle, Wash.
[21] Appl. No.: 38,292
[22] Filed: May 11, 1979
[51] Int. Cl.³ .......................... G06F 7/00; G06F 9/46
[52] U.S. Cl. .................................................. 364/200
[58] Field of Search ... 364/200 MS File, 900 MS File
[56] References Cited

U.S. PATENT DOCUMENTS

| | | |
|---|---|---|
| Re. 26,171 | 3/1967 | Falkoff . |
| 3,274,554 | 9/1966 | Hopper et al. . |
| 3,274,561 | 9/1966 | Hallman et al. . |
| 3,343,135 | 9/1967 | Freiman et al. ...................... 364/200 |
| 3,348,210 | 10/1967 | Ochsner . |
| 3,349,375 | 10/1967 | Seeber et al. . |
| 3,411,139 | 11/1968 | Lynch et al. . |
| 3,421,150 | 1/1969 | Quosig et al. . |
| 3,444,525 | 5/1969 | Barlow et al. . |
| 3,445,822 | 5/1969 | Driscoll . |
| 3,449,722 | 6/1969 | Tucker . |
| 3,462,741 | 8/1969 | Bush et al. . |
| 3,496,551 | 2/1970 | Driscoll et al. . |
| 3,530,438 | 9/1970 | Mellen et al. ...................... 364/200 |
| 3,544,973 | 12/1970 | Borck, Jr. et al. . |
| 3,593,300 | 7/1971 | Driscoll, Jr. . |
| 3,614,745 | 10/1971 | Podvin . |
| 3,634,830 | 1/1972 | Baskin . |
| 3,643,227 | 2/1972 | Smith et al. . |
| 3,648,253 | 3/1972 | Mullery et al. . |
| 3,665,487 | 5/1972 | Campbell et al. . |
| 3,962,706 | 6/1976 | Dennis et al. . |
| 4,024,508 | 5/1977 | Bachman et al. ...................... 364/200 |
| 4,047,161 | 9/1977 | Davis ...................... 364/200 |
| 4,096,570 | 6/1978 | Ishibashi et al. ...................... 364/200 |
| 4,096,571 | 6/1978 | Vander Mey ...................... 364/200 |
| 4,109,311 | 8/1978 | Blum et al. ...................... 364/200 |
| 4,128,882 | 12/1978 | Dennis ...................... 364/200 |
| 4,130,885 | 12/1978 | Dennis ...................... 364/900 |
| 4,149,240 | 4/1979 | Misunas et al. ...................... 364/200 |
| 4,153,932 | 5/1979 | Dennis et al. ...................... 364/200 |
| 4,156,909 | 5/1979 | Barton et al. ...................... 364/200 |
| 4,197,589 | 4/1980 | Cornish et al. ...................... 364/900 |

OTHER PUBLICATIONS

James Rumbaugh, "A Data Flow Multiprocessor", *IEE Transactions on Computer*, Feb. 1977, pp. 138-146.
Robert M. Keller, "Formal Verificiation of Parallel Programs", *Comm. ACM 19*, 7 (Jul. 1976), pp. 371-384.
Robert M. Keller, "Parallel Program Schematic and Maximal Parallelism", *J. ACM 20*, 3 (Jul. 1973), pp. 514-537 and *J. ACM 20*, 4, (Oct. 1973), pp. 696-710.
Jack B. Dennis, "Packet Communication Architecture", *1975 Sagamore Computer Conference on Parallel Processing*, pp. 224-229.
Keller, R. M. "A Fundamental Theorem of Asynchronous Parallel Computation", T. Y. Feng, Springer-Verlag, Berlin, 1975.
Chroust, "Multiprocessing Scheduler", in *IBM Tech. Discl. Bull.*, vol. 15, No. 5, Oct. 1972, pp. 1643-1644.
David P. Misunas, "Structure Processing in a Data-Flow Computer", *1975 Sagamore Computer Conf. on Parallel Processing*, pp. 230-234.
Berg and Thurber, "A Hardware Executive Control for the Advance/Avionic Digital Computer System", *NAECON '71 Record*, pp. 206-213.
Berg & Johnson, "An Associative Memory for Executive Control Functions in an Advanced Avionic Computer System", *Proceedings IEEE International Computer Group Conf.*, Wash. D.C., Jun. 1970, pp. 336-342.
Kuck, "A Survey of Parallel Machine Organization and Programming", *Computing Surveys*, vol. 9, No. 1, Mar. 1977, pp. 29-59.
Enslow, Jr., "Multiprocessor Organization-A Survey", *Computing Surveys*, vol. 9, No. 1, Mar. 1977, pp. 103-129.

*Primary Examiner*—Gareth D. Shaw
*Assistant Examiner*—Eddie P. Chan
*Attorney, Agent, or Firm*—Schwartz, Jeffery, Schwaab, Mack, Blumenthal & Koch

[57] ABSTRACT

A general purpose computing machine utilizing a hardware executive system controller for reducing software system overhead. The computing machine has a uniprocessor embodiment which enhances system throughput and a multiprocessor embodiment which may be tailored to achieve a high level of concurrent processor operation. The computing machine utilizes a novel programming structure tailored to the machine architecture by separating data transformation tasks from control statements and performing the data transformation task at the processor level while performing the control task in the hardware executive.

52 Claims, 43 Drawing Figures

LEGEND:
$S_j$ IS THE STATUS OF THE jth DATA CONDITION.
$R_{ij}$ INDICATES THE RELEVANCE OF DATA CONDITION j TO ACTIVATING PROCEDURE
$E_i$ IS THE ELIGIBILITY STATUS OF THE ith PROCEDURE BASED ON THE STATUS OF EACH DATA CONDITION RELEVANT TO ACTIVATING PROCEDURE i.

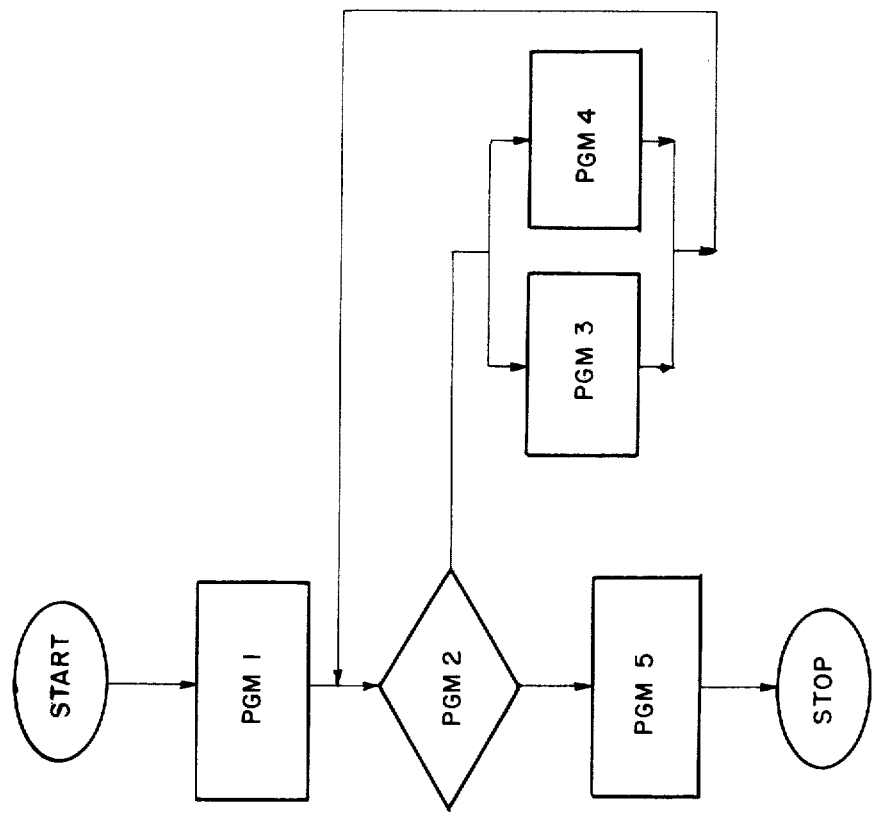

REQUEST AND EVENT
DRIVEN PROGRAM

```
PGM 1:  BEGIN
          COUNT = 0
          FACTORIAL = 1
          SUM = 0
          SET FLAG 1 = "TRUE"
          SET FLAG 2 = "TRUE"
        END

PGM 2:  WHEN FLAG 1 AND FLAG 2 = "TRUE"
          COUNT = COUNT + 1
          IF COUNT ≤ 20, THEN DO:
            EXEC CALL (ENABLE PGM 3)
            EXEC CALL (ENABLE PGM 4)
          END
          ELSE EXEC CALL (ENABLE PGM 5)
          SET FLAG 1 = "FALSE"
          SET FLAG 2 = "FALSE"
        END

PGM 3:  BEGIN
          FACTORIAL = FACTORIAL * COUNT
          SET FLAG 1 = "TRUE"
        END

PGM 4:  BEGIN
          SUM = SUM + COUNT
          SET FLAG 2 = "TRUE"
        END

PGM 5:  BEGIN
          ANSWER = SUM / FACTORIAL
        END
```

FIG. 6

EVENT DRIVEN PROGRAM

```
PGM 1:  WHEN FLAG 0 = "TRUE"
          COUNT = 0
          FACTORIAL = 1
          SUM = 0
          SET FLAG 1 = "TRUE"
          SET FLAG 2 = "TRUE"
          SET FLAG 0 = "FALSE"
        END
PGM 2:  WHEN FLAG 1 AND FLAG 2 = "TRUE"
          COUNT = COUNT + 1
          IF COUNT ≤ 20 THEN DO
            SET FLAG 3 = "TRUE"
            SET FLAG 4 = "TRUE"
          END
          ELSE SET FLAG 5 = "TRUE"
          SET FLAG 1 = "FALSE"
          SET FLAG 2 = "FALSE"
        END
PGM 3:  WHEN FLAG 3 = "TRUE"
          FACTORIAL = FACTORIAL * COUNT

SET FLAG 1 = "TRUE"
          SET FLAG 3 = "FALSE"
        END
PGM 4:  WHEN FLAG 4 = "TRUE"
          SUM = SUM + COUNT
          SET FLAG 2 = "TRUE"
          SET FLAG 4 = "FALSE"
        END
PGM 5:  WHEN FLAG 5 = "TRUE"
          ANSWER = SUM/FACTORIAL
          SET FLAG 5 = "FALSE"
        END
```

FIG. 7

EVENT DRIVEN PROGRAM WITH ONLY ASSIGNMENT STATEMENTS

```
PGM 1:  WHEN FLAG 0 = "TRUE"
          COUNT = 0
          FACTORIAL = 1
          SUM = 0
          SET FLAG 1 = "TRUE"
          SET FLAG 2 = "TRUE"
          SET FLAG 0 = "FALSE"
        END
PGM 2:  WHEN FLAG 1 AND FLAG 2 = "TRUE"
          COUNT = COUNT + 1
          FLAG 3 = (COUNT < 20)
          FLAG 4 = (COUNT ≤ 20)
          FLAG 5 = (COUNT > 20)
          SET FLAG 1 = "FALSE"
          SET FLAG 2 = "FALSE"
        END
PGM 3:  WHEN FLAG 3 = "TRUE"
          FACTORIAL = FACTORIAL * COUNT
          SET FLAG 1 = "TRUE"
          SET FLAG 3 = "FALSE"
        END
PGM 4:  WHEN FLAG 4 = "TRUE"
          SUM = SUM + COUNT
          SET FLAG 2 = "TRUE"
          SET FLAG 4 = "FALSE"
        END
PGM 5:  WHEN FLAG 5 = "TRUE"
          ANSWER = SUM/FACTORIAL
          SET FLAG 5 = "FALSE"
        END
```

FIG. 8

TRANSITION MACHINE PROGRAM

```
PGM 1: WHEN FLAG 0 = "TRUE"
       BEGIN
         COUNT = 0
         FACTORIAL = 1
         SUM = 0
       END
       ON EXIT
         SET "TRUE"(FLAG 1, FLAG 2)
         SET "FALSE"(FLAG 0)

PGM 2: WHEN FLAG 1 AND FLAG 2 = "TRUE"
       BEGIN
         COUNT = COUNT + 1
         FLAG 3 = (COUNT < 20)
         FLAG 4 = (COUNT ≤ 20)
         FLAG 5 = (COUNT > 20)
       END
       ON EXIT
         SET "FALSE"(FLAG 1, FLAG 2)
         SET "VARIABLE"(FLAG 3,
           FLAG 4, FLAG 5)

PGM 3: WHEN FLAG 3 = "TRUE"
       BEGIN
         FACTORIAL = FACTORIAL * COUNT
       END
       ON EXIT
         SET "TRUE"(FLAG 1)
         SET "FALSE"(FLAG 3)

PGM 4: WHEN FLAG 4 = "TRUE"
       BEGIN
         SUM = SUM + COUNT
       END
       ON EXIT
         SET "TRUE"(FLAG 2)
         SET "FALSE"(FLAG 4)

PGM 5: WHEN FLAG 5 = "TRUE"
       BEGIN
         ANSWER = SUM/FACTORIAL
       END
       ON EXIT
         SET "FALSE"(FLAG 5)
```

REQUIREMENTS - ORIENTED PROGRAM

```
DECLARATIONS
    BOOLEAN   INITIALLY ("I"), FACTORIAL.READY ("0"),
              SUM.READY ("0"), CONTINUE.SUM ("0"),
              CONTINUE.FACTORIAL ("0"), COMPUTE.RATIO ("0")
    INTEGER   COUNT, FACTORIAL, SUM
    REAL      ANSWER

PGM 1: WHEN (INITIALLY) DO
          BEGIN:
            COUNT: = 0
            FACTORIAL: = 1
            SUM: = 0
          END
        THEN
          SET (FACTORIAL.READY, SUM.READY)
          RESET (INITIALLY)
PGM 2: WHEN (SUM.READY, FACTORIAL.READY) DO
          BEGIN:
            COUNT: = COUNT + 1
            CONTINUE.SUM: = COUNT ≤ 20
            CONTINUE.FACTORIAL: = COUNT ≤ 20
            COMPUTE.RATIO: = COUNT > 20
          END
        THEN
          RESET (SUM.READY, FACTORIAL.READY)
PGM 3: WHEN (CONTINUE.FACTORIAL) DO
          BEGIN:
            FACTORIAL: = FACTORIAL * COUNT
          END
        THEN
          SET (FACTORIAL.READY)
          RESET (CONTINUE.FACTORIAL)
PGM 4: WHEN (CONTINUE.SUM) DO
          BEGIN:
            SUM: = SUM + COUNT
          END
        THEN
          SET (SUM.READY)
          RESET (CONTINUE.SUM)
PGM 5: WHEN (COMPUTE.RATIO) DO
          BEGIN:
            ANSWER: = SUM/FACTORIAL
          END
        THEN
          RESET (COMPUTE.RATIO)
```

FIG. 9

CONTROL/DATA TRANSFORMATION DICHOTOMY

| NAME | CONTROL INFORMATION | DATA TRANSFORMATION |
|---|---|---|
| PGM 1: | WHEN (INITIALLY)<br>THEN<br>  SET (FACTORIAL . READY , SUM .<br>    READY )<br>  RESET (INITIALLY) | BEGIN:<br>  COUNT: = 0<br>  FACTORIAL: = 1<br>  SUM: = 0<br>END |
| PGM 2: | WHEN (SUM . READY , FACTORIAL .<br>    READY)<br>THEN<br>  RESET (SUM. READY, FACTORIAL .<br>    READY)<br>  SET VARIABLY (CONTINUE . SUM ,<br>    CONTINUE.FACTORIAL ,<br>    COMPUTE . RATIO ) | BEGIN:<br>  COUNT: = COUNT + 1<br>  CONTINUE . SUM:= COUNT ≤ 20<br>  CONTINUE . FACTORIAL: =<br>    COUNT ≤ 20<br>  COMPUTE . RATIO: = COUNT ><br>    20<br>END |
| PGM 3: | WHEN (CONTINUE . FACTORIAL)<br>THEN<br>  SET (FACTORIAL . READY)<br>  RESET (CONTINUE . FACTORIAL) | BEGIN:<br>  FACTORIAL: = FACTORIAL *<br>    COUNT<br>END |
| PGM 4: | WHEN (CONTINUE . SUM )<br>THEN<br>  SET (SUM . READY)<br>  RESET (CONTINUE . SUM) | BEGIN:<br>  SUM: = SUM + COUNT<br>END |
| PGM 5: | WHEN (COMPUTE . RATIO )<br>THEN<br>  RESET (COMPUTE . RATIO ) | BEGIN:<br>  ANSWER: = SUM/FACTORIAL<br>END |

FIG. 10

PROCESSOR LOAD OPERATIONS

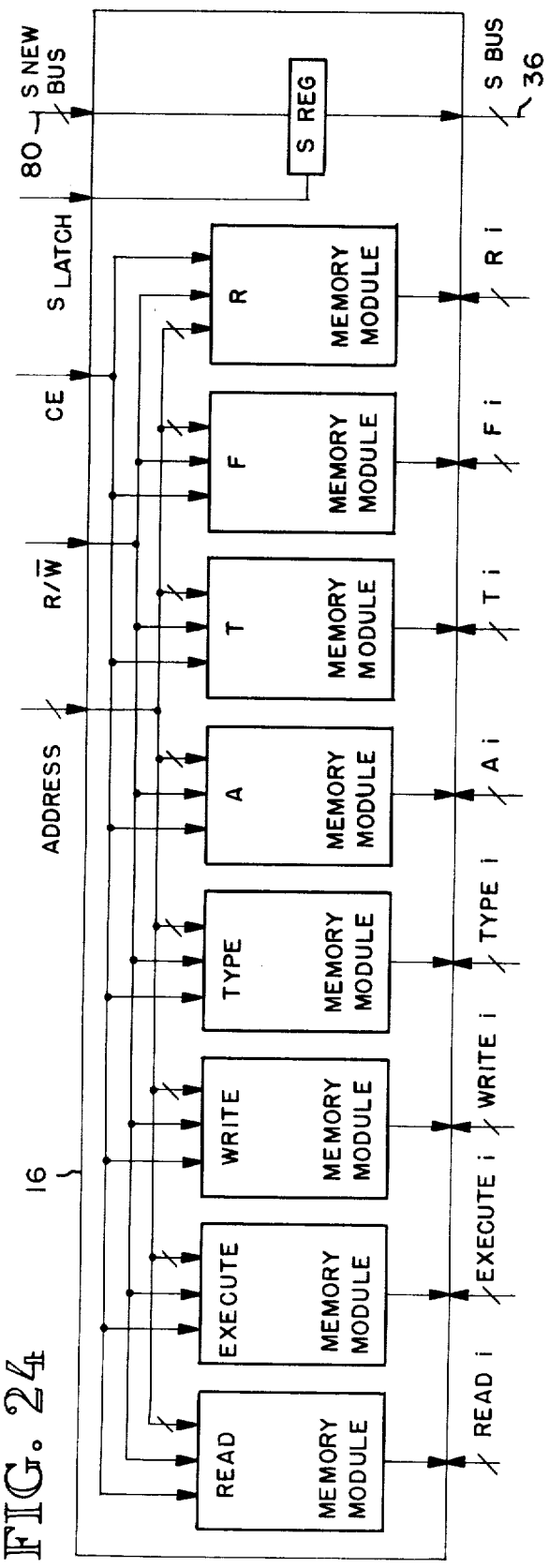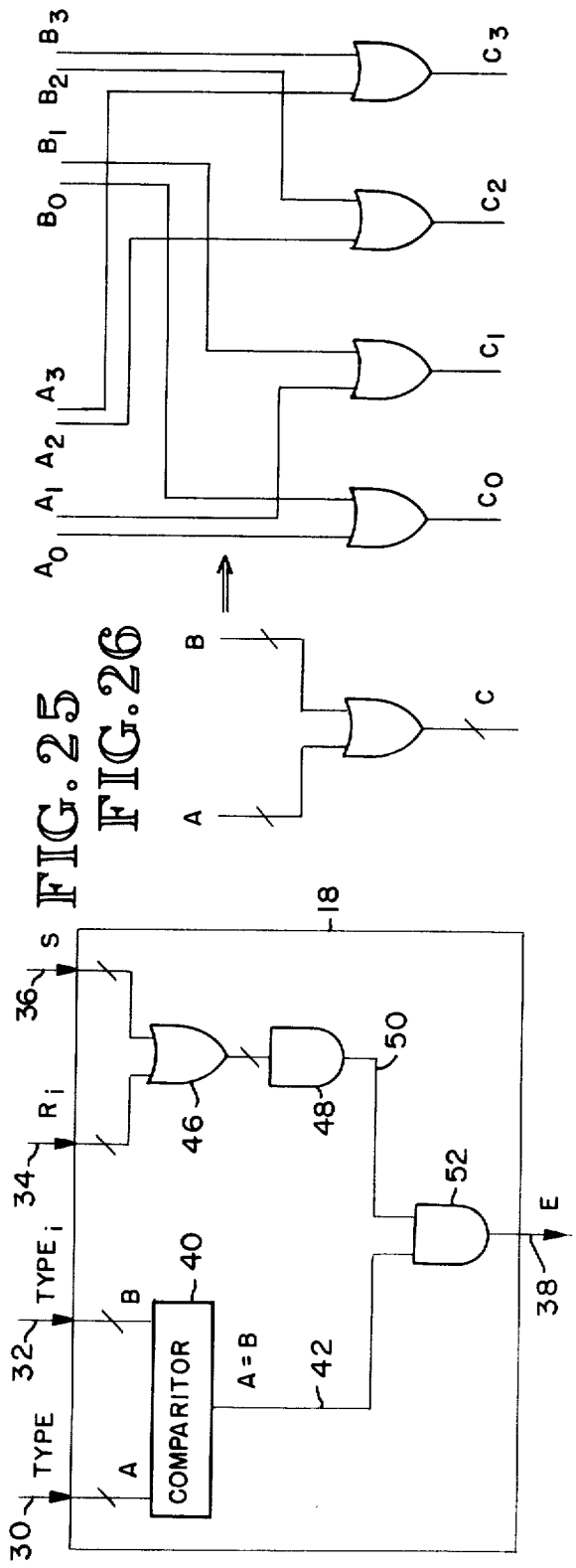

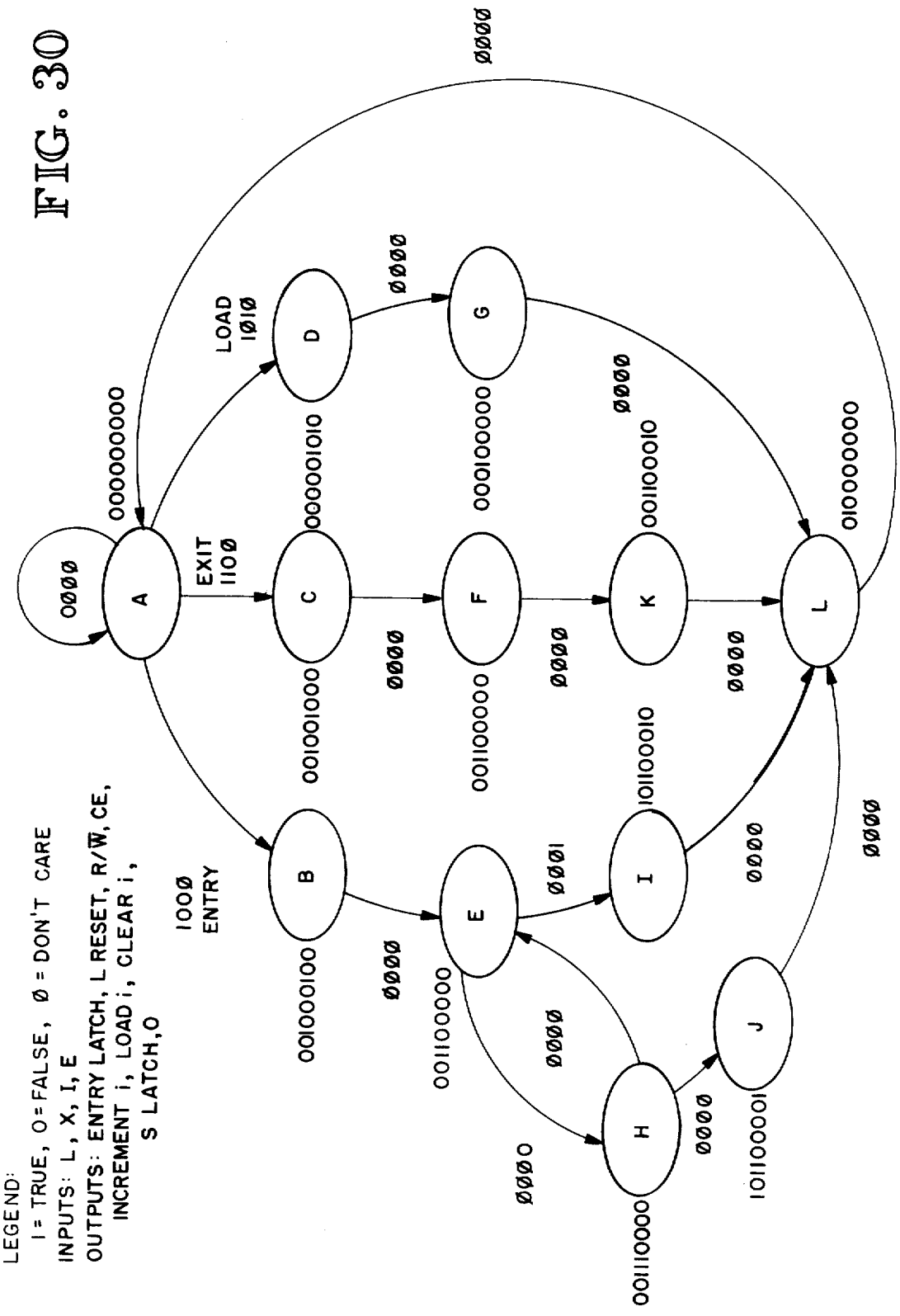

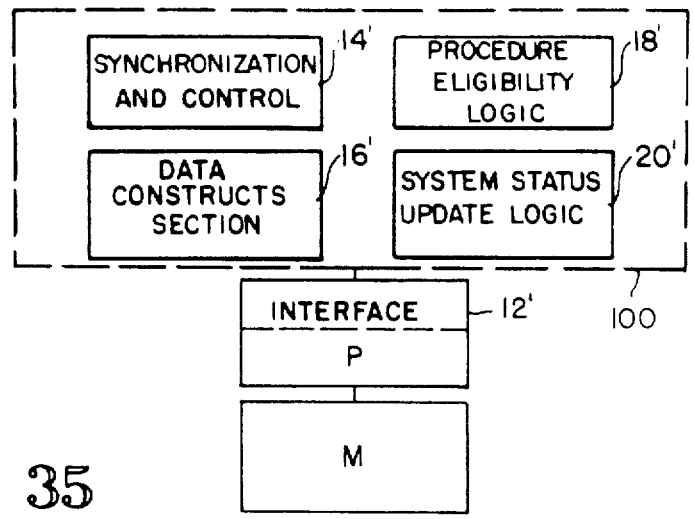

FIG. 35

```
WHEN L NOT BUSY
    BEGIN: SINGLE PROCESSOR LOGIC
        WHEN INDEX ≠ 0
            i = INDEX
            LOAD READ_i
            LOAD WRITE_i
            TRANSFER CONTROL TO EXECUTE_i INDIRECTLY
            STORE V
            SET L BUSY
    END: SINGLE PROCESSOR CONTROL LOGIC
```

FIG. 36A

```
WHEN L BUSY
    BEGIN: SYSTEM CONTROLLER LOGIC
        i = INDEX
```
$$S_{NEW} = (S_{OLD} \wedge T_i) \vee (T_i \wedge \bar{F_i}) \vee (\bar{F_i} \wedge V)$$
```
        i = 0
        WHILE E_i = 0 FOR i = 1 TO I
```
$$E_i = \bigwedge_{j=1}^{J} S_j \vee r_{ij}$$
```
        IF i = I THEN
            INDEX = 0
        ELSE
            INDEX = i
        SET L NOT BUSY
    END: SYSTEM CONTROLLER LOGIC
```

FIG. 36B

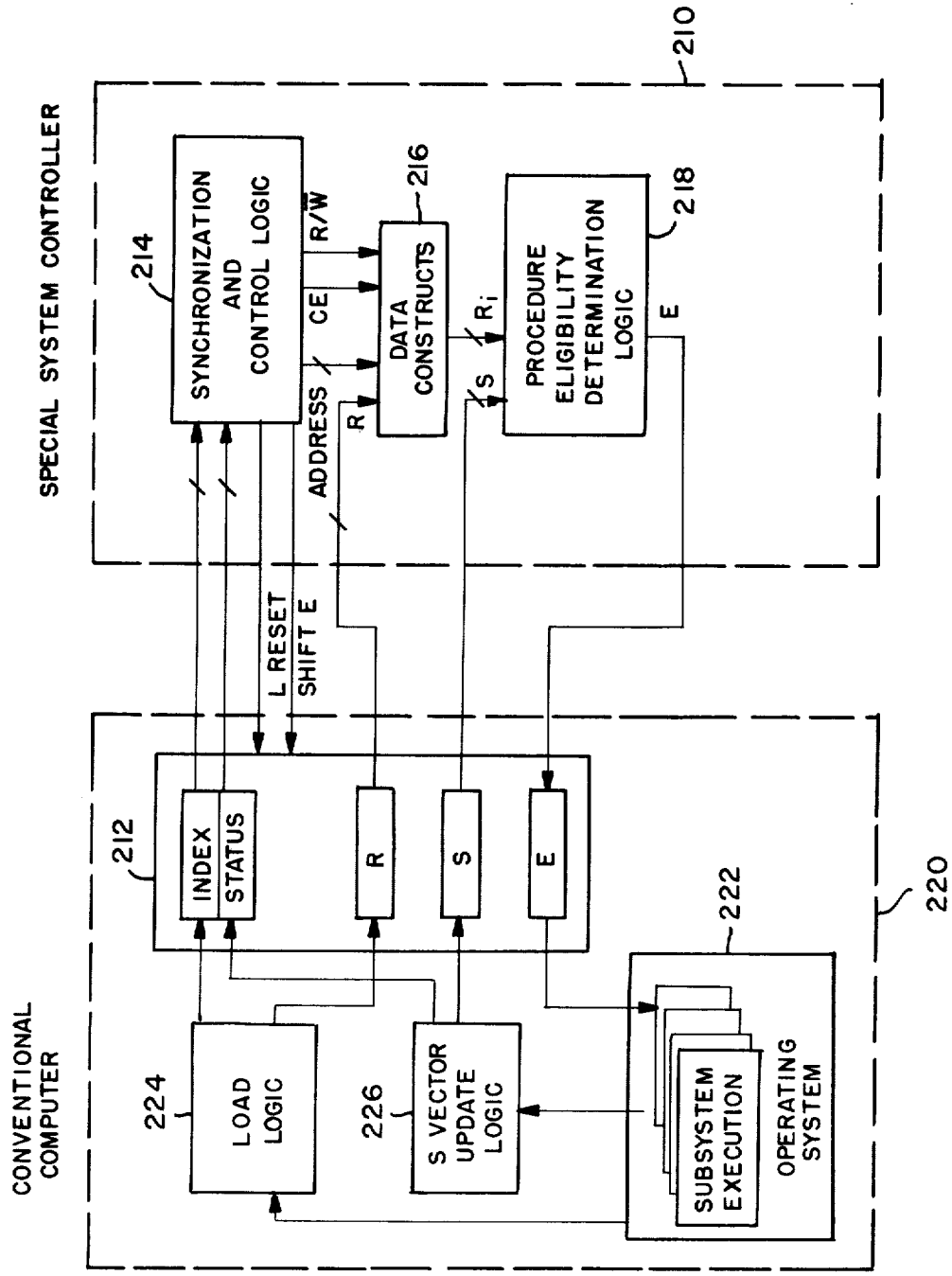

TRANSITION MACHINE—A GENERAL PURPOSE COMPUTER

TABLE OF CONTENTS

Field of the Invention
Description of Prior Art
  (A) Enhanced Throughput
  (B) Programmer Productivity
Summary of the Invention
Brief Description of the Drawings
Detailed Description of the Preferred Embodiments
  System Overview
    Definition of Transition Machine
    Model of Parallel Programs
    Procedure Eligibility Determination
    System Status Updating
    Example Program
    Model of Transition Machine Architecture
    Example Program Execution
  General Implementation Considerations
    System Controller Functional Operation-General Description
    Interrupts
  Detailed Implementation
    Processor/System Controller Interface
    System Controller Functional Operation-Detailed Description
      Entry Transition
      Exit Transition
      Load Transition
  System Controller Detailed Component Design
    Data Constructs
    Procedure Eligibility Determination Logic
  System Controller Detailed Component Design (continued)
    System Status Update Logic Circuit
    Synchronization and Control Logic Circuit
    System Controller Internal Operation
  Single Processor Transition Machine Architecture
    Entry Transition
    Exit Transition
    Load Transition
  Selected Alternate Implementation of the System Controller
    System Controller to Support a Conventional Operating System
      Functional Operation
      Entry Transition
      Load Transition
Appendix A
Appendix B
Appendix C

BACKGROUND OF THE INVENTION

1. Field of the Invention

The invention is in the field of computer architecture and more particularly in the areas of parallel computers and multiprocessing systems. The invention enhances throughput via hardware support for parallel processing and operating system efficiency. Programmer productivity is also enhanced using a hardware supported unique software structure.

2. Description of the Prior Art

A. Enhanced Throughput

Parallel processing has been recognized as a valuable mechanism for increasing computational speeds by performing concurrent or parallel computations. Various degrees of parallelism have been achieved in computers having both single and multiple processing units. These prior art approaches to the concurrency objective may be categorized into three broad areas: (1) implementation on a multitasking basis in a sequential processor, where concurrent processing paths are assigned priorities and compete for single stream resources; (2) implementation using special purpose hardware with multiple processors based on the concurrency requirement of the problem; and (3) implementation using a general purpose multiprocessor with a multiprocessing operating system to control it.

In the single processor multitasking solution, a single processor and its associated resources are time shared by programs running "concurrently" under the control of a multitasking operating system. The processor is required to provide (over any appreciable period of time) the processing power sufficient to accommodate the requirements along all paths plus the software overhead to multiplex between paths. In addition to assuring that all paths can be accommodated over any appreciable time interval, assurance must be provided for meeting the response time of each path in a worst case concurrency situation. The problems of meeting these requirements are compounded by operating system efficiency considerations. As a consequence, the processors must be sized to the specific problem with the capability of modular extentions typically not being accommodated other than by oversizing the processor to begin with.

In the special purpose multiprocessor approach, a computer is constructed based on a specific concurrency requirement. Examples of special purpose parallel computers that have been built are array processors such as the ILLIAC IV, STARAN I, SOLOMON II. These computers require large amounts of special purpose hardware, special programming structures, and are specially suited for problems involving large amounts of homogeneous parallelism such that identical operations are to be performed on multiple data items. Array processors allow multiple identical operations to be performed in parallel, thereby supporting the concurrency requirement. However, homogeneous parallelism represents a very small part of the parallelism present in computer programs, and therefore these special purpose computers are not typically suited to support the more general heterogeneous parallelism present in typical computer programs.

The multiprocessor with a multiprocessing executive is an attempt at a general solution which accommodates heterogeneous parallelism in modular increments. These solutions, however, are fraught with increasingly diminishing returns as the number of processors is increased. The reasons for the reduction in computing gain in a multiprocessor system are two fold: first, there is a large overhead associated with the software implementation of the single unified control mechanism in the operating system, and secondly, it is difficult to effectively exploit the high level (job or task) of parallelism in application programs.

These two problems have aggravated each other since the large overhead has been taken as the justification for the high level modeling of parallelism but by exploiting parallelism at the job or task level, much of the potential gain of multiprocessing is lost since typically there is some amount of parallelism within the job or task and this internal parallelism cannot be exploited.

B. Programmer Productivity

Programmer productivity has been cited as a major cost problem on automated data processing (ADP) systems. Software development and maintenance costs have continued to climb in the same era of drastic reductions in hardware costs. Structured programming and other disciplines have been defined to reduce the problem. Unilateral agreement among proponents of these disciplines seems to exist in four areas of concern relating to the structure of programs and the computer architectures to which they apply:

(1) a requirements-oriented structure;

(2) a structure for which only the essential aspects of program control must be specified by the programmer;

(3) a structure which eliminates transfers of control (GO TO, CALL, queueing requests, etc.); and (4) a structure which simplifies the error-prone aspects of decision logic.

The significance of each of these requirement areas is discussed below.

Requirements-oriented Programming

The specification of program requirements and the translation of these requirements into program design data is a major program development activity. One reason that these development activities require such a large percentage of the overall development process is because of the incongruities between the typical situation/response nature of program requirements and the procedural implementation of these requirements in the final design. Thus, there is a major translation from requirement to design which is a timeconsuming, error-prone process. Once the design has been established and implemented, it no longer resembles the structure of the requirements. The gulf between requirements and program design in conventional architectures hampers program understandability and therefore documentation, maintainability, etc. Thus, it is typically impossible to verify that a program of any magnitude actually implements its requirements.

Elimination of Degeneracy

In the conventional software framework the programmer typically translates the computation requirements into a somewhat arbitrary sequence of actions to be performed by the machine. In many cases, however, there is no sequence of actions implied in the requirements, so a sequence is artifically induced by the programmer. Thus, variant "correct" program versions can exist with entirely different structures. These programs are degenerate solutions to the problem described by the requirements specification. In essence the programmer has the ability to induce his own design philosophies and personal preferences into what would idealy have been an objective translation of a requirement that could have been directly compared with other versions. This design indeterminacy has the effect of making the implementations less directly relevant to the requirements such that verification must be performed only at the lowest level to determine that the final result does in fact meet the requirement.

Exploitation of the parallelism inherent in the computation is also precluded by arbitrary determination of execution sequence. This arbitrary determination reduces program effectiveness in parallel processing environments. The inherent relationships between program segments is also obscured such that later program maintenance is more likely to induce errors.

Thus, by requiring only the essential aspect of program control, the requirement translation process is simplified, many of the previously arbitrary decisions on sequence made by the programmer are eliminated, and exploitation of parallelism is supported.

Eliminating Direct Transfers of Control

The direct transfer of control is recognized as the major source of programmer coding errors. Many of the developments in software engineering have been directed to the elimination of these structures from programs. The result has enhanced software productivity, but since these structures are still supported to varying degrees in compilers, and unilaterally at the machine level, many errors can still be attributed to them. Conventional executive requests to execute a specified program are also GO TO's, the only difference being that they are implemented at a high level.

The executive request problem is an interesting one in that a program could be completely correct but not be executed under the right conditions because it was incorrectly requested. Thus, there is an intricate coupling between programs. There is also the possibility of a totally unsuspected program requesting the execution of a program for a completely inappropriate situation. Therefore, before a program can be completely verified to meet its requirements every set of conditions under which it can be requested must be known.

Simplification of Decision Logic

The elimination of GO TO's is significant from an error-proneness point of view, but decision logic structures are very major offenders also. Decision diagramming has been used to address some of the error proneness of these logic structures, but they are a monitoring and evaluation tool not implemented as a part of the program structure in the design, and thus their use constitutes a divergence (additional effort) from the central development path.

The typical decision logic constructs involve a transfer of control which therefore allows circumvention of GO TO-less dogmas at the detailed implementation level. They also have the feature of treating program activation conditions as disjoint, without global awareness. A particular test for $a<b$, for example, may only be executed if $a>c$, $d<e$ .... But this total situation is not readily apparent to the programmer writing/reviewing the code. Therefore, very complex meshes of logic may be implemented to provide assurance of the specific conditions of execution which, because of a decision higher in the structure, preclude a program's ever being executed.

SUMMARY OF THE INVENTION

It is an object of the invention to overcome the disadvantages of the prior art by providing a hardware executive apparatus incorporating an event-driven structure for use with a uniprocessor or a multiprocessing system.

Another object of the invention is to provide improved throughput of a computing system by eliminating software overhead functions and incorporating same into a hardware implementation. The hardware implementation incorporates the utilization of a system status vector and a relevance matrix. The status vector and relevance matrix are utilized for enabling data transformations in a multiprocessing environment resulting in a high level of concurrent operation.

In accordance with another aspect of the invention, there is disclosed a computation structure for which there is a direct traceability to requirements. As a consequence, the invention achieves a tremendous increase in programmer productivity. Requirements are typically of the form: "When a certain 'situation' arises, perform an 'associated function'." 'Situations' are typically describable in terms of sets of conditions on parameters which are represented in the data base. The 'associated functions' correspond to programs which change parameter values.

Yet another object of the invention is to provide a computing architecture having a data transformation aspect and a central control aspect thereby providing a structured computational environment for enhancing program use, development, documentation and verification. The central control aspect of the computational structure is characterized by WHEN statements involving a plurality of data conditions in the form of unary predicates on the data set. When the WHEN conditions are met, a data computation is enabled for execution in the data processor. In a multiprocessing system, a plurality of data transformations may be enabled for concurrent execution thus resulting in highly parallel system operation. The WHEN block structure is implemented in hardware which results in low overhead at the architectural level.

In accordance with the invention there is provided a hardware executive apparatus for use in a multiprocessing system for the concurrent operation of a plurality of data processors in solving an algorithm defined by a plurality of application programs and a control program. The data processors access application program memory storage means and data memory storage means and have at least a common data memory area accessible by the plurality of data processors. The hardware executive apparatus executes the control program and comprises a status storage means for storing global binary status indications $S_j$ of a data set appropriate for solving the algorithm. The stored status indications correspond to data conditions which are relevant for enabling execution of application programs by the plurality of processors which are necessary in solving the algorithm. The hardware executive apparatus additionally comprises a relevance storage means for storing groups i of binary relevance indications $R_{ij}$, each group corresponding to the relevance of the status indications to the $i^{th}$ one of the application programs where i is an integer designating one of the groups and corresponding to one of the application programs and j is an integer designating one of the binary status indications. The hardware executive apparatus additionally comprises a means for updating the status indications stored in the status storage means at completion of execution of each application program, a means responsive to the relevance storage means and status storage means for determining the eligibility of the application programs for execution by the plurality of processors, and means for enabling execution of eligible application programs by the plurality of processors whereby application programs which are determined eligible may be executed concurrently.

The invention may also be characterized as a computing machine capable of transitioning between states for solving an algorithm and comprising a plurality of data processors each including computing means for computing data in accordance with an application program, data memory storage means having at least a portion thereof shared by the plurality of data processors, application program memory storage means for storing said application program, a hardware system controller operable for determining the eligibility of each of the application programs and for enabling operation of different ones of the data processors for concurrent execution of the eligible programs, and wherein the system controller is operable for determining eligibility based on a plurality of unary predicates associated with the applicability of the transition between states of said machine for solving said algorithm.

In accordance with another aspect of the invention, there is disclosed a method of increasing program throughput in a plurality of data processors forming a computing system comprising the steps of: (a) structuring the programming of an algorithm to be carried out by the computing system into a plurality of data transformation programs and a control program, the data transformation programs performing event-driven data computational steps without transfer of control to other transformation programs and the control program scheduling execution of the data computational steps, (b) selecting a plurality of unary predicates which collectively represent all data conditions relevant to enabling execution of all of the data transformation programs, the unary predicates forming status indications of said data conditions, (c) designating all of said unary predicates which are relevant to enabling the execution of each of the data transformation programs, the designated unary predicates forming a group of relevant indications corresponding to each data transformation program, (d) storing the data transformation programs in memory storage devices accessible by said plurality of data processors, and (e) storing the control program in a hardware executive apparatus. The hardware executive apparatus is effective for scheduling data transformation programs by including the steps of: (1) maintaining a memory store of the status indications, (2) maintaining a memory store of each group of relevance indications, (3) determining the eligibility of data transformation programs by hardware logical operations on the status and relevance memory stores wherein a data transformation program is determined eligible for execution if all status indications are true which are relevant in the group of relevance indications corresponding to the data transformation programs, (4) enabling the eligible programs wherein concurrently eligible data transformation programs are executed concurrently, (5) updating the memory store of the status indications upon completion of execution of each data transformation program, and (6) repeating steps (3)-(5) above until data transformation programs are no longer determined eligible whereby the algorithm is completed by the computing system.

BRIEF DESCRIPTION OF THE DRAWINGS

These and other objects of the invention will become clear in reference to the foregoing specification taken in conjunction with the drawings wherein:

FIGS. 5A and 5B illustrate a request and event-driven program for solving the problem of FIG. 3;

FIG. 6 is a listing of an event-driven program for solving the problem illustrated in FIG. 3;

FIG. 7 is a program listing for an event-driven program with only assignment statements solving the program illustrated in FIG. 3;

FIG. 8 is a program listing for the transition machine program in accordance with the invention for solving the problem illustrated in FIG. 3;

FIG. 9 is an example of a partial program listing corresponding to FIG. 8 and illustrating requirements oriented programming techniques;

FIG. 10 is a table listing of control and data transformation programs corresponding to the requirements oriented programming technique of FIG. 9;

FIG. 24 is a block diagram of the data construct section of the system controller;

FIG. 25 is a schematic diagram of the procedure eligibility determination logic circuit of the system controller;

FIG. 26 is a block diagram of logic circuit nomenclature utilized in the drawings;

FIG. 30 is an illustration of the state diagram for use in implementing the synchronization and control logic circuitry;

FIG. 35 is a block diagram illustrating the transition machine architecture for a uniprocessor in accordance with another aspect of the invention;

FIGS. 36A and 36B illustrate design language syntax listings describing the operation of the uniprocessor of FIG. 35;

FIG. 37 is a block diagram of a special system controller which supports an operating system in a uniprocessor environment;

DETAILED DESCRIPTION OF THE PREFERRED EMBODIMENTS

SYSTEM OVERVIEW

Definition of Transition Machines

Figure 1:
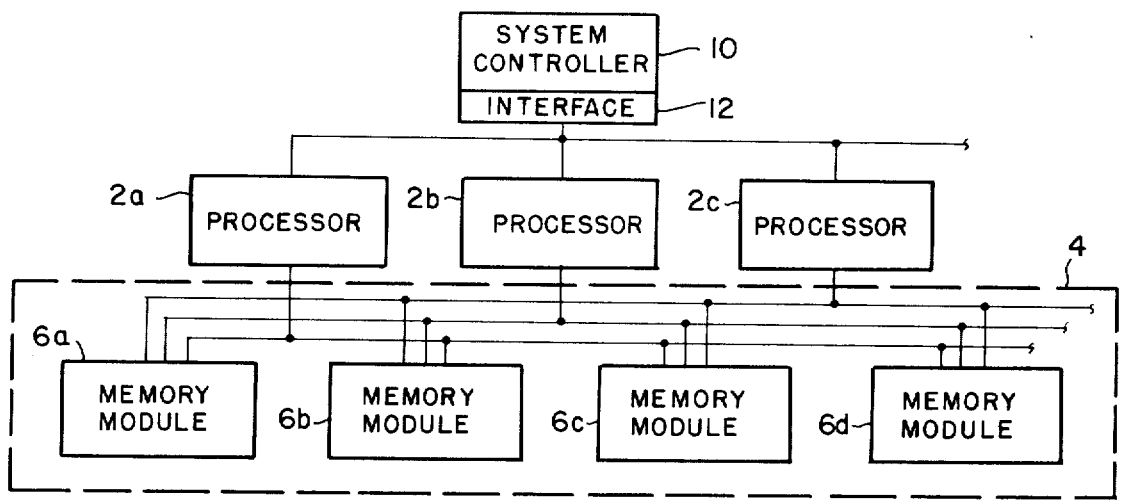
FIG. 1 is a block diagram of the transition machine in accordance with the invention.

The family of computational machine architectures described herein implements a completely general model of parallelism. An overall block diagram of a computing system or, as termed herein a transition machine has made in accordance with the invention is shown in FIG. 1. The transition machine is seen to comprise a plurality of processors 2a, 2b, 2c each connected to a common memory 4. While only three processors are shown, it is understood that a large number of processors may be used including I/O controllers and other special purpose processors. (A single processor embodiment is also disclosed herein.) Further, the common memory 4 is typically composed of a plurality of memory modules 6a, 6b, 6c, 6d of which only four are illustrated. Each memory module may provide storage means for data as well as for application programs, or additional memory modules may be provided for such purposes as desired. For the multiprocessor embodiment, however, at least some data storage areas are made commonly accessible to the plurality of data processors. It is also understood that some of the processors may in fact be I/O processors or controllers connected in conventional; and fashion to one or more I/O devices.

A System Controller 10 is shown connected to the processors 2 via a processor/system controller interface 12. The System Controller 10 forms the heart of the invention and is more fully described hereinafter. In practice, the processors 2 and common memory 4 may be of conventional hardware design. The System Controller 10 is utilized, together with interface 12, to dispatch activities to the processors 2 and to achieve concurrent operation of the processors 2, in a multiprocessor system. The System Controller 10 is thus similar in function to a multiprocessor software system executive, but has the advantage of extremely low overhead.

Model of Parallel Programs

The abstract conceptual model of parallel computation is set forth the example in a number of articles by Robert M. Keller e.g. "Formal Verification of Parallel Programs", *Comm. ACM* 19, 7 (July 1976) pp 371–384; "Parallel Program Schemata and Maximal Parallelism", *J. ACM* 20, 3 (July 1973), pp 514–537; and *J. ACM* 20, 4 (October 1973), pp 696–710.

The conceptual model has been termed a transition system and is accepted as the basis for the more detailed architectural model set forth herein. A transition system is a model of the run time structure for computer programs; it is a form into which any "structured" program can be converted directly by a compilation process. The transition machine provides a machine architecture in which transition systems can be executed.

The transition system model is defined as $(Q, \rightarrow)$, where Q is the set of possible systems states and $\rightarrow$ is the set of transitions between states as described by Keller. A named transition system is a triple $(Q, \rightarrow, \Sigma)$. The components correspond respectively to the set of all possible system states $(q_1, q_2, q_3 ...)$, a set of all transitions between states $(\rightarrow_1, \rightarrow_2, \rightarrow_3, ..., )$, and a set of names $(\sigma_1, \sigma_2, \sigma_3, ...)$ associated with groups of individually programmed transitions between states. Since there is a one-to-one correspondence between the indices on sigma and the names themselves, the indices can be used to indicate the names: i implies $\sigma_i$, and $I \equiv \{i\}$ implies $\Sigma$. The index $i \in I$ is associated with a group of system transitions described by the statement:

$$\text{when } R_i(d) \text{ do } d' = \Psi_i(d)$$

The symbols in this statement are defined as follows:

i = the index of the group of transitions whose common feature is that they all result in the data transformation indicated by the function $\Psi_i$ d = the set of all data items in the system $R_i(d)$ = the subset of satisfied propositions on the data set, d which are essential to defining the appropriateness of transitioning as determined by performing the data transformation $\Psi_i(d)$.

$\Psi_i(d)$ = the programmed functional data transformation (referred to as a subsystem herein) associated with the group of system transitions indicated by i which operates on the data set, d and results in a revised data set d'.

The set i represent procedures (including enabling predicate) that can be written by a programmer to effect transformations $\Psi_i$ on the data set d when the appropriate set of conditions $R_i$ is satisfied on that data set. The $\Psi_i$ are the individual program subsystems which constitute a computer program. In a parallel computation step multiple sets of conditions $R_i$ are satisfied simultaneously such that multiple subsystems can be executed in parallel. $R_i$ is an enabling predicate that indicates the requisite status of the data set which properly enables the execution of the subsystem which performs the transformation, $\Psi_i$. Each of the enabling predicates $R_i$ is made up of a set $\{R_{ij}\}$, $j \leq J$ of unary predicates where J is the total number of unary predicates required by the entire algorithm or computation problem. A unary predicate may be defined as a single proposition on the data set and thus represents a single data condition whose value may be specified in or by a binary indication, e.g. true or false. Propositions which are examples of unary predicates on the data elements $e_j \in d$ are the following:

(1) the data element $e_j$ is available/not available for use in subsequent computations, (2) the data element $e_{j1}$ satisfies/does-not-satisfy a specified relation to some constant or other data element $e_{j2}$ (for example, $e_{j1} < e_{j2}$), and (3) the data element $e_j$ can/cannot be updated.

The implementation of the conceptual model is carried out by reducing control over transitions between states to a mechanical operation. To achieve such control the set of states, Q is restricted such that only those which may imply a different set of eligible subsystems are considered to be unique. In making this restriction any particular state q can be signified by a set of binary status indications on a global set of unary predicates. The global set of unary predicates is restricted to include only those which are relevant to the eligibility of defined subsystems, i.e., the status of the data condition $a > b$ will be a significant part of q if and only if the condition $a > b$ is relevant to the eligibility of some subsystem, i.

Procedure Eligibility Determination

The eligibility of any particular subsystem, i can thus be determined by selecting the set of global unary predicates that are pertinent to initiating execution of the transformation $d' = \Psi_i(d)$, and by determining the status of those pertinent unary predicates. Thus the control over transitioning can be implemented by:

(1) maintaining a variable system status vector S whose components are binary status indications, one for each unary predicate in the global set, and (2) maintaining for each subsystem, i a relevance vector, $R_i$ of fixed indications for designating which of the global set of unary predicates are relevant for enabling a particular subsystem.

Once the sense of the indications in $R_i$ and S have been defined, there exists a logical algebraic operation, "·" which can be defined such that $E_i = R_i \cdot S$, where $E_i$ is a binary status indication of the eligibility of the subsystem, i. The set of vectors, $R_i$ can be arranged as a matrix, R, the $i^{th}$ row of which is equivalent to $R_i$. The vector algebraic operation, "·" is then extended to include matrices such that:

$$E = R \cdot S,$$

where

Figure 2:
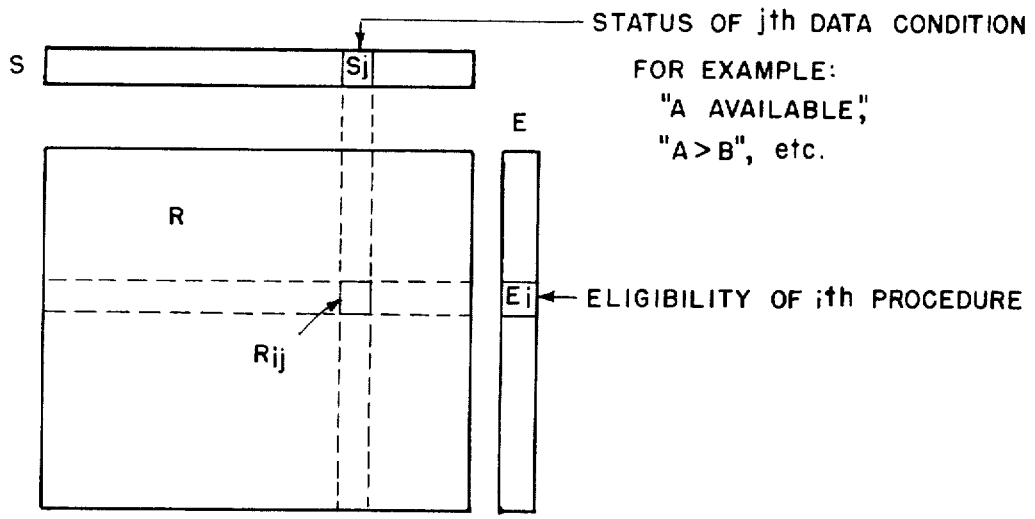
FIG. 2 is an illustration of the primary data constructs utilized in the system controller in accordance with the invention.

E is a vector indicating the eligibility status of every defined subsystem in the system. The relationship of the data constructs is shown in FIG. 2. A specific set of definitions and theorems relating the sense of the indications in R, S and E and the operations "·" is included as Appendix A.

System Status Updating

There is now a prescription for determining subsystem eligibilities (E vector) based on system status (S vector) and the subsystems' conditional data requirements (R vector). There is now set forth a procedure for the computation of a new system status vector which is appropriate subsequent to the completion of a given subsystem.

There are several possible implications on the status of a data condition at the completion of a subsystem. They are as follows:

(1) The data condition remains unaffected by the subsystem running to completion;
(2) The data condition is satisfied whenever the subsystem runs to completion;
(3) The data condition is negated whenever the subsystem runs to completion; and
(4) The data condition is determined dynamically by the execution of the subsystem.

It should be noted that there are also implied modifications to system status at entry to a subsystem in the preferred embodiments to be described; these modifications prohibit the same transition from being attempted in multiple processors by denying subsequent update access to d' when the transformation $d' = \Psi_i(d)$ is initiated.

The implications to system status at completion of a subsystem is readily accommodated by three data constructs. Two of these are fixed vectors (T and F) indicating respectively the always true (2 above) and always false (3 above) situations. For example, execution of a subsystem which is responsible for computing the value of a variable A would always result in the condition "A available" being set true. A third vector, V, is set dynamically (4 above) by the subsystem based upon the relationship of data variables computed by the subsystems. For example, the subsystem responsible for computing either of the variables A or B would have to return the status of the condition "A > B" upon completion. It is clear that the updated status vector S can be computed as a function of T, F and V. The class of functions can be restricted by overlapping the defined sense of the fixed vectors T and F so as to provide a mask against unauthorized dynamic changes to S through the V vector. Appendix B provides a specific definition of the sense of T, F and V for a particular implementation.

A single vector construct A, is required to protect a procedure executing in one processor from being activated in another to perform the same data transformation in cases where this is inappropriate. A specific implementation of this construct is described in Appendix C.

Example Program

Before proceeding to describe the hardware implementation of the computational structure of the transition machine, an example program is described. This program describes how the software actually operates on a transition machine and a specific implementation of the S, R, T, F, A and V constructs (as described above and in appendices A, B, and C) for the example program. It is also shown how the requirements discussed under software productivity in the background section of the invention are supported by this computation structure.

Figure 3:
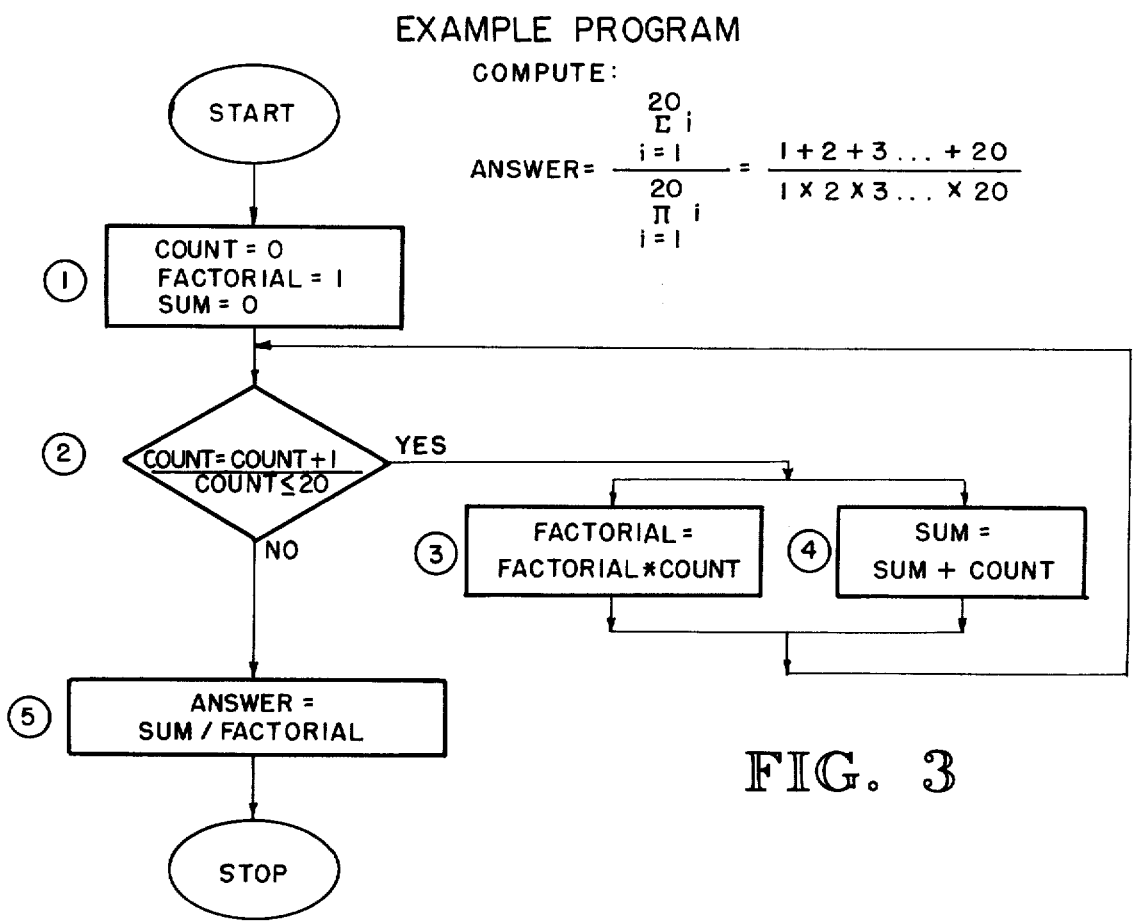
FIG. 3 illustrates an example program utilized in explaining the programming aspect of the transition machine in accordance with the invention.

FIG. 3 is a flow diagram of the example program to be used. For each block on this diagram, a high order language procedure is written to perform the requested function. Such a simple computation would not typically be broken into so many small subsystems, but this has been done primarily to give a clear example of how one can implement control flow with a unique computation structure. The function performed by the example set of programs simply computes the sum of the first twenty integers divided by twenty factorial. This function is not essential to the treatment and is given only to illustrate later how the conditions which effect control relate to the requirements of a computation. It is important to note the parallelism that is exploitable in this computation in that the product (block 3) can be computed in parallel with the sum (block 4).

Figure 4:
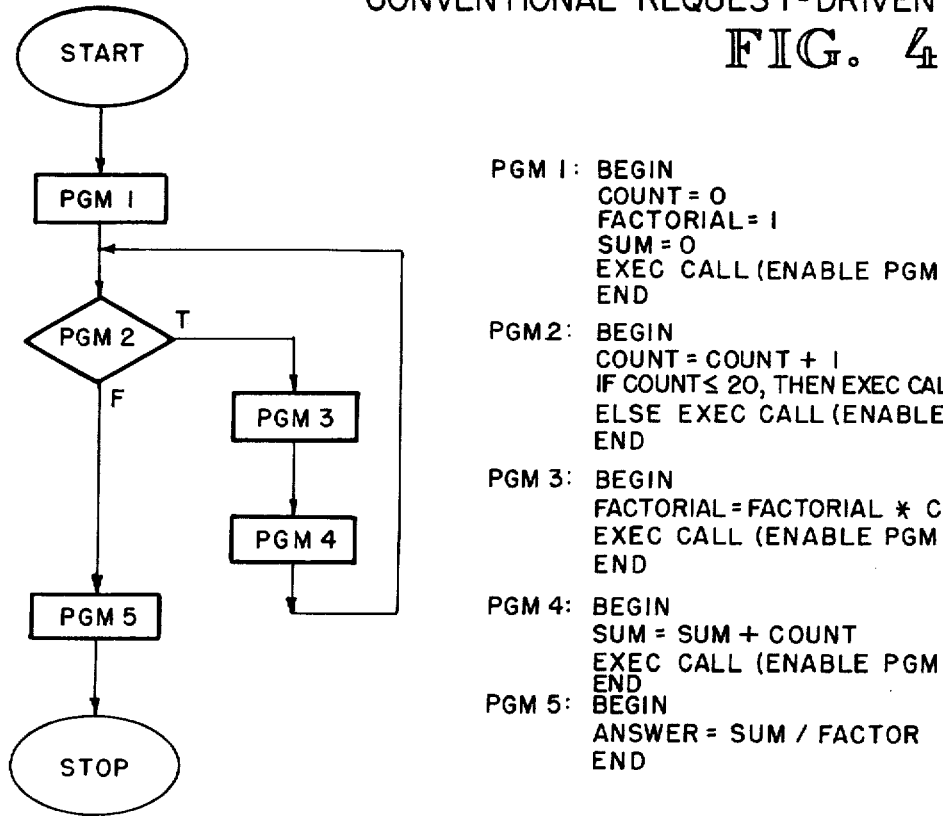
FIG. 4 illustrates a conventional request driven program for solving the example problem of FIG. 3.

In FIG. 4 the example program is implemented in a conventional request driven system. In this structure the flow control is completely implemented by active program requests. The control aspect of the program is interspersed with the data computation aspects. Because of this, any subsystem (program) can be activated by any other subsystem by a direct transfer of control, independent of the computational requirements it implements. Also, note that parallelism cannot be easily exploited due to the problem of trying to synchronize concurrent subsystems. The end effect is that this software structure does not support any of the identified requirements discussed above by way of background of the invention.

FIGS. 5A and 5B show the next stage in the example program evolution implemented in a system that supports both requests and events. In this system a subsystem may be activated based on a request by another subsystem or its activation may be determined based on a set of event flags being set appropriately. (It should be noted that these flags denote the status of unary predicates.) This provides a means for solving the synchronization problem that previously prevented parallelism from being exploited. Any subsystem can still request any other subsystem, and a direct transfer of control is still possible within this structure. Event based control structure allows the available parallelism to be easily exploited and therefore supports the requirement that only essential aspects of program control be specified by the programmer. A system that supports both requests and events represents the current state-of-the-art in operating systems.

FIG. 6 shows the next step which is a totally event-driven (data condition-driven) version of the program where the activation of every subsystem is based on the status of a set of required event flags. The overall system flowchart is this and subsequent examples is the same as that of FIG. 5B. This approach is not typically incorporated in current systems due to the high overhead involved in processing the large number of event flags in software. The advantage of this structure is that subsystem requests (inter-program direct transfer of control statements) can be eliminated. Control in this system is implemented by setting the appropriate event flags on completion of each computation. The result is a more requirements-oriented control structure in that the data conditions required to enable each subsystem are specified as an inherent part of the subsystem. Although "FLAG0", "FLAG1", etc., are not requirements-oriented, this is seen to be primarily a mneumonic problem where identifiers directly associated with specific requirements could have been assigned to the event flags. For example, Table I shows a possible assignment of mneumonic specifiers to the event flags which results in a very readable requirements-oriented structure.

TABLE I

| REQUIRED CONDITION MNEMONICS DEFINITIONS | |
|---|---|
| MNEMONIC | ASSIGNMENT |
| INITIALLY | FLAG0 |
| FACTORIAL.READY | FLAG1 |
| SUM.READY | FLAG2 |
| CONTINUE.FACTORIAL | FLAG3 |
| CONTINUE.SUM | FLAG4 |

TABLE I-continued

| REQUIRED CONDITION MNEMONICS DEFINITIONS | |
|---|---|
| MNEMONIC | ASSIGNMENT |
| COMPUTE.RATIO | FLAG5 |

The vent based structures allow easy exploitation of the available parallelism. There is still not a complete elimination of the direct transfer to control statements, however, in that the "if then else" statement in the subsystem PGM2 implies a transfer of control internal to the program as was discussed previously relative to decision logic.

FIG. 7 shows a totally event driven program with only assignment statements even for the implementation of what was formerly decision logic. This was facilitated by using logical operators to assign the status of event flags that are determined dynamically during the execution of subsystems. As a result, there is a complete elimination of the direct transfer of control structures. A very requirements-oriented control structure has resulted, and only the essential aspect of program control is required, with parallelism being easily exploited.

The programming structure utilized for the transition machine in accordance with the invention is illustrated in FIG. 8. An example of the source statements for this software structure is shown in FIG. 9 which illustrates the requirements oriented aspects of the structure. In this structure each subsystem is divided into two components: (1) a complete specification of the global conditions required to enable the subsystem (WHEN (list of conditions)), and a specification of the global conditions updated on completion of the subsystem (THEN (list of conditions)), and (2) a sequential set of data transformation statements. FIG. 10 shows the complete dichotomy of control and data transformations, and it is this computation structure that is implemented as the transition machine architecture.

Model of Transistion Machine Architecture

Figure 11:
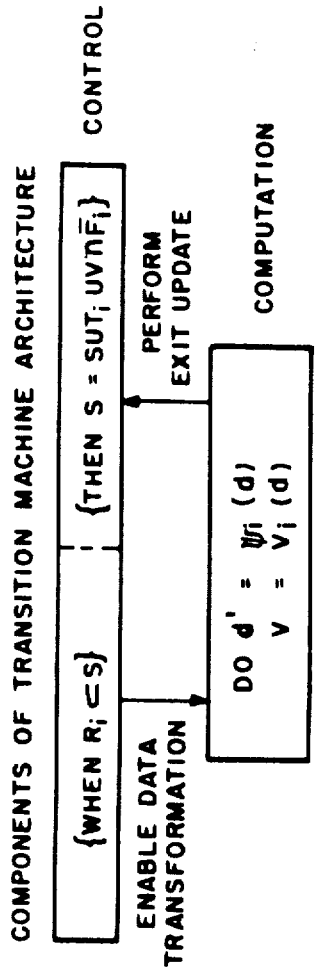
FIG. 11 is a mathematical representation of the major components and operation of the transition machine architecture in accordance with the invention.

FIG. 11 shows a general characterization of the model of the transition machine architecture which implements the desired computer architecture. There are two major components of the machine. The first component may be termed a control component, and it maintains status indications for all the relevant global conditions (referred to as flags earlier) in the system. It also contains indicators associated with each subsystem specifying the subset of global conditions required to activate the specific subsystem and indicators specifying the modification to the global conditions implied on completion of the subsystem. The second component is a computation component which executes the code associated with the data transformation aspect of each subsystem.

In operaton, the control component first determines an eligible subsystem by examining the current status of the global conditions specified by each relevance indicator associated with each enabling predicate for the subsystem. The eligible subsystem is identified to the computation component which then executes the specified sequential arithmetic operations associated with the subsystem and returns status indications specifying the conditions that have been modified dynamically by the subsystem. The control component updates the global condition indications associated with having completed the subsystem. The cycle is then repeated until the system runs to completion.

Example Program Execution

Figure 12:
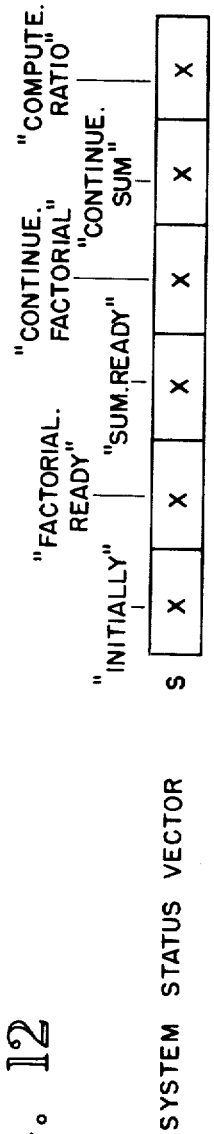
FIG. 12 is an illustration of the R, T and F matrices corresponding to solving the example program in accordance with the invention.

FIG. 12 illustrates the operation of the computational structure exemplified by the architecture model by showing appropriate values for the defined constructs of the example program of FIG. 8. The assignments of subsystems and unary predicates to rows and columns of the constructs appropriate to the example are as follows:

A. The components of the system status vector, S, defined in Appendix A, are binary status indications of the unary predicates which have been represented as flags in the example program. Thus, for the example program, the assignment of unary predicates to components of S can be made as follows: $S_1$, "Initially"; $S_2$, "Factorial.Ready"; $S_3$, "Sum.Ready"; $S_4$, "Continue.Factorial"; $S_5$, "Continue.Sum"; and $S_6$, "Compute.Ratio".

B. The relevance matrix, R, is defined in Appendix A. Each row in the R matrix is assigned to a subsystem. The assignments for the example program are as follows: Row 1, PGM 1; Row 2, PGM2; Row 3, PGM3; Row 4, PGM4; and Row 5, PGM5. Each column in the matrix is associated with a unary predicate with assignments corresponding to those for S.

C. The T and F matrices are defined in Appendix B. Each row of these matrices is associated with a subsystem with assignments corresponding to those of R. Similarly, the columns are assigned to unary predicates just as they are for R.

D. The V vector is defined in Appendix B. The binary status indicator components of V are assigned to correspond to those of S.

E. The A matrix is defined in Appendix C. The row and column assignments correspond to those of R. For the example, the values used for A correspond to $\overline{R}$ which is not necessary but sufficient to provide the needed protection for a multiple processor implementation.

Figure 13:
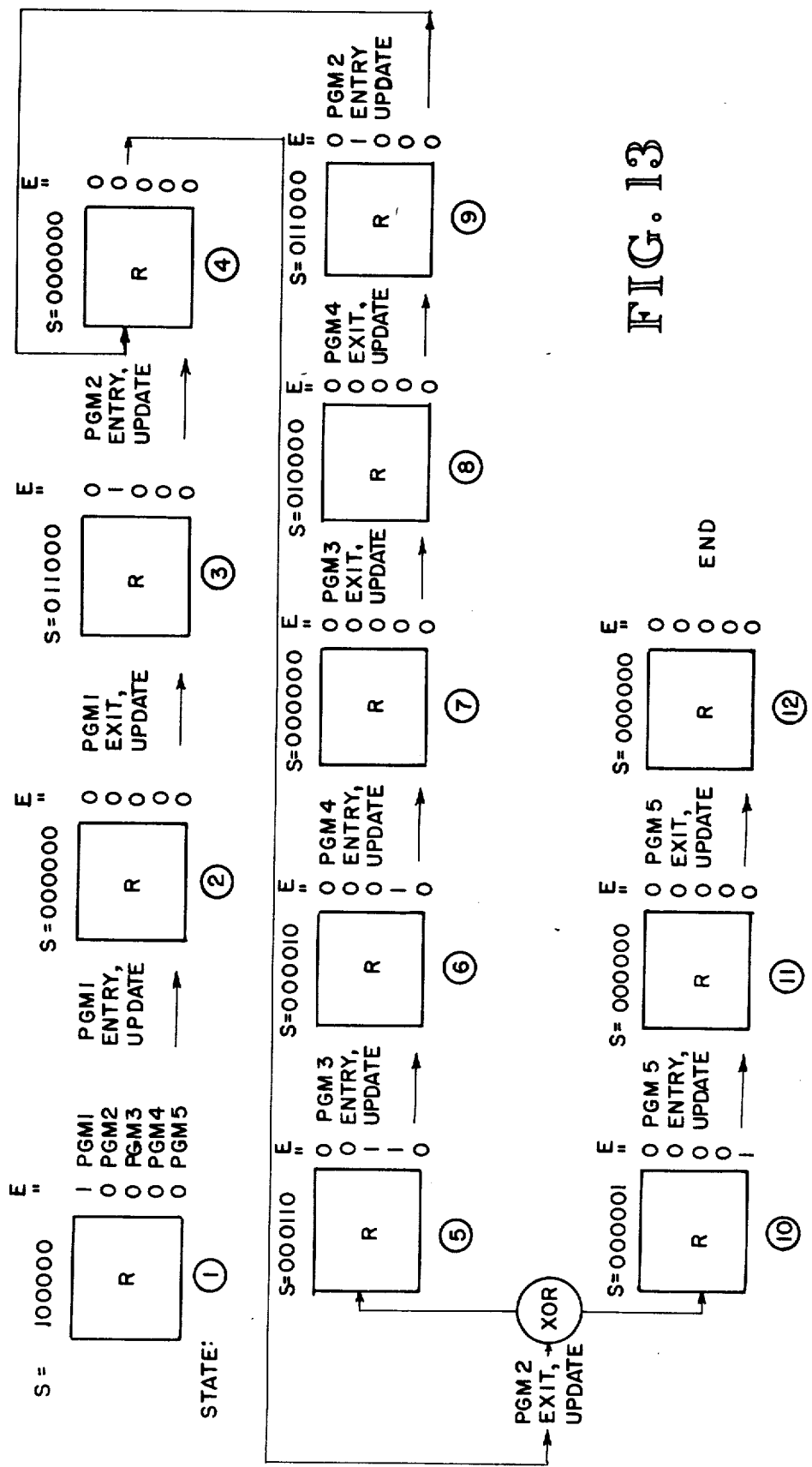
FIG. 13 is a flow diagram that shows that various system states of the data constructs during execution of the example program.

FIG. 13 is a flow diagram that shows the states of the various constructs during execution of the example program. The operations causing the various state transitions are identified above the transition arrows. Each initial state is identified by a number.

The initial S vector for the example program is $S=(1,0,0,0,0,0)$, indicating "Intially" is the only data condition currently true. By generating the dot product of the R matrix shown in FIG. 12 with the current S vector (as described in Appendix A), it is seen that only $E_1$ is non-zero at this time so that the only eligible subsystem is PGM1. An entry transition is initiated for PGM1 which is dispatched to a processor. This entry transition causes an update to the S vector (involving the A vector) which makes PGM 1 no longer eligible after entry and thereby precludes the inappropriate simultaneous execution of PGM1 in more than one processor. The system remains in this state (state 2) until PGM1 executes to complete and the appropriate exit transition is initiated at which time the system transitions to state 3. In state 3, only PGM2 is eligible. PGM2 is dispatched to the next processor requesting an activity. The appropriate entry transition is performed when PGM2 is dispatched, which puts the system in state 4 where again no subsystems are eligible. The system remains in the state 4 until PGM2 is complete, at which time the exit transition for PGM2 is initiated. On completion of the PGM2 exit transition the system will be in either state 5 or state 10. These are two states possible due to the variable (data value dependent) update returned by PGM2 as shown in FIG. 8. If the system is in state 5 then both PGM3 and PGM4 become eligible simultaneously. These two subsystems can be executed in parallel by separate processors. The state flow diagram in FIG. 13 shows PGM3 being dispatched to a processor and the system transitioning to state 6. PGM4, which is still eligible in state 6 is then dispatched to another processor and an entry transition to PGM4 is performed which puts the system in state 7. (The order in which these two subsystems are dispatched could be interchanged and the end effect would remain the same.) The system will remain in state 7 until either PGM3 or PGM4 runs to completion and the appropriate exit transition is performed. The order in which these subsystems complete is also unimportant, in that the end result will be the same in either case. The state flow diagram in FIG. 13 shows PGM3 completing first which causes the system to transition from state 7 to state 8 and then PGM4 completes which causes the system to transition from state 8 to state 9. In state 9, PGM2 becomes eligible again and the sequence is repeated. If on completion of PGM2 the system is in state 10, PGM5 becomes eligible. When PGM5 is dispatched the entry transition will put the system into state 11 and the system will remain in this state until PGM5 is completed. On completion of PGM5 the system will transition to state 12 which represents the end of the example program. No more transitions will take place until another set of constructs is loaded into the system controller.

GENERAL IMPLEMENTATION CONSIDERATIONS

To actually implement the approach described in the system overview, there are other issues which must be considered before detail design data becomes meaningful.

In relation to FIG. 1, it is apparent that the processor/system controller interface 12 must provide some synchronization mechanism to prevent multiple processors from simultaneously interacting with the system controller 10. In addition there must be provided a communication protocol between processor and system controller and the capability of specifying the type of transition (entry, exit or load) being requested by the individual processor. Provisions must also be made for external I/O and interrupt interfaces.

Ideally, the processors used in a general purpose transition machine would not be restricted to a single type. The latter considerations have been incorporated into a single coherent approach by including I/O controllers as processors of a specific type. Procedures are then designated as requiring a processor of a specific type (or type category). Then processors requesting eligible subsystems will only be provided with activities compatible with the type of requesting processor.

The designation of an assigned subsystem must be provided to the processor. This could be provided in various ways, but an index to the row in the matrices is all that is absolutely essential. Preferably, read, write and execute authorizations associated with an eligible subsystem are provided to the processor by the system controller rather than being obtained by indexed accesses by the processor to the main memory. This latter approach, however, is also possible.

The system status vector update requires a dynamically updated condition status vector (V) returned by the processor upon completion of subsystems. T and F could also be stored in the processor's main memory along with the access authorizations, but in the preferred implementation they are maintained in the system controller.

Figure 14:
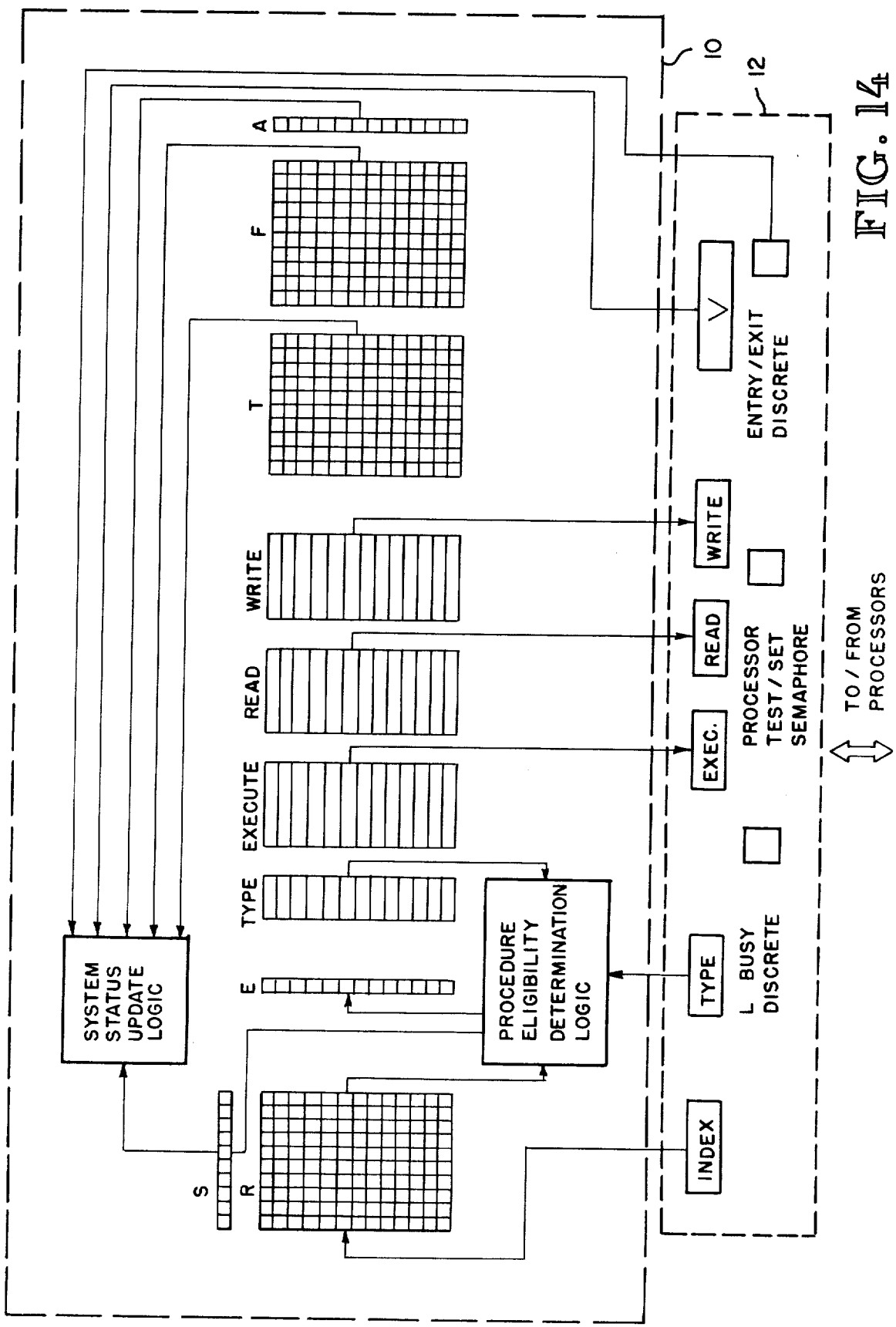
FIG. 14 is a block diagram illustrating the data constructs of the transition machine together with basic elements of the interface in accordance with the teachings of the invention.

FIG. 14 shows a block diagram of the preferred embodiment of the data constructs which address the implementation considerations described above and are maintained in the System Controller 10. The registers which comprise the processor/System Controller interface 12 are also shown. The processor/System Controller interface 12 contains all the data and control registers accessible by the processor. The structure and use of these registers are set forth in the following Table II.

TABLE II

| Descriptor | Definition |
|---|---|
| P/P | - a binary semaphore used to prevent multiple processors from accessing the processor/system controller interface registers simultaneously. The P/P semaphore is set (using a traditional test and set capability) when a processor is accessing the processor/system controller interface registers and it is cleared when no processor is currently accessing the interface registers. |
| L | - a binary status indicator used to prevent the processors from accessing the system controller interface registers while a system transition is in progress. When a processor initiates a system transition, it loads the appropriate data values in the X, INDEX, TYPE, and V registers (to be described) and sets the L discrete true. This requests execution of the System Controller which resets the L discrete false when the required transition is completed. |
| X | - a binary status indication used to notify the System Controller of the type of system transition to effect. The X flag is set true by the processor when the system transition required is the result of a subsystem exiting, and X is set false by the processor for a subsystem entry transition. |
| TYPE | - a register used to contain the processor type indentification. The System Controller uses this register to determine the next eligible subsystem whose identification is to be loaded into INDEX. TYPE is loaded by a processor with its processor category when it requests the next subsystem eligible for execution. The System Controller then returns the EXECUTE, READ, WRITE, and INDEX values associated with the next eligible subsystem, whose type is of the same category as the value contained in the TYPE register. (This construct is required if a processor is to be able to request a specific type of subsystem.) |
| INDEX | - a register used to contain the identification of either the next eligible subsystem or the subsystem currently being exited. At the completion of each system entry transition, the System Controller loads INDEX with the index of (the number of the row in the matrices associated with) the next eligible subsystem whose type is of the same category as the value contained in the TYPE register. INDEX is loaded by the |

TABLE II-continued

| Descriptor | Definition |
|---|---|
| | System Controller with a special indicator if no subsystems for the current processor type are eligible. When a subsystem exits, INDEX contains the associated subsystem identification, i.e. the number of the row in the control matrices associated with the subsystem. |
| EXECUTE | - provides the entry point of the subsystem whose identification is in INDEX. This register is loaded only by the System Controller and is read by the processors. |
| V | - provides the variable update vector loaded by the processors upon completion of a subsystem. This vector allows a subsystem to return variable data conditions to the system status vector. |
| READ | - provides the pointer(s) to the global data item(s) accessible to the associated subsystem in a read capacity. READ is loaded by the System Controller during an entry transition and is unused during an exit transition. |
| WRITE | - provides the pointer(s) to the global data item(s) accessible to the associated subsystem in a write capacity. WRITE is loaded by the System Controller during an entry transition and is unused during an exit transition. |

It should be noted that in the detail design of the multiprocessor embodiment, an implementation is set forth wherein a multiport controller is used to prevent simultaneous access to the System Controller. In this case, the processors are not required to perform synchronization functions as these functions are performed by the multiport controller. The requirement of a binary semaphore is therefore removed from the processors in this detailed design.

It is further noted that the A vector conveniently takes the form of an A matrix for the specific implementation shown in FIG. 14 and defined in Appendix C.

System Controller Functional Operation—General Description

Figure 15:
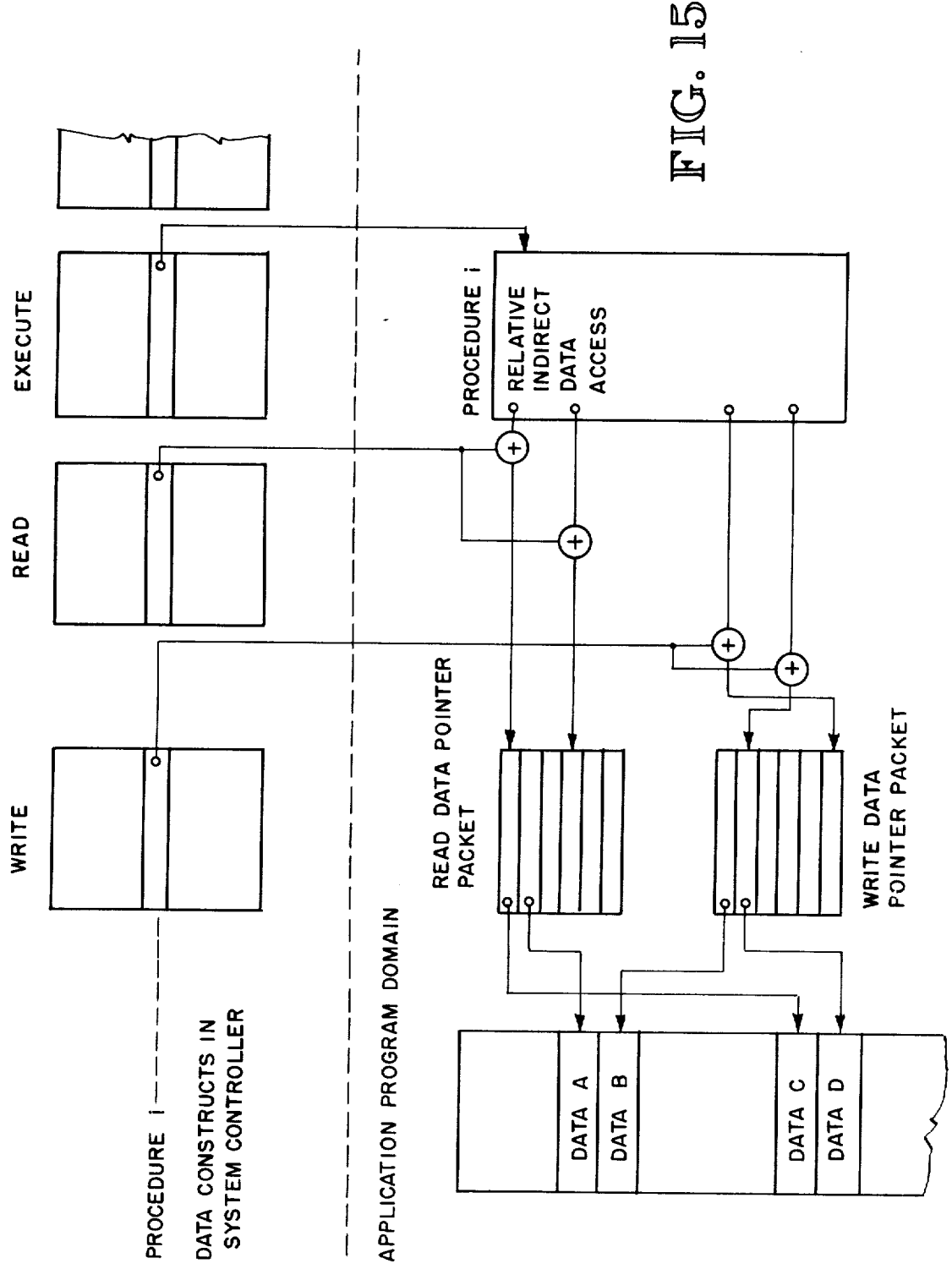
FIG. 15 illustrates a block diagram of the read, write and execute functions in accordance with the invention.
Figure 16:
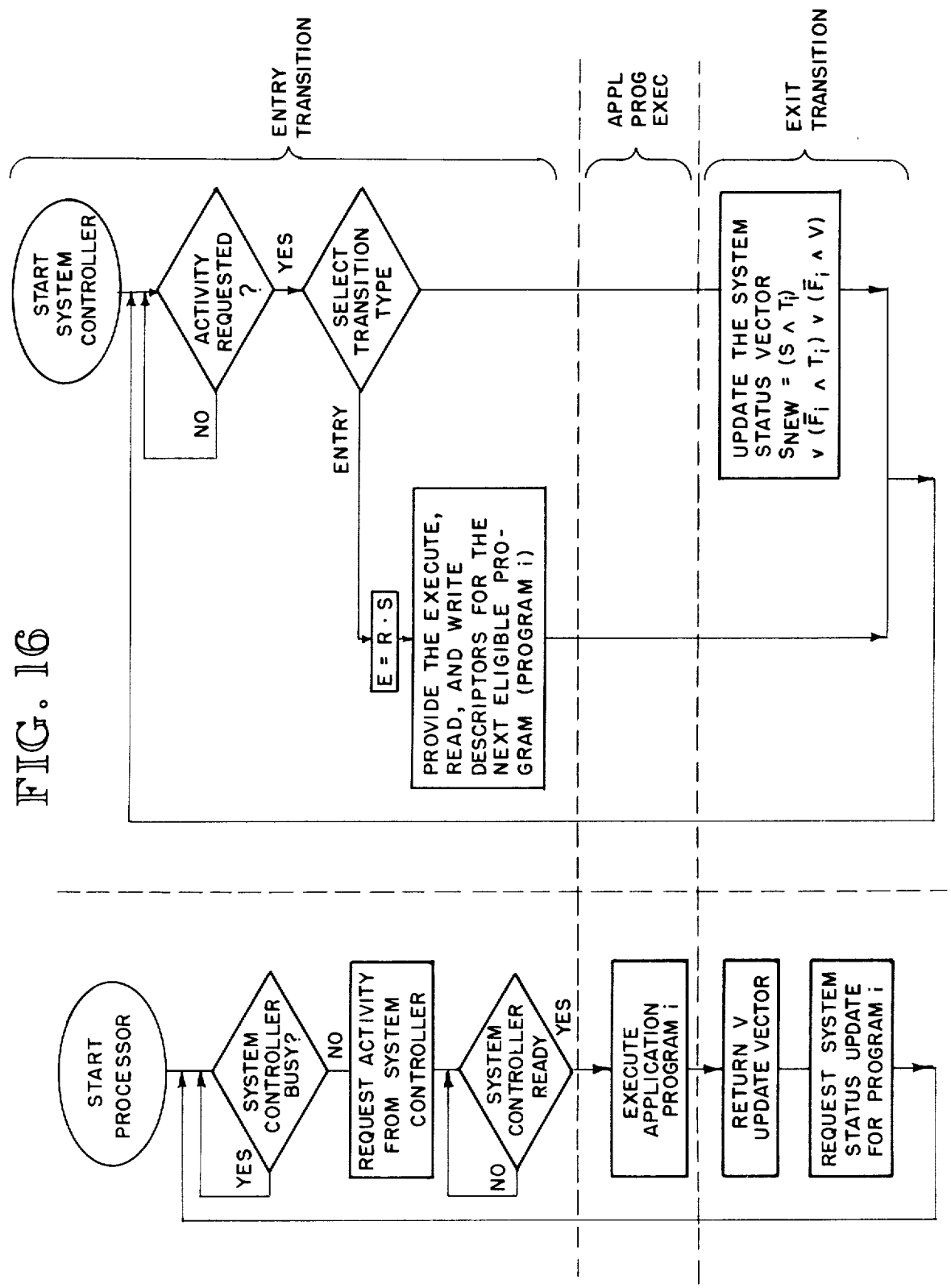
FIG. 16 shows a flow chart for the operation of a data processor and the system controller during various modes of operation of the transition machine.

A functional description of the interaction of the System Controller 10, the interface 12 and processors 2 is now set forth in reference to FIGS. 14–16.

The processor capabilities are limited to:
(1) requesting the System Controller to provide a subsystem to be executed;
(2) executing the subsystem,
(3) notifying the System Controller that the subsystem has been completed,
(4) updating variable data condition status indications for which the processor is authorized, and
(5) loading the System Controller data arrays.

Furthermore, all inter-subsystem communication is controlled by the System Controller.

When a processor is in an idle state requesting an activity, it performs a test-and-set operation on the P/P semaphore. This semaphore is used to synchronize the processors so that only one processor is accessing the system controller registers contemporaneously. After gaining access to the System Controller it waits until the logic segment of the System Controller is not busy. At that time it stores its processor type identification into the register, TYPE. The register X is set false to indicate a subsystem entry is being requested. The L discrete is set true to signal the System Controller logic to initiate a transition. The processor will then wait until the System Controller logic has completed its operation (indicated by the L discrete being reset).

When the System Controller detects that a transition is to be initiated (by the L discrete having been set true), it will determine whether the entry or exit transition has been specified. If the entry transition is specified (indicated by X=false), the matrix logical dot product if performed to obtain the next eligible subsystem of a type compatible with the processor TYPE register. If such an eligible subsystem is determined, its index is stored in the INDEX register, the subsystem access pointer is stored in the register EXECUTE, and the data access pointers are stored in READ and WRITE registers. The active protection specification for the subsystem (the A vector) is used to update the system status vector to preclude inappropriate simultaneous execution of the same subsystem by another processor. (If no eligible subsystem exists for the processor, this will be indicated by returning a null INDEX register.) Then access authorization is returned to the processor by resetting the L discrete false.

When the processor detects that transition authorization has been given (by L discrete being reset false and INDEX register containing a non-null value), the following sequence is performed: the INDEX register value is saved, the READ and WRITE registers are obtained to set up the data access linkages, and the EXECUTE register is obtained to set up control linkages. The P/P semaphore is reset to allow other processors access to the System Controller interface registers. Control is passed to the specified subsystem. The subsystem may, in addition to whatever data processing activities are appropriate to it, modify a V register in the processor.

When a subsystem exits, the processor performs a test-and-set operation on the P/P semaphore. After gaining access to the System Controller it waits until the logic segment of the System Controller is not busy. At that time the exiting subsystem's identification is loaded into the INDEX register, the processor copies its own V register into the V register of the System Controller interface, and sets the register X true to indicate a subsystem is being exited. The processor will then activate the System Controller logic by setting the L discrete register true, set itself into an entry request mode, and finally reset the P/P semaphore to allow other processors access to the system controller interface registers.

When the System Controller detects that a transition is to be initiated (by the L register having been set true), it determines whether the entry or exit transition has been specified. If the exit transition is specified, the value in the INDEX register is used to index into the data constructs, providing the A, T and F values to incorporate the change in the system status vector caused by the exited subsystem. The V register is also accessed to perform this update. When the status update is complete the System Controller indicates its readiness to honor further requests by resetting the L discrete false.

It is to be noted that the TYPE register may be used to identify the various types of processors requesting access to the System Controller so that a subsystem i will not be eligible for execution by the requesting processor unless the processor is of the proper type for carrying out the i$^{th}$ subsystem. In this manner special processors can be incorporated which are endowed with unique capabilities e.g., floating point processors, vector instruction set processors, byte or word oriented processors, I/O processors, or specific model processors as desired.

Interrupts

Figure 17:
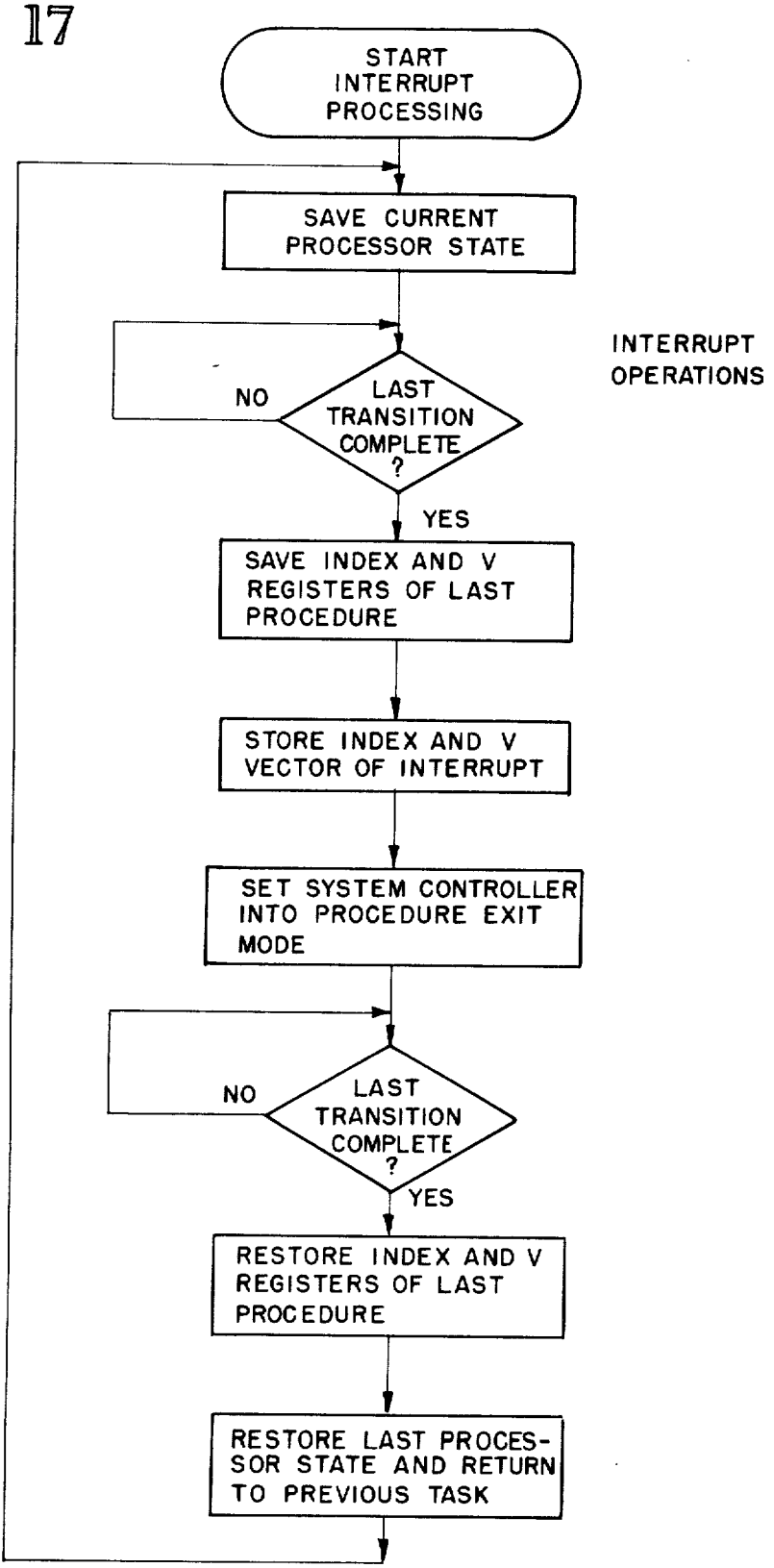
FIG. 17 is a flow chart illustrating the interrupt operation in accordance with the invention.

As in most current computing systems, an interrupt facility may be incorporated into the transition machine. One approach to incorporating interrupts is to allocate one row in the System Controller's data constructs to a null task, which has an R vector of all zeros (i.e., the row will never become eligible on the basis of internal conditions), and T anf F vectors that mask out all non-interrupt bits of the V register update. In other words, all the interrupt related elements of the S vector may be set variably by the interrupt procedure. When the interrupt occurs, the processor will first save the current processor state (program counter, processor status word, etc.) so on completion of the interrupt handling, the processor can return to the previous task. After saving the processor state it will then wait until the logic segment of the System Controller is not busy (indicated by the L discrete being set false). At that time the interrupt procedure in the processor will save the current values of the INDEX and V register and overstore the INDEX register with the index of the System Controller interrupt data constructs row. The interrupt procedure in the processor will then load values associated with the specific interrupt that has occurred into the V register, and initiate an exit transition by setting the System Controller exit mode (i.e., X=true, I=false, and L=true). The interrupt procedure in the processor will then wait until the exit transition has been completed by the System Controller (indicated by the L discrete being reset), will restore the INDEX and V registers with the previously saved values, restore the previous processor state (program counter, etc.) and will return to the interrupted activity. This entire sequence is completely transparent to the interrupted program. The utilization of short execution time subsystems will generally allow adequate time for interrupt processing. A flow diagram of the interrupt handling is shown in FIG. 17.

The implementation of interrupts described above is analogous to conventional approaches, and even uses the conventional interrupt interface of conventional processors to accommodate stacking, prioritization, etc. A more direct method is to tie the interrupt lines directly to the System Controller. A unique condition in the system status register S is then allocated to the interrupt. A preempting interrupt generated by the processor/system controller interface is then used to push the processors current state onto a stack and allow subsystems of lesser index (higher priority) to commandeer control of processors involved in lower priority subsystem execution.

DETAIL IMPLEMENTATION

Figure 18:
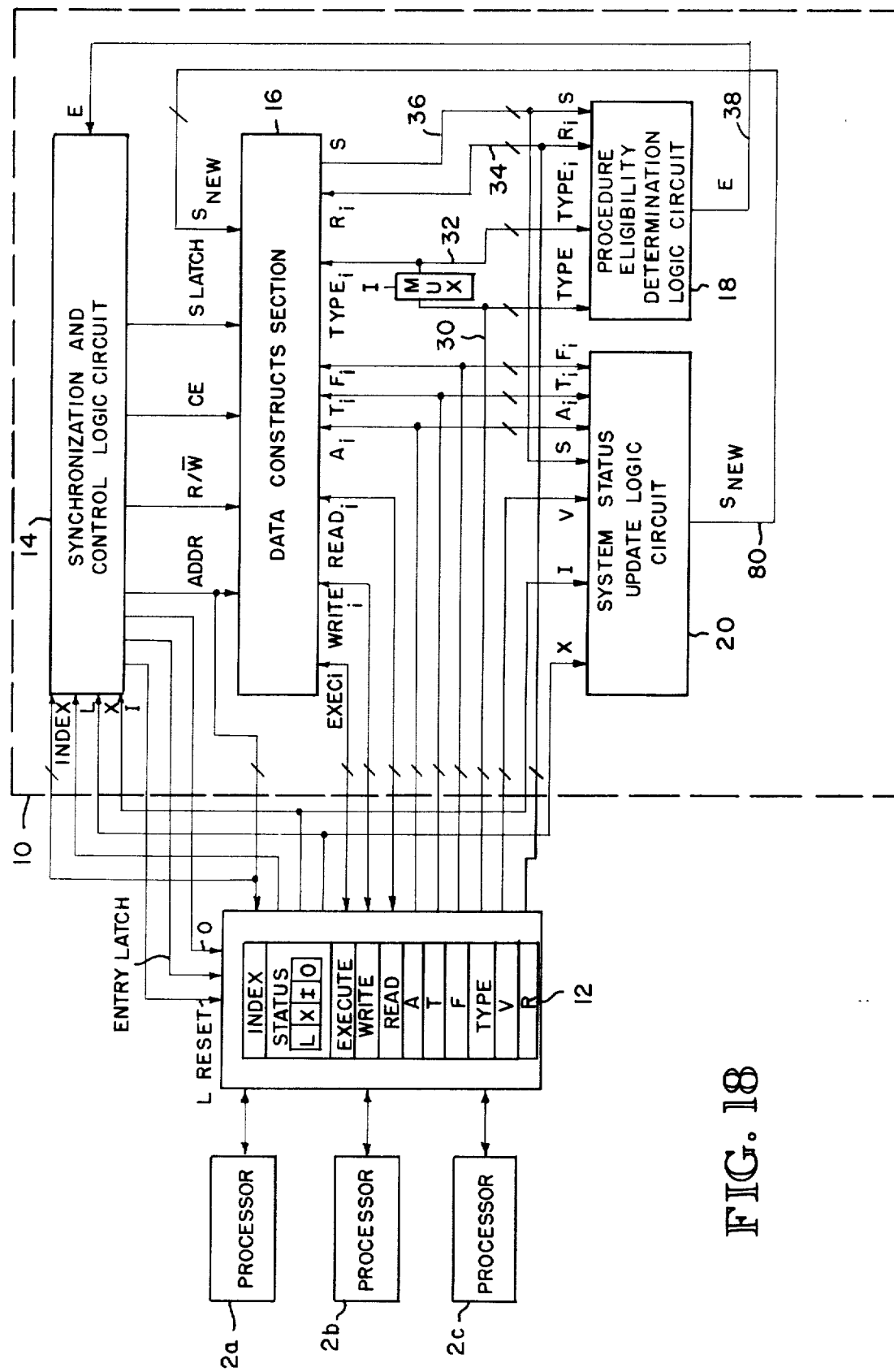
FIG. 18 is an overall block diagram of the major components of the transition machine structure in accordance with the invention.

FIG. 18 illustrates the overall design of a specific implementation of the System Controller 10 and interface 12 of the transition machine 1 in accordance with the invention. The System Controller 10 is seen to comprise a synchronization and control logic circuit 14, a data constructs section 16 (similar to that of FIG. 14), a procedure eligibility determination logic circuit 18 and a system status update logic circuit 20. FIG. 18 also shows the interconnection of each of these major circuit blocks with each other and with the processor/System Controller interface 12.

The organization and operation of the logic required to load the System Controller memory (data constructs section) effects the design and operation of the rest of the System Controller. There are many alternate ways the load function may be incorporated in the System Controller design, for instance, non-volatile memory (ROM, PROM, etc.) could be used in the data constructs section which would then have to be loaded while not physically connected to the System Controller, or DMA capabilities could be designed into the System Controller to allow the System Controller to load its memory from the multiprocessor main memory. In view of the different design alternatives, the specific implementation set forth herein is given by way of example and not by way of limitations.

The organization and operation of the logic required to generate the "dot" product of the R matrix and the S vector has a significant effect on the design and operation of the System Controller 10. There are many alternate ways the "dot" product may be generated, for instance, each element of the R matrix could be stored in a separate memory register. Each of these registers could be accessed in parallel so with sufficient combinational logic, each element of the eligibility vector could be computed in parallel. This implementation would require a large number of hardware components but would result in a very high speed System Controller. Another alternate implementation would be to use content addressable memories (associative memories) in which to store the R matrix and the TYPE array. Associative memories would allow each component of the eligibility vector to be computed in parallel which would again result in a very high speed System Controller but one which requires a large amount of hardware. Again, in view of the different design alternatives, the specific implementation set forth herein is given by way of example and not by way of limitations.

Processor/System Controller Interface

As shown in FIG. 18, the processor/System Controller interface 12 consists of a number of data and control registers accessible to both the processor and the System Controller. The structure and use of these registers are set forth in the following Table III. Some of these registers were previously described in the general description and are also included in Table II. The description in Table III gives a more detailed description of their structure and use.

TABLE III

| Descriptor | Definition |
| --- | --- |
| STATUS | - a 4-bit read/write register whose bits are labeled L, I, X and O, and which contain the following synchronization, protocol and mode request information: |
| L | - a binary status indicator used to prevent the processors from accessing the System Controller interface registers while a subsystem transition is in progress. When a processor requests a system transition, it loads the appropriate data values in the X, INDEX, TYPE and V registers and sets the L discrete true. This requests execution of the System Controller which resets the L discrete (sets it false) when the required transition is completed. |
| I | - a binary status indicator used to indicate to the System Controller whether a normal or load transition is being requested. The I flag is set true |

TABLE III-continued

| Descriptor | Definition |
|---|---|
| | by the processor when the system transition required is a load transition. The I bit remains true until the processor resets it upon load completion. |
| X | - a binary status indicator used to indicate to the System Controller whether an entry or exit system transition is requested. The X flag is set true by the processor when the system transition required is the result of a subsystem exiting, and X is set false by the processor for a subsystem entry transition. During a load transition X is ignored. |
| O | - a binary status indicator set by the System Controller to notify the processor that no subsystem is currently eligible. The O bit is set true by the System Controller when an entry transition results in no eligible subsystem. The O bit is set false by the System Controller when an entry transition results in an eligible subsystem. The O bit is ignored on exit and load transitions. |
| TYPE | - a register used to contain the processor type identification. The System Controller uses this register to select the next eligible subsystem appropriate to the requesting processors. TYPE is fixed for a given processor with its processor category. During entry transitions the System Controller returns the EXECUTE, READ, WRITE, and INDEX values associated with an eligible subsystem, whose type is of the same category as the value contained in the TYPE register. TYPE is ignored during a subsystem exit transition. During a load transition TYPE is loaded by the processor with the processor category required by the subsystem whose row of data constructs is being loaded into the System Controller. |
| INDEX | - a register used to contain the identification of either the next eligible subsystem, the row currently being loaded, or the subsystem currently being exited depending upon the type of transition being requested. At the completion of each subsystem entry transition, the System Controller loads INDEX with the index of the next eligible subsystem whose type is of the same category as the value contained in the TYPE register for the processor. During a load transition, INDEX is loaded by the processor with the System Controller row number for the row of constructs currently being loaded. When a subsystem exit transition is requested, INDEX will contain the subsystem identification provided to it by the System Controller at completion of the entry transition. Processor interrupts are forwarded to the System Controller by an exit transition using an INDEX value dedicated in the System Controller for that purpose. |
| EXECUTE | - a register used to provide the entry point of the subsystem whose identification is in INDEX. This register is loaded by the System Controller and is read by the processors during subsystem entry transitions. EXECUTE is loaded by the processor and read by the System Controller during a load transition. During exit transitions EXECUTE is unused. |
| READ | - a register used to provide the pointer(s) to the global data item(s) accessible to the associated subsystem in a read capacity. READ is loaded by the System Controller during an entry transition and is loaded by the processor during a load transition. READ is unused during an exit transition. |
| WRITE | - a register which provides the pointer(s) to the global data item(s) accessible to the associated subsystem in a write capacity. WRITE is loaded by the System Controller during an entry transition and is loaded by the processor during a load transition. WRITE is unused during an exit transition. |
| V | - a register used to provide the variable update vector loaded by the processors upon completion of a subsystem. This vector allows a subsystem to return variable data conditions to the system status vector. (For the specific implementation described in the appendices, this allows the subsystem to modify only selected data elements of the S vector since any attempt to modify unauthorized elements will be masked out by the T and F vectors, stored internally to the System Controller.) During a load transition V is loaded by the processor with the new S vector to be loaded in the S register. V is unused during an entry transition. |
| R | - a register which provides a method for the processor to load the R matrix of the System Controller. During load transitions the R register contains the vector to be loaded in the row of the System Controller's R matrix specified by INDEX. The R register is unused during entry and exit transitions. |
| A | - a register which provides a method for the processor to load the System Controller A matrix. During load transition the A register contains the vector to be loaded in the row of the System Controller's A matrix specified by INDEX. The A register is unused during entry and exit transitions. |
| T | - a register used to provide a method for the processor to load the System Controller T matrix. During load transitions the T register contains the vector to be loaded in the row of the System Controller's T matrix specified by INDEX. The T register is unused during entry and exit transitions. |
| F | - a register which provides a method for the processor to load the System Controller's F matrix. During load transitions the F register contains the vector to be loaded in the row of the System Controller's F matrix specified by INDEX. The F register is unused during entry and exit transitions. |

For each System Controller there is one set of interface data and control registers as described above. To insure proper operation of the System Controller, no processor may modify these registers while the System Controller is active (i.e., if the L bit in the STATUS register is true). The processors also must be synchronized so that only one processor modifies these registers at a time. This can be accommodated in various ways, for example, a binary semaphore can be employed to avoid the critical section problem and synchronize the processors (as described in the General Implementation Considerations). Alternatively, a multiport organization can be employed where each processor has a dedicated set of interface registers and a multiport controller resolves multiple processor access contention. The multiport controller performs the actual data transfer between the dedicated processor interface registers and the actual system controller registers (similar to the operation of a multiport memory controller). Because of this the processor interface procedures do not require synchronization precautions. The multiport controller implementation therefore accommodates a simpler interface description, and is utilized in the following description.

Figure 19:
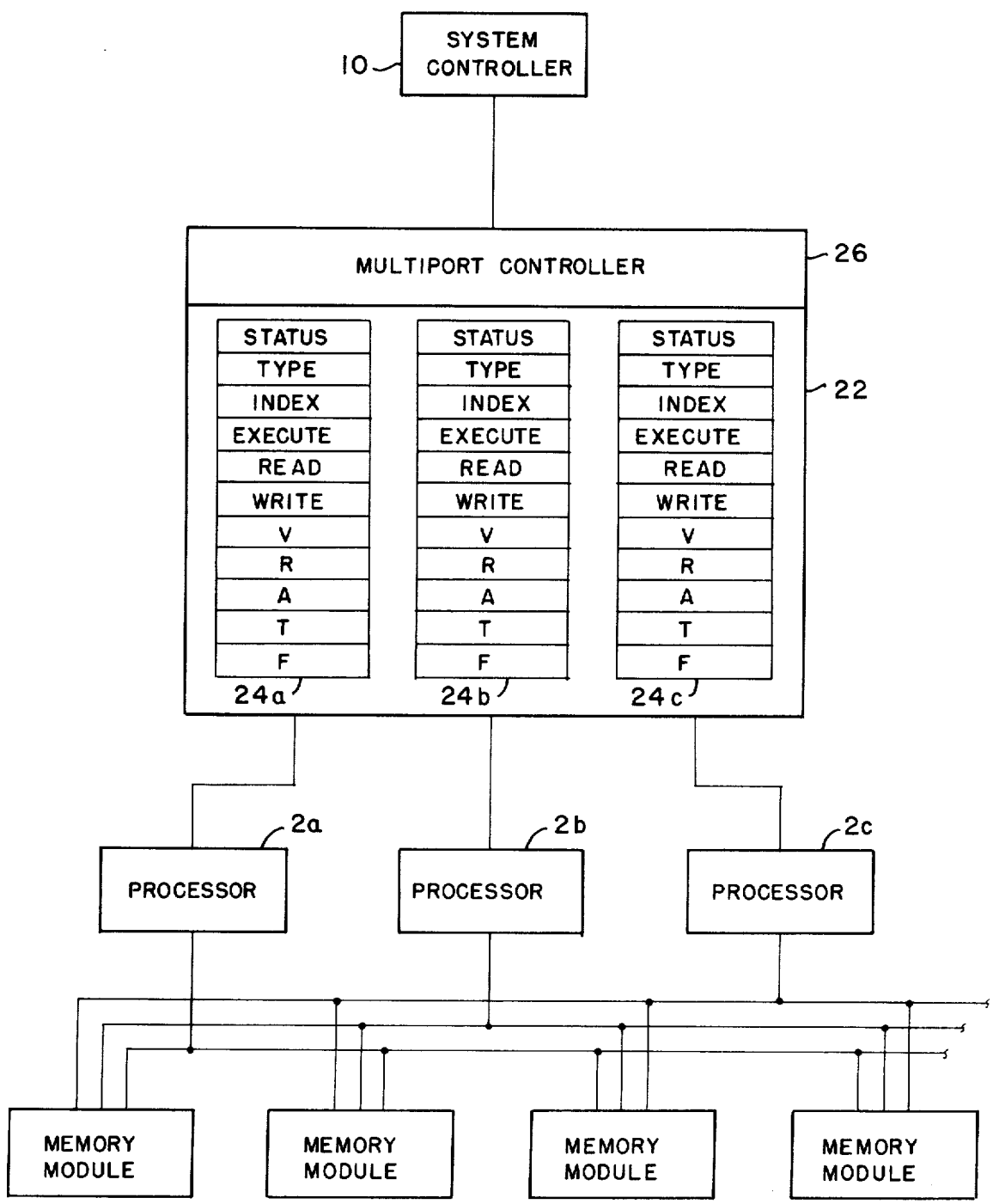
FIG. 19 is a block diagram of the multiport control aspect forming one embodiment of the transition machine.
Figure 20:
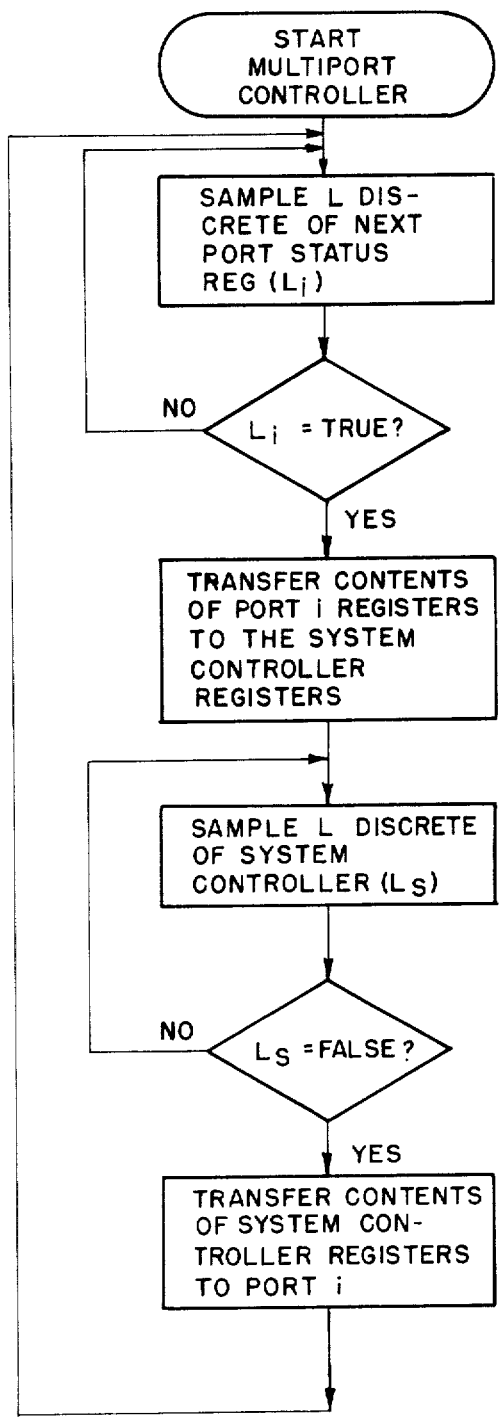
FIG. 20 is a flow chart of the operation of the multiport control system of FIG. 19.

A multiport controller 26 is utilized for the processor/system controller interface 12, as shown in FIG. 19. Each processor 2 has a dedicated set of interface registers 24. The multiport controller 26 selects and synchronizes the actual data transfer between the System Controller 10 and the dedicated processor interface registers 24. An operational logic flowchart of the multiport controller 26 is shown in FIG. 20. The actual interface implementation is transparent to both the processor and the System Controller, so functionally the processor and System Controller are interfaced directly to each other without the requirement for a P/P semaphore.

System Controller Functional Operation Detailed Description

There are basically three types of allowed processor/System Controller interactions, namely entry, exit, and load transitions. For each type of interaction specific processor actions and System Controller responses are described below:

Entry Transition

When a processor is in an idle state requesting an activity, it will first wait until the logic segment of the System Controller is not busy which is indicated by the L bit in the STATUS register being set false. At that time it will store its processor type identification into the register, TYPE (if not previously initialized). The X bit in the STATUS register will be set false to indicate a procedure entry is being requested and the L discrete in the STATUS register will be set true to signal the System Controller to initiate a transition. The processor will then wait until the System Controller has completed its operation which is indicated by the L discrete in the STATUS register being reset false by the System Controller.

When the System Controller detects that a transition is to be initiated (by the L bit in the STATUS register having been set), it will determine whether the entry, exit, or load transition has been specified. If the entry transition is specified, the matrix dot product is performed with the S vector and the R matrix to obtain the next eligible procedure of a type compatible with the processor TYPE register. If such an eligible procedure is determined, its index is stored in the INDEX register, the procedure access pointer is stored in the register EXECUTE, and the data access pointer is stored in the registers READ and WRITE. The active protection specification for the procedure (the A vector) is used to update the system status vector to preclude inappropriate simultaneous execution of the same procedure in another processor. If no eligible procedure exists for the processor, the System Controller will set the 0 bit in the STATUS register true. In this case the system status vector remains unchanged. Access authorization to the interface registers is returned to the processor by resetting the L discrete in the STATUS register.

When the processor detects that access authorization has been given by the L bit of the STATUS register being set false, it first checks to see if any procedures are eligible. This is accomplished by examining the 0 bit in the status register. If the 0 bit is true, indicating no procedures are currently eligible, the processor puts itself into procedure entry mode and reinitiates the entry sequence. If the 0 bit is false, indicating a procedure is eligible the READ and WRITE registers are obtained to set up the data access linkages, and the EXECUTE register is obtained to set up control linkages. Control is passed to the specified procedure using the EXECUTE register value. The procedure may (in addition to whatever data processing activities are appropriate to it) computer a V register value.

Exit Transition

When a procedure exits, the processor will copy its V register value into the V register of the System Controller, and set the exit discrete, X in the STATUS register true to indicate a procedure is being exited. The processor will then activate the System Controller by setting the L discrete in the STATUS register true, and set itself into an entry request mode.

When the System Controller detects that a transition is to be initiated (by the L discrete in the STATUS register having been set), it will determine whether the entry, exit, or load transition has been specified. If the exit transition is specified, the value in the INDEX register is used to index into the data constructs, providing the data to incorporate the change in the system status vector caused by the exit procedure. The V register is accessed to perform this update. Then the System Controller indicates its readiness to honor further requests by resetting the L discrete in the STATUS register.

Load Transition

When a load transition is initiated under software control, the processor will first wait until the logic segment of the System Controller is not busy (indicated by the L discrete in STATUS being set false). At that time the processor will store in the INDEX register the number of the row in the System Controller matrices which is to be loaded. The data to be loaded into each of the EXECUTE, READ, WRITE, TYPE, R, T, F, and A matices will be placed into the corresponding interface registers and the initial S vector will be placed in the V register. The load procedure is essentially an application program that transfers the System Controller data constructs from processor main memory to the System Controller. The processor sets the I discrete in the STATUS register true to indicate a load transition is being initiated and then activates the System Controller logic by setting the L discrete true in the STATUS register. The processor then resets itself into any one of the transition modes, entry, exit, or load depending on which transition is required. (It should be noted that the load procedure assumes there are no entry or exit transitions being performed for other processors. This can be guaranteed by assuming a load procedure is entered as the last eligible activity in the data constructs, when all processors are idle. Initializing S=0 will guarantee this status until load complete, at which time the initial S vector is passed).

Figure 21:
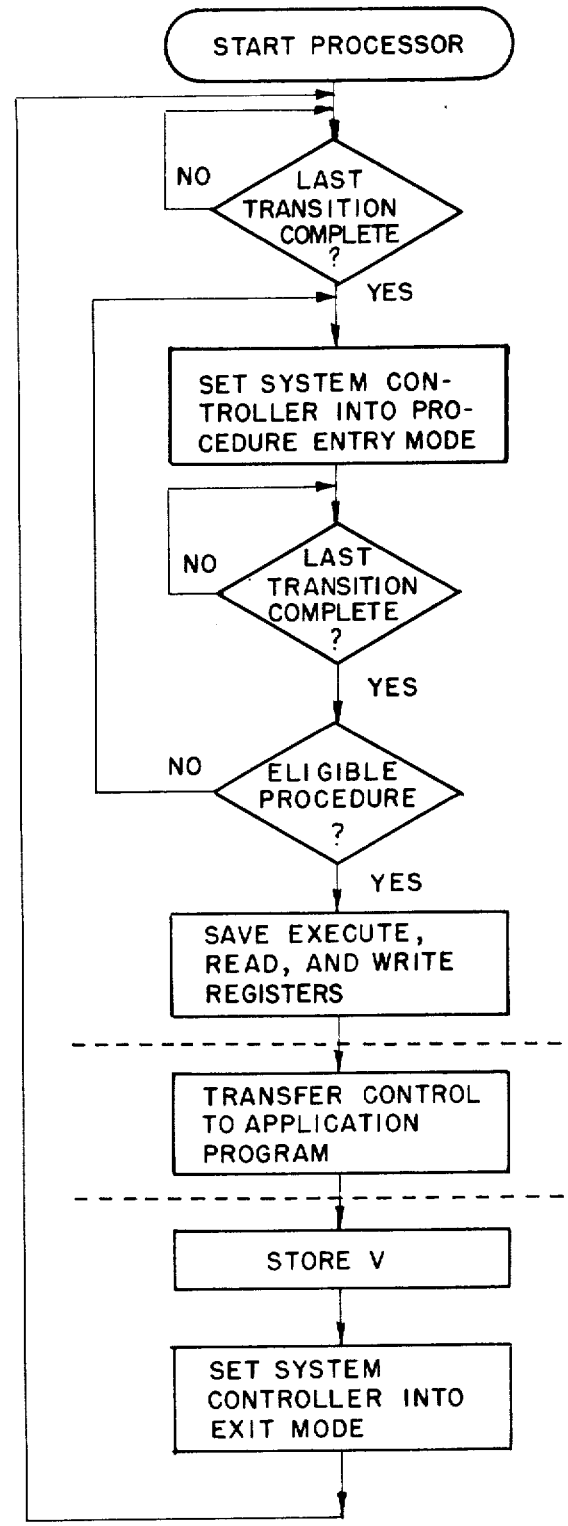
FIG. 21 is a flow chart showing the processor entry and exit operations in accordance with the invention.
Figure 22:
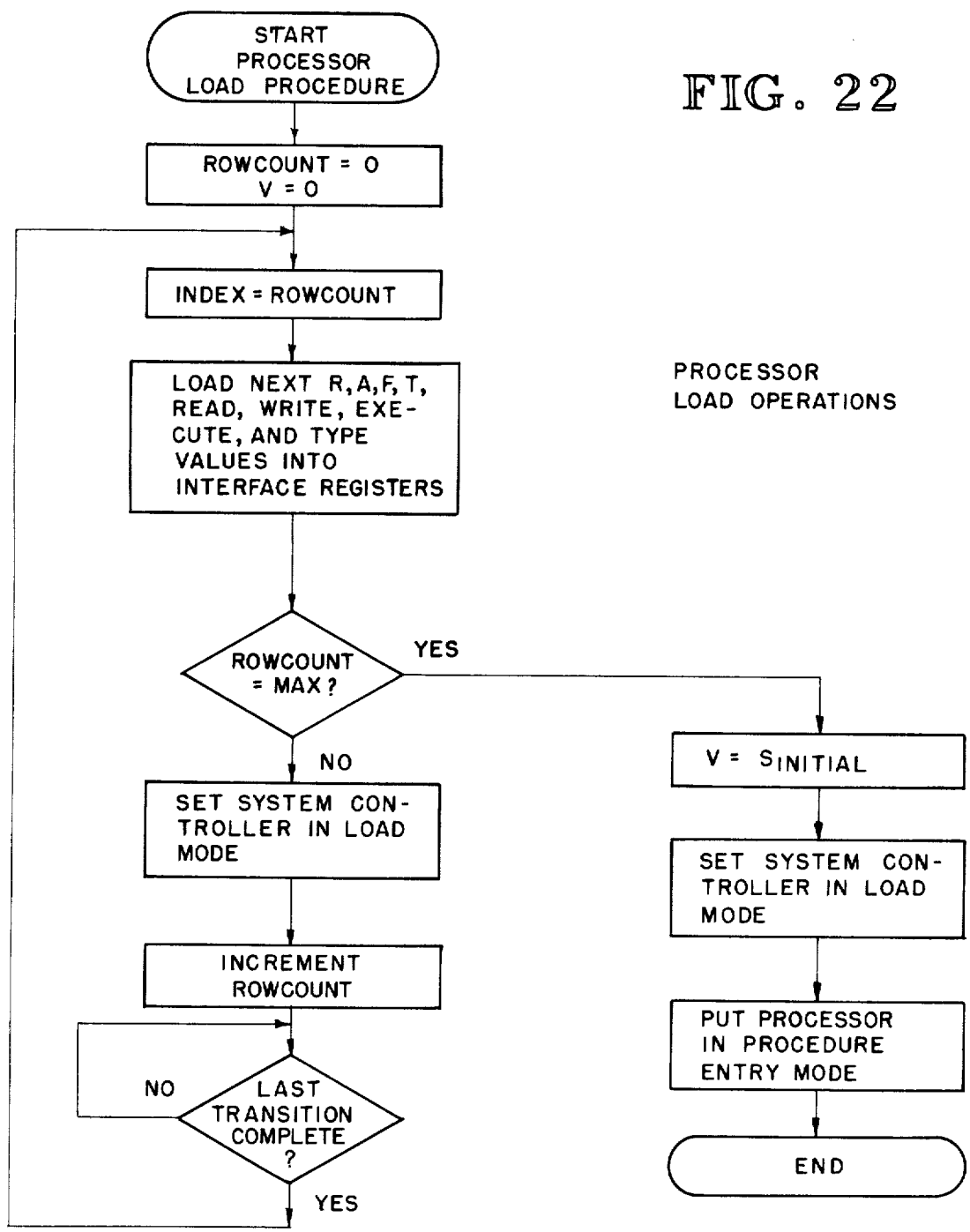
FIG. 22 is a flow chart showing the processor load operations in accordance with the invention.
Figure 23:
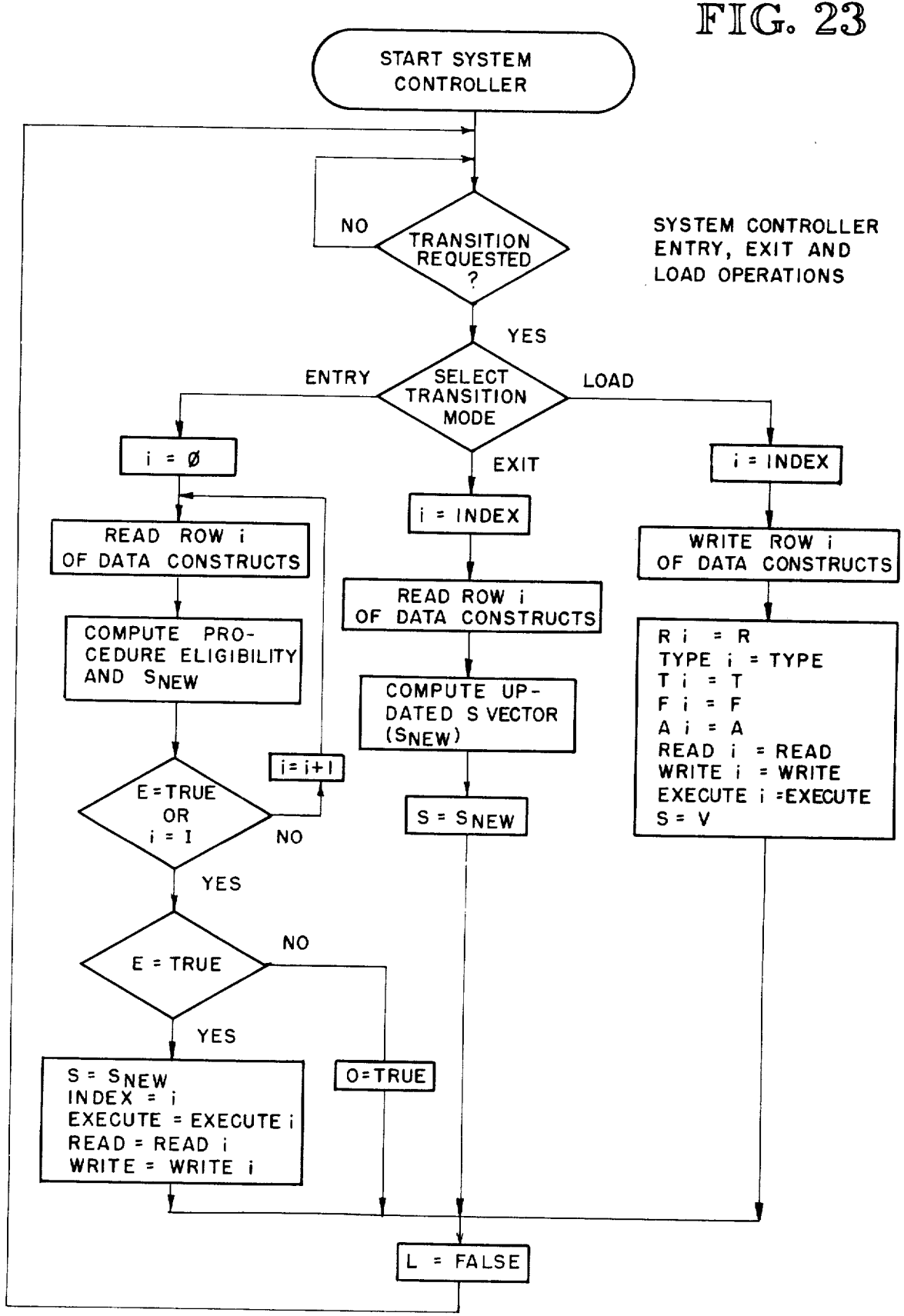
FIG. 23 is a flow chart showing the system controller entry, exit and load operations in accordance with the invention.

FIG. 21 represents a processor operational flowchart for each of the entry and exit transitions, and FIG. 22 is the processor operational flowchart for a load transition. FIG. 23 represents the System Controller operational flowchart including the entry, exit, and load transitions.

SYSTEM CONTROLLER DETAILED COMPONENT DESIGN

As shown in FIG. 18, the System Controller 10 is comprised of a synchronization and control logic circuit 14, a data constructs section 16, a procedure eligibility determination logic circuit 18, and a system status update logic circuit 20. A specific detailed design for each of these four components is described below:

Data Constructs

As shown in FIG. 24, the data constructs section 16 of the System Controller 10 contains the System Controller memory. The memory may comprise eight random access memory modules, one for each of the R, A, F, T, TYPE, EXECUTE, READ, and WRITE arrays. Each of these arrays contain the same number of elements and are addressed concurrently. Each element (row) of the R, A, F, and T arrays contain the same number of bits, which is equal to the number in the system status register. Depending on the machine application and the organization of the System Controller memory load logic, these memories can be either read only (ROM, PROM, etc.) or read/write. For purposes of illustration, read/write memories are utilized which are loaded by the processor. In addition to the data arrays described above the data constructs section 16 also contains a read/write register called the S register, in which the system status vector, S, is stored.

There are a total of 14 inputs and outputs for the data constructs section 16 each of which is described in the following Table IV.

TABLE IV

|  | Definition |
| --- | --- |
| ADDRESS | - a multiple bit address bus that is capable of addressing each element of the R, A, T, F, TYPE, READ, WRITE, and EXECUTE arrays. The arrays are addressed concurrently, e.g., if ADDRESS = 2 then the second element of each array is addressed. |
| CE | - a one bit signal that enables the eight memory modules to be read or written. When CE is true (i.e., logical 1) the contents of each array element indicated by ADDRESS is read (R/W = "1") or written (R/W = "0") to or from the associated data bus. When CE is false (i.e., logical "0") no array can be read or written. |
| $\overline{R/W}$ | - a one bit signal input to each of the eight memory modules that specify a read or write action. When R/W is true (i.e., logical "1") and CE is true (i.e., logical "1") the contents of the array element indicated by ADDRESS is output on the corresponding data bus. When R/W is false (i.e., logical "0") and CE is true (i.e, logical "1") the contents of each data bus is written into the associated array element specified by ADDRESS. |
| $S_{NEW}$ | - a multibit data input to the read/write S register. $S_{NEW}$ contains the updated status vector returned by the system status update logic as the result of an entry, exit or load transition. |
| $S_{LATCH}$ | - a control signal which, when enabled (transitions from logical "0" to logical "1"), causes the contents of $S_{NEW}$ data input to be latched into the S register. When $S_{LATCH}$ is disabled (logical "0") the contents of the S register remain unchanged independent of changes in $S_{NEW}$. |
| $R_i$ $T_i$ $F_i$ $A_i$ $EXECUTE_i$ $READ_i$ $WRITE_i$ $TYPE_i$ | - multiple bit, bidirectional data buses. Data from each of the eight memory modules are output to (or input from) the associated data buses. |
| S | - a multiple bit data bus on which the content of the S register is output. |

Procedure Eligibility Determination Logic

The procedure eligibility determination logic circuit 18 is contained within the System Controller 10 and contains the combinational logic necessary to determine procedure eligibility during entry transitions. A subsystem is eligible if the type of processor making the request (content of the TYPE interface register) is equivalent to the processor type required by the selected subsystem (content of the $TYPE_i$ data bus) and all data conditions in the S vector relevant to enabling the subsystem are true (i.e., the vector resulting from forming the logical "OR" of the ith row of the R array and the current S vector contains all ones).

FIG. 25 is a block diagram of the procedure eligibility determination logic. In reference to FIG. 18 and FIG. 25, line 30 represents a multiple bit data bus which contains the current contents of the TYPE register in the processor/System Controller interface 12. Line 32 is a multiple bit data bus which contains the processor type associated with the subsystem currently indexed, namely, $TYPE_i$. Line 34 represents a multiple bit data bus which contains the R vector associated with the subsystem currently indexed, namely, $R_i$. Line 36 is a multiple bit data bus from the S register of the data constructs section 16 (FIG. 24) which feeds the current contents of the S register to the procedure eligibility determination logic circuit 18. The output of the circuit 18 is a single data bit representative of a single component of the eligibility vector E along output line 38. E is logical "1" when the indexed subsystem is eligible and logical "0" otherwise. The logical expression for E may be written as follows:

$$E = (TYPE \theta TYPE_i) \wedge \left( \bigwedge_{j=1}^{J} (S_j \vee R_{ij}) \right)$$

Where the symbol $\theta$ is used to denote logical equivalence, and $$\bigwedge_{j=1}^{J}$$

denotes the logical "AND" of each element of the vector operated on, resulting in a single signal that will be true (i.e., logical "1") if all elements in the vector are true, e.g., $$\bigwedge_{j=1}^{J} X_j = X_1 \wedge X_2 \wedge X_3 \wedge \ldots X_J$$

$\wedge$ = logical "AND".

The logic circuitry of FIG. 25 implements the above equation. In reference to FIG. 25 the signal along data bus lines 30 and 32 are fed to a multibit comparator 40 which produces a single output bit along line 42. The output bit is a logical 1 only if the data on the TYPE data bus (line 30) is identical to the data on the data bus (line 32) corresponding to TYPE$_i$ (all bits equivalent), and otherwise the output along line 42 is a logical 0. The data bits along bus lines 34 and 36 are input to an OR gate which is represented in FIG. 25 by a single conventional OR symbol. It is understood, however, that each of the corresponding bits along lines 34 and 36 are separately OR'ed similar to the circuit shown in FIG. 26. The line running trasverse of the input and output lines of the logical OR thus indicate the multiple OR circuit of FIG. 26. AND circuits are similarly represented in the drawings, e.g., gate 48. The definition utilized in the circuit design is such that $S_j = 1$ if the $j^{th}$ data condition is true, and $R_{ij} = 0$ if the $j^{th}$ data condition is relevant to procedure i. Consequently the OR, AND sequential logic is appropriate. Thus, in reference to FIG. 25, the multiline output of OR gate 46 is fed to a corresponding multiple input AND gate 48 which provides a single output along line 50 to AND gate 52. A second input of AND gate 50 is derived from the output of comparator 40 along line 42.

System Status Update Logic Circuit

The system status update logic circuit 20 contains the combinational logic required to perform updates to the system status vector, S, appropriate to the transition being initiated. During an entry transition, the logical expression for the $S_{NEW}$ vector generated is:

$$S_{NEW} = S_{OLD} \wedge \bar{A}_i$$

During an exit transition, the logical expression for the $S_{NEW}$ vector generated is:

$$S_{NEW} = (S_{OLD} \wedge T_i) \vee (A_i \wedge T_i) \vee (T_i \wedge \bar{F}_i) \vee (V \wedge \bar{F}_i)$$

This expression is summarized by Table B.2 given in Appendix B. During the load transition, the logical expression for $S_{NEW}$ is:

$$S_{NEW} = V$$

Figure 27:
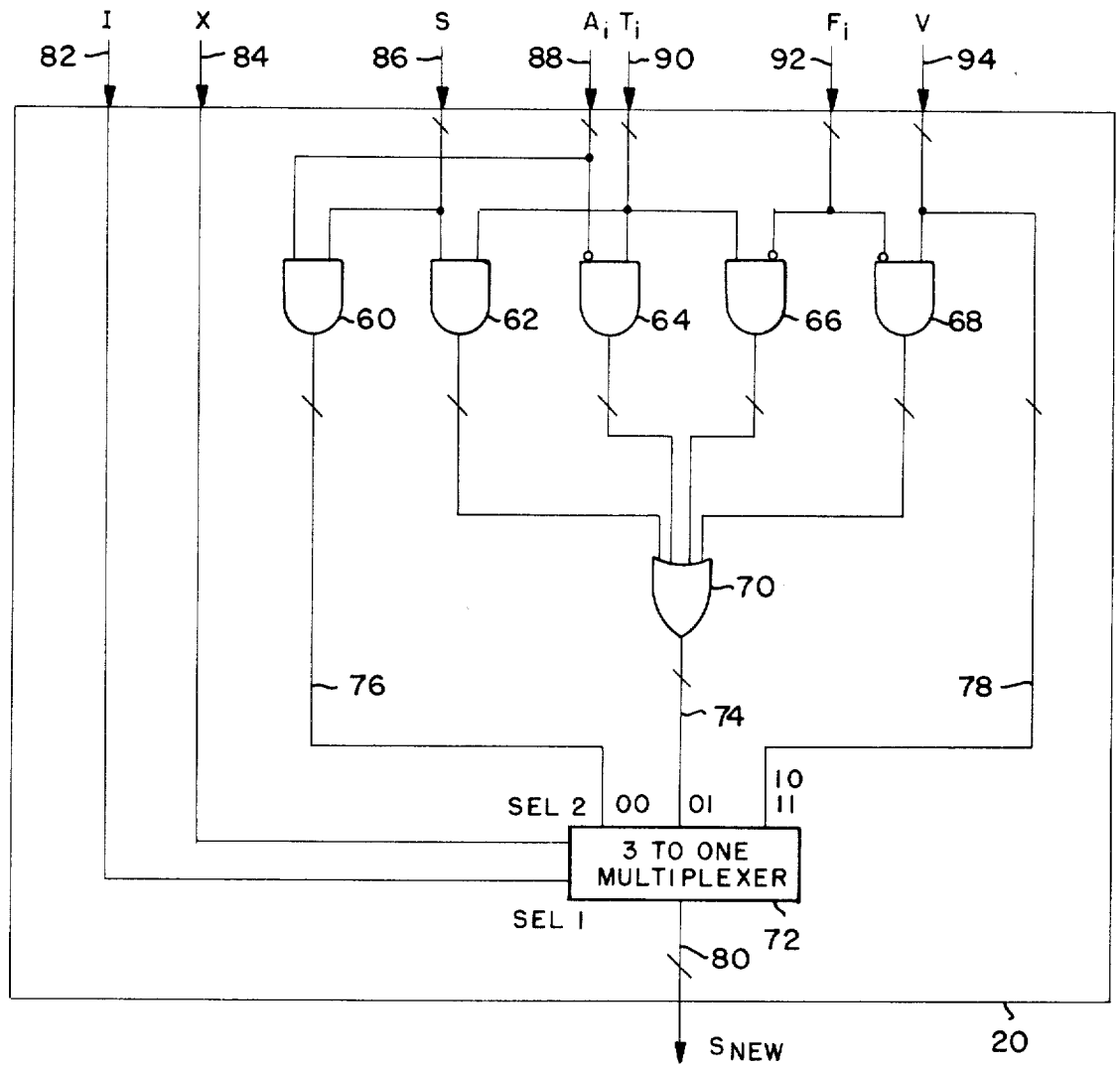
FIG. 27 is a schematic diagram of the system status update logic circuit of the system controller.

FIG. 27 is a block diagram of the system status update logic circuit 20. As shown in FIG. 27, the system status update logic circuit 20 comprises a plurality of OR and AND logic circuits (see FIG. 26 for example) identified by numbers 60, 62, 64, 66, 68 and 70. AND gates 64, 66, and 68 have one group of inverting input terminals and one group of non-inverting input terminals. Element 70 is a multiple input/output OR gate (see FIG. 26) wherein each input/output line is a multiple bit data bus. The output of OR gate 70 is fed to an input terminal of a 3-to-1 multiplexer 72 along lines 74. A second group of inputs to multiplexer 72 is fed in along lines 76 from the output of AND gate 60. A third input is fed to multiplexer 72 along lines 78. The output of multiplexer 72 is a data bus 80 representative of the new status vector $S_{NEW}$ and is fed to the S register of the data constructs section 16 (see FIGS. 18 and 24).

The input lines (generally data buses) to update circuit 20 are fed in along lines 82, 84, 86, 88, 90, 92 and 94. Line 82 carries the single bit I discrete value from the system STATUS register of the interface 12. Line 84 carries the single X bit from the STATUS register. The two signals determine the select code at terminals SEL1, SEL2 of the multiplexer 72. If I is true (SEL1 = 1) a load transition is indicated (regardless of X) and multiplexer 72 passes the current V vector from lines 94 and 78 to the output data bus 80. If I is false (SEL1 = 0) the $S_{NEW}$ output is determined by the value of the X bit of the STATUS register. If X is true, $S_{NEW}$ is shown by the logical expression set forth above. This logical equation is associated with an exit procedure and is achieved using the condition code 01 for SEL1, SEL2 = 01. Associated logic circuits include input lines 86, 88, 90, 92 and 94, AND gates 60, 62, 64, 66, 68, and OR gate 70.

When both X and I are false, SEL1, SEL2 = 0,0, the new status vector is simply given by $S_{OLD} \wedge \bar{A}_i$ and corresponds to any entry transition using AND gate 60 and lines 76.

Synchronization and Control Logic Circuit

Figure 28:
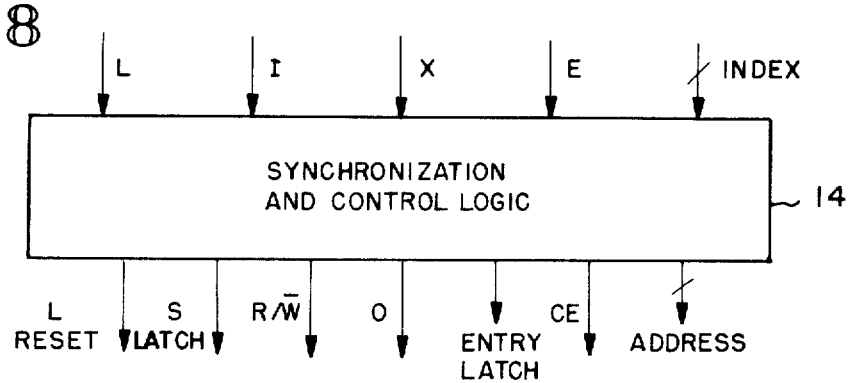
FIG. 28 is a block diagram of the input and output lines associated with the syncrhonization and control logic circuit of the system controller.

The synchronization and control logic circuit 14 contains the clocked sequential logic required to control the operation and internal connections of all the components of the System Controller. The various input and output lines associated with the logic circuit 14 are generally shown in FIGS. 18 and 28 with a detailed schematic diagram illustrated in FIG. 29. The function of the L, I, and X bits of the STATUS register and the INDEX register of the interface 12 have been set forth above (see Table III for example). Similarly, ADDRESS, CE, R/W and $S_{LATCH}$ have already been defined (see, for example, Table IV). These latter signals are all generated by the synchronization and control logic circuit 14 and fed primarily to the data constructs section 16. The ADDRESS bus is also latched into the INDEX register of the interface 12 during entry transitions when an eligible subsystem is detected. Additional signals outputted by the synchronization and control logic circuit 14 are set forth in the following Table V.

TABLE V

| Descriptor | Definition |
| --- | --- |
| ENTRY LATCH | - a one bit control signal output by the synchronization and control logic to the processor interface registers. This signal causes the current values of the EXECUTE, READ, WRITE and the ADDRESS data buses to be latched into the EXECUTE, READ, WRITE and INDEX register in the processor interface 12. This signal is enabled only during entry transitions when an eligible subsystem is detected. |
| L RESET | - a one bit control signal output by the synchronization and control logic to the processor interface registers. When enabled, this signal causes the L discrete of the processor interface STATUS register to be set false (i.e., logical "0"). The synchronization and control logic enables this signal at the completion of each transition. |
| E | - a one bit data signal input to the synchronization and control logic from the procedure eligibility determination logic. This signal represents the eligibility (E = "1") or noneligibility (E = 0) of the subsystem currently indexed. The E signal is used by the synchronization and control logic during entry transitions to detect an eligible subsystem. |
| O | - a one bit data signal output by the synchronization and control logic to the processor interface registers. the 0 signal is set true (i.e., logical "1") if during an entry transition no eligible subsystem is detected, otherwise 0 signal is always false. When the L reset signal is enabled at the completion of each transition, the content of the 0 bit is latched into 0 discrete in |

TABLE V-continued

| Descriptor | Definition |
| --- | --- |
| | the processor STATUS register. |

Figure 29A:
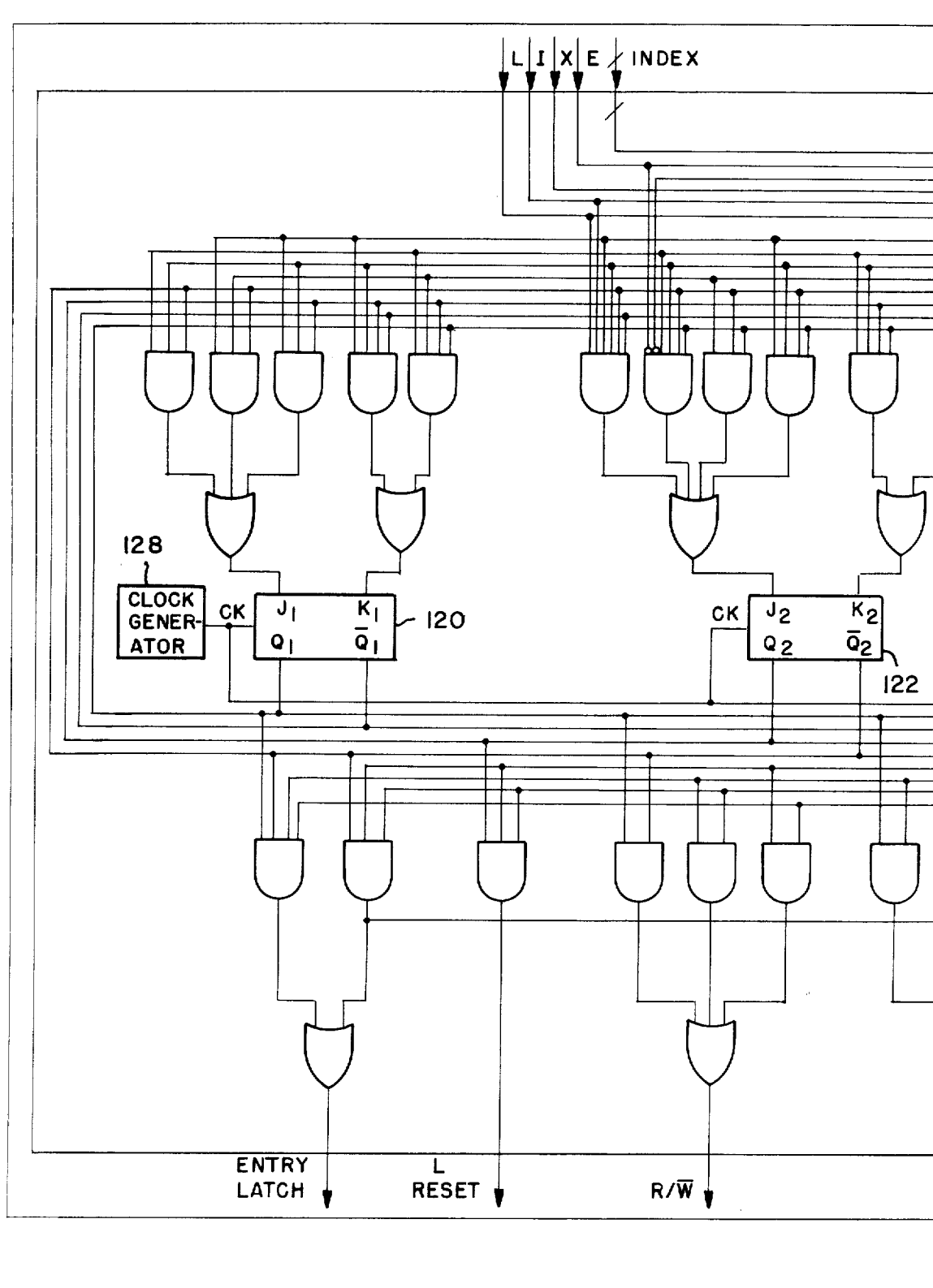
FIGS. 29A and 29B together form a detailed schematic diagram of the synchronization and control logic circuit of FIG. 28.
Figure 29B:
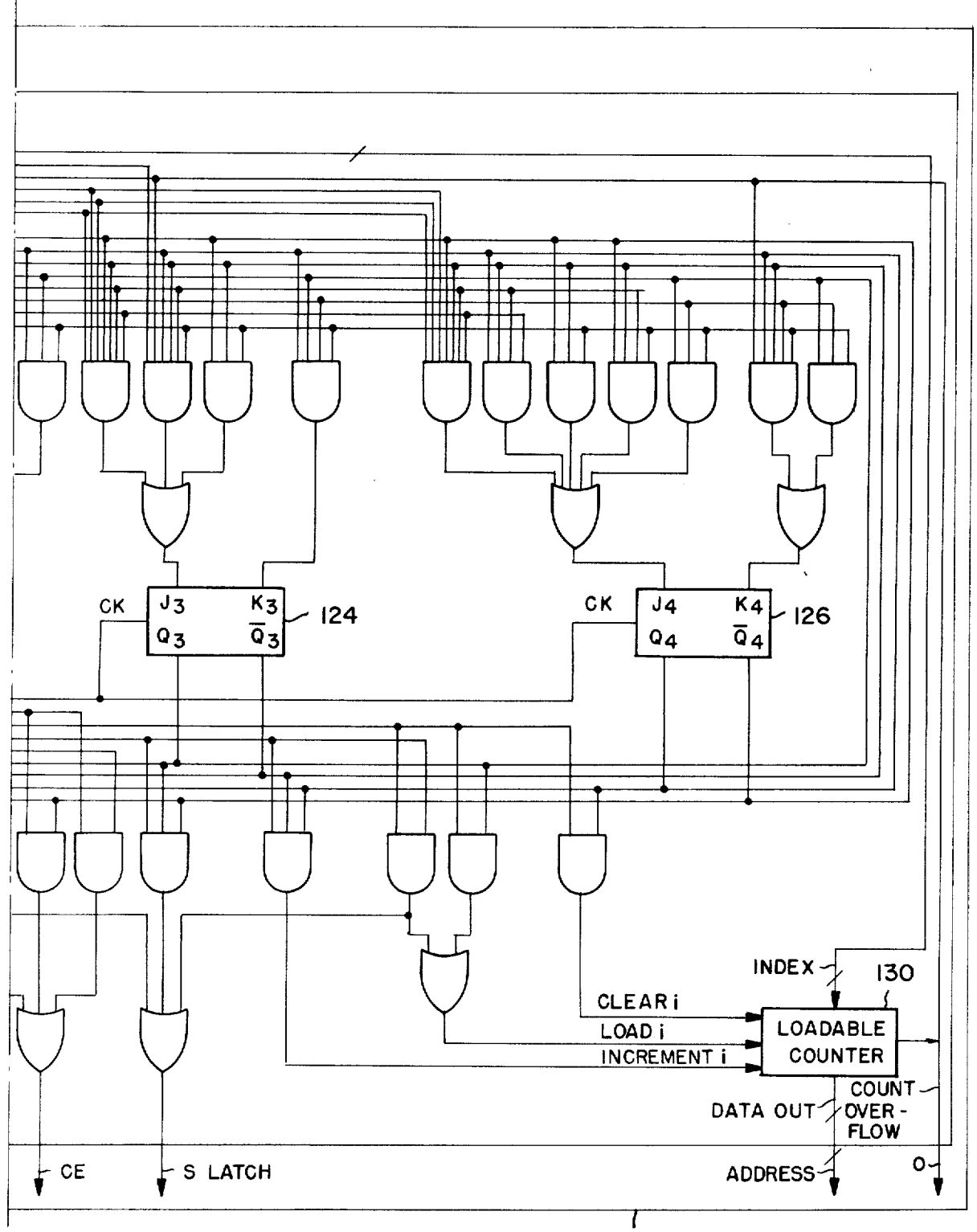

A specific implementation of the synchronization and control logic is shown in FIG. 29. Other logic combinational arrangements are possible with the design criteria simply being to reproduce the various outputs of FIG. 28 with the various possible combinations of the input variables L, I, X, E and INDEX. The state diagram is shown in FIG. 30 which follows from the flowchart of FIG. 23. In FIG. 30, the symbol $\phi$ indicates a "don't care" condition. The design of the logic circuit from the state diagram may be done in accordance with well known techniques as set forth, for example, by M. M Mano, *Computer Logic Design*, Prentice-Hall, Inc. (1972), pp 200-236. The state assignments utilized in the logic design are as follows:

| State | J-K Flip Flop | | | | State | J-K Flip Flop | | | |
| --- | --- | --- | --- | --- | --- | --- | --- | --- | --- |
| | 120 | 122 | 124 | 126 | | 120 | 122 | 124 | 126 |
| A = | 0 | 0 | 0 | 0 | G = | 1 | 1 | 0 | 0 |
| B = | 0 | 0 | 0 | 1 | H = | 1 | 1 | 0 | 1 |
| C = | 0 | 0 | 1 | 0 | I = | 1 | 0 | 1 | 1 |
| D = | 0 | 1 | 0 | 0 | J = | 1 | 0 | 0 | 0 |
| E = | 1 | 0 | 0 | 1 | K = | 1 | 1 | 1 | 0 |
| F = | 1 | 0 | 1 | 0 | L = | 1 | 1 | 1 | 1 |

For implementing the state diagram four JK flip-flops 120, 122, 124 and 126 are used together with a clock generator 128 and loadable counter 130. With regard to the state assignments above, the most significant bit correspond to flip-flop 120, the next most significant bit to flip-flop 122, etc. Counter 130 is loaded by the INDEX register from interface 12. The detail timing diagrams are illustrated in FIGS. 31-34 in reference to the design description set forth below.

System Controller Internal Operation

The System Controller has three internal modes of operation, one for each of the entry, exit and load transitions. During an entry transition (initiated by the L discrete of the interface STATUS register being set true) the synchronization and control logic circuit 14 begins accessing successive rows (i.e., each successive element of the eight memory modules) of the data construct matrix assays, causing them to be output on their respective data buses. As each element is output, the subsystem eligibility determination logic circuit 18 computes the eligibility of the associated subsystem, and the system status update logic circuit 20 generates the $S_{NEW}$ vector based on the current system status vector and the A vector associated with the subsystem indexed. It will be recalled that the A vector is used to preclude inappropriate simultaneous execution of the same subsystem in another processor. If the subsystem is found eligible, the synchronization and control logic circuit 14 causes the S register to latch the $S_{NEW}$ vector, transfers access and control information (i.e., EXECUTE$_i$, READ$_i$, WRITE$_i$, and ADDRESS) from the associated data buses to the processor interface registers, and returns access authorization to the processor by resetting the L busy discrete in the interface STATUS register. If no subsystem is found eligible the synchronization and control logic circuit 14 notifies the processor by setting the 0 discrete in the interface STATUS register and returns access authorization to the processor. In this instance, no system status vector update occurs.

Accessing successive rows of the R matrix and recycling to i=o at each new entry transition (see FIG. 23) enables the computer programmer to establish a priority application program sequence. Thus subsystems of a higher priority are placed earlier in the row sequence. It is noted however that such a sequential accessing is not required, and indeed, even a random accessing technique would be possible. An alternate approach which involves computing the matrix dot product in parallel as opposed to the sequential method described above is also possible.

Figure 31:
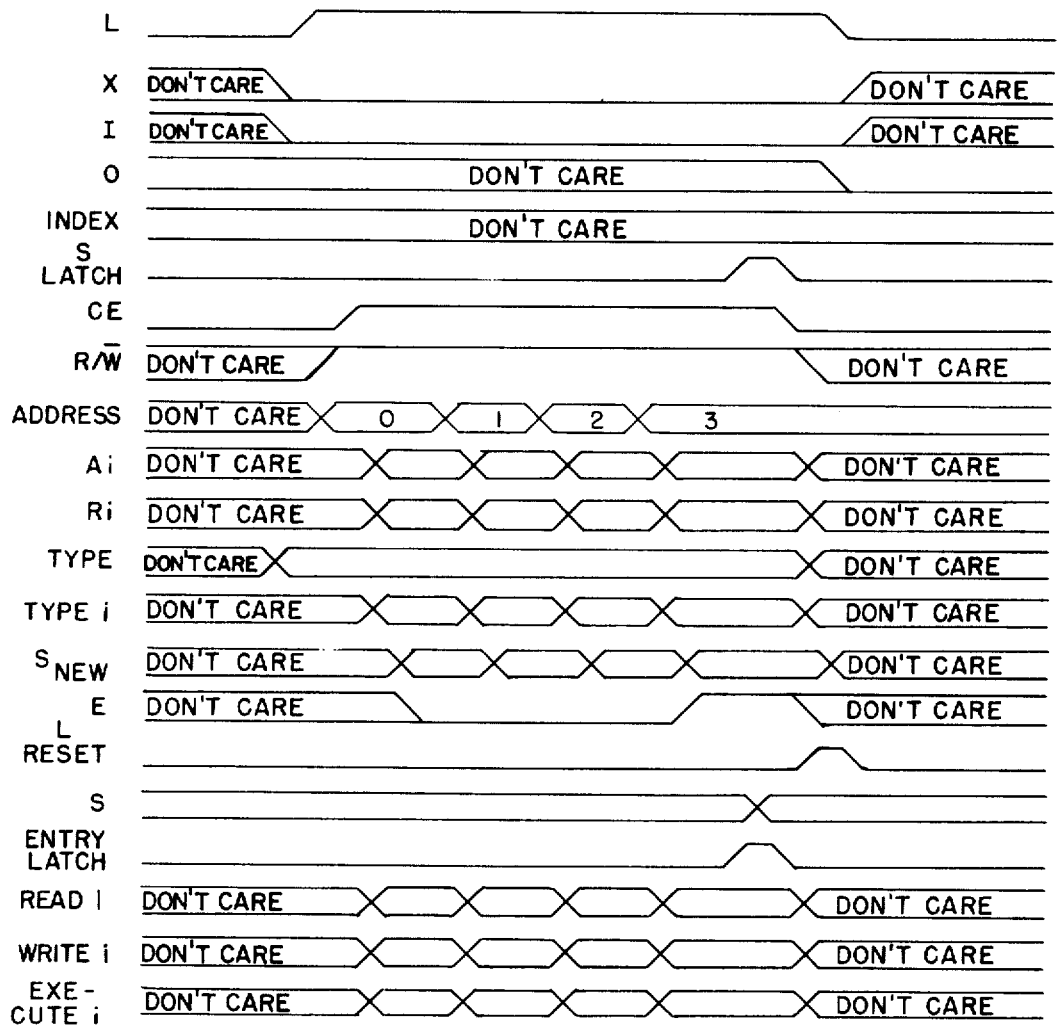
FIGS. 31 and 32 are timing diagrams illustrating entry transitions in accordance with the invention.
Figure 32:
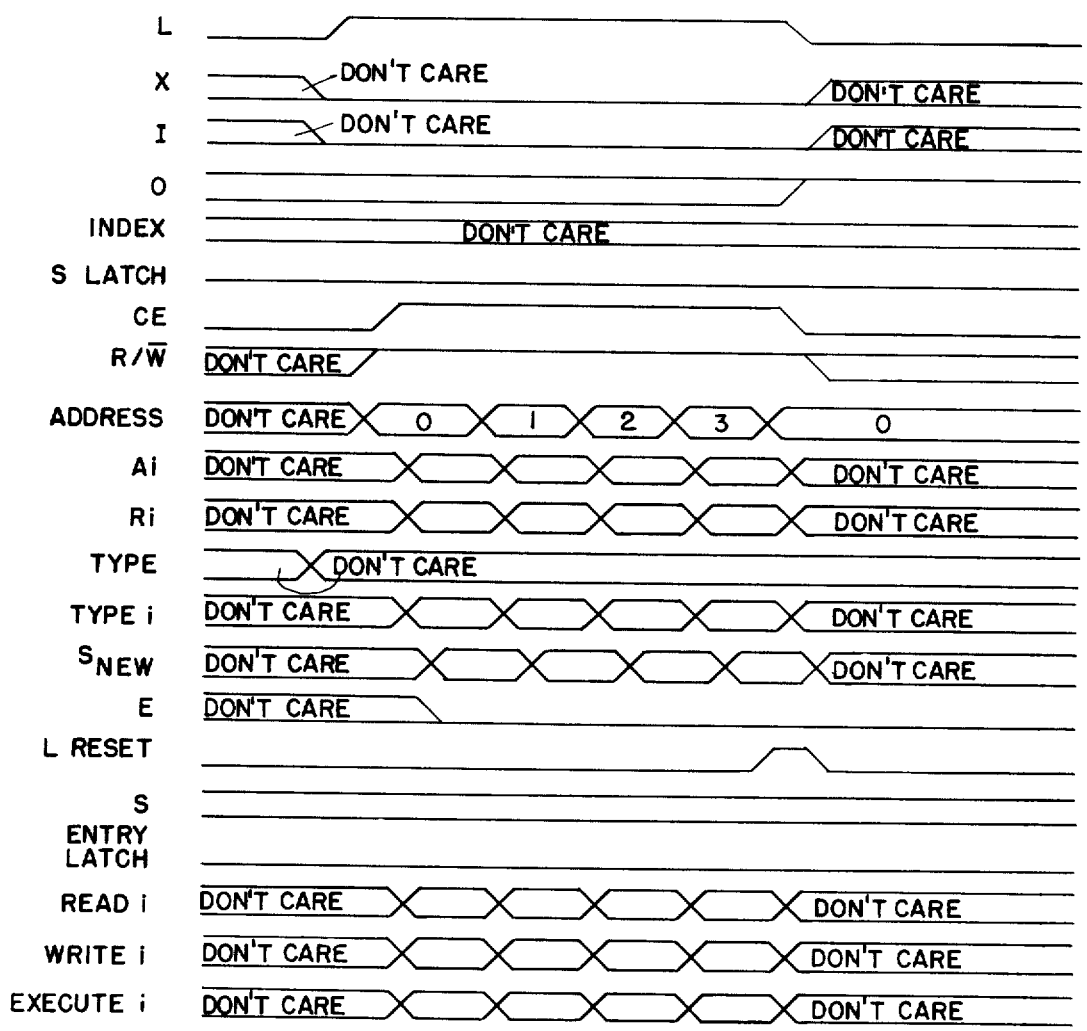

FIG. 31 represents the timing diagram of the control and data signals in the System Controller during an entry transition resulting in an eligible subsystem being detected which is associated with the third row of the data constructs. It is assumed for the purpose of illustration that each memory array of the data constructs contains only four rows. FIG. 32 represents a similar timing diagram for an entry transition where no subsystem is detected as eligible.

Figure 33:
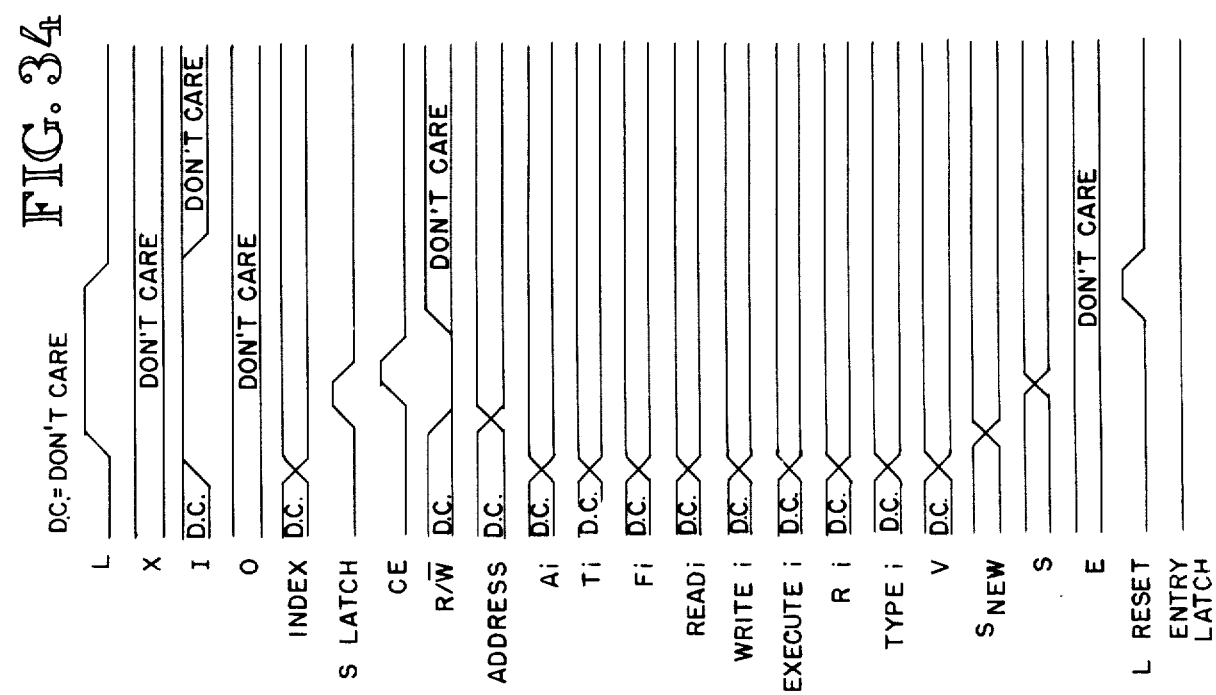
FIG. 33 is a timing diagram illustrating an exit transition in accordance with the invention.
Figure 34:
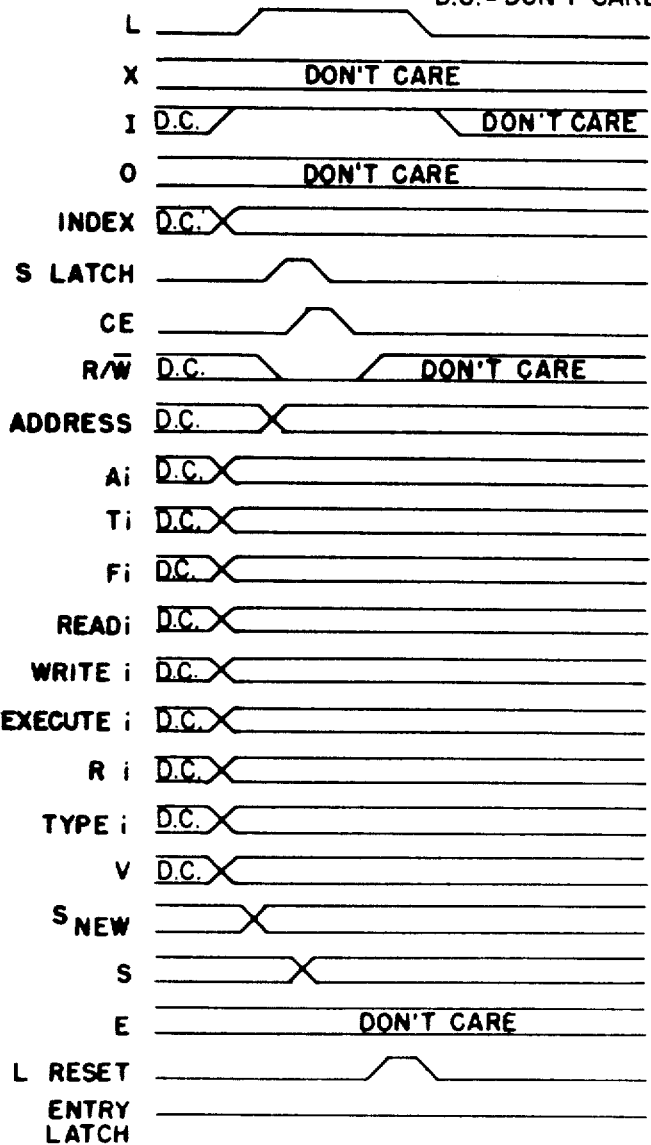

During an exit transition, the synchronization and control logic circuit 14 accesses one row (i.e., one element from each of the eight memory modules) in the data constructs section 16. The value stored in the INDEX register is used as the address to select the appropriate row. As each element is output on it's associated data bus, the system status updated logic circuit 20 generates the $S_{NEW}$ vector from the current S vector, the T, F, and A vectors associated with row indexed, and the V vector returned by the processor in the V register of the interface 12. The synchronization and control logic circuit 14 causes the S register to latch the $S_{NEW}$ vector and returns access authorization to the processor by resetting the L discrete in the STATUS register. FIG. 33 represents the timing diagram of the control and data signals in the System Controller during an exit transition.

Figure 34:
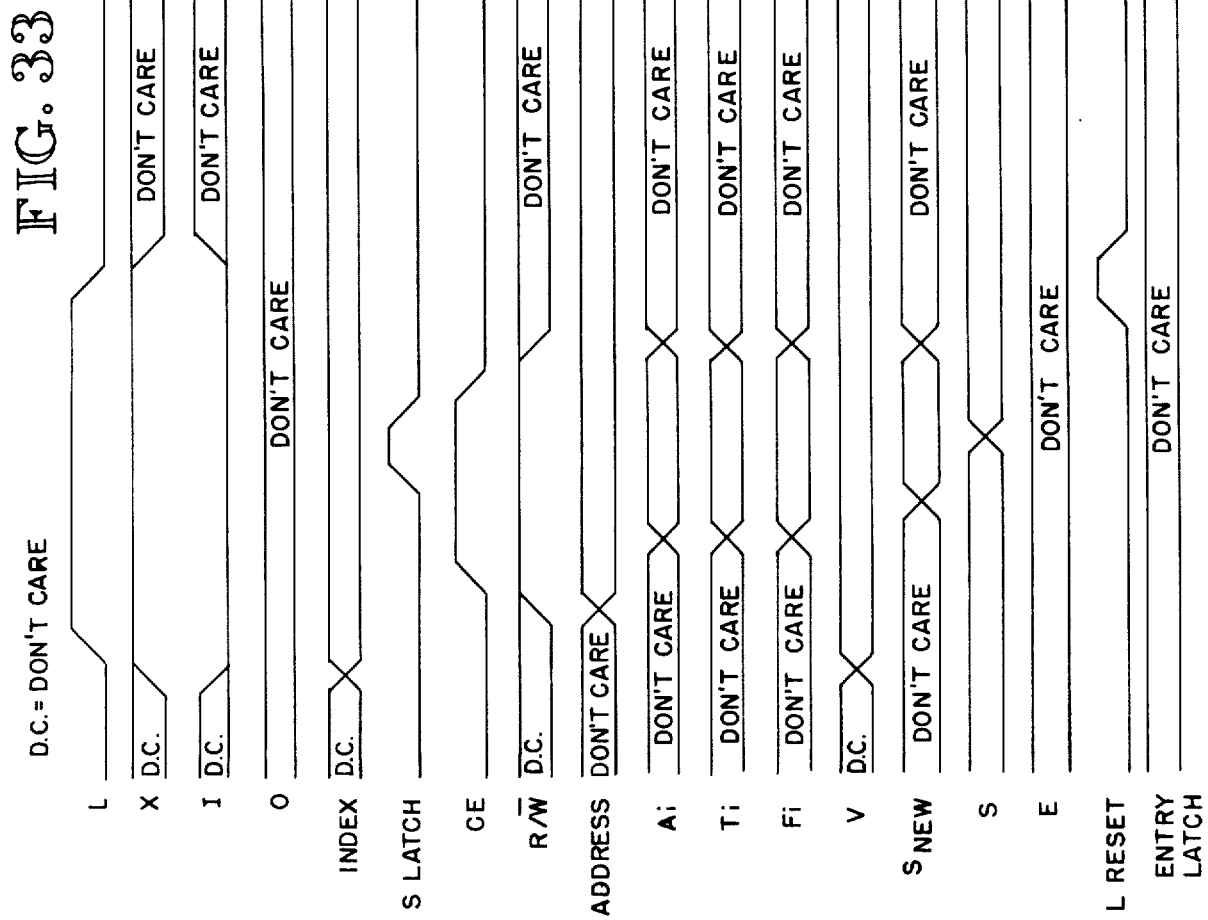
FIG. 34 is a timing diagram illustrating a load transition in accordance with the invention.

During a load transition the synchronization and control logic circuit 14 first causes the content of each of the interface data registers, R, A, T, F, EXECUTE, READ, WRITE, V, and TYPE to be transferred to the associated data buses. Next, a row (i.e., one element from each of the eight memory modules) in the data constructs section 16 is accessed in a write mode. The value stored in the INDEX register of interface 12 is used to select the row accessed. This causes the content of each data bus to be written into the addressed element of the associated memory module. The synchronization and control logic circuit 14 latches the $S_{NEW}$ vector which is input from the interface 12 V register (see multiplexer in FIG. 27) and returns access authorization to the processor by resetting the L discrete in the STATUS register. FIG. 34 represents the timing diagram of the control and data signals in the System Controller during a load transition.

SINGLE PROCESSOR TRANSITION MACHINE ARCHITECTURE

The transition machine architecture described above may also be applicable in a single processor embodiment. In reference to FIG. 35, a single processor, P, has access to all of memory M which contains all of the application programs and data base items defined as part of the computation system. The System Controller 100 is of the same general construction as that shown in FIG. 14, and may generally be thought of as comprising a synchronization and control logic circuit 14', a data constructs section 16', a procedure eligibility determination logic circuit 18', and a system status update logic circuit 20'.

The data constructs section contains all of the fixed preamble information concerning the subsystems and data base as well as dynamic systems status information. As before, row i in the R, T and F matrices and in the EXECUTE, READ and WRITE arrays, are all associated with subsystem i. EXECUTE is an array of starting addresses for the subsystem, and READ and WRITE are arrays of pointers to data pointer packets associated with the data access requirements of subsystem i. Each column in the matrices R, T and F, and the vectors S and V, is associated with a data condition, j. The $j^{th}$ column is associated with the same condition in all cases. The A matrix and TYPE vector of FIG. 14 are not present as these constructs apply only to multiprocessor configurations. The detail implementation of the various components 14', 16', 18' and 20' is thus modified in a straightforward manner from the embodiments shown in FIGS. 24, 25, 27 and 29 to remove the A and TYPE constructs. Further, the processor/system controller interface may be comprised from registers within the uniprocessor P which are dedicated to perform the various functions discussed heretofore, for example, in relation to FIGS. 14–18 and Table III. These registers are accessible by both the processor P and System Controller 100. In net effect, a separate interface hardware apparatus may not be required. FIG. 35 illustrates the case wherein interface 12' is part of the processor P.

Entry Transition

When the processor is in an idle state requesting an activity, it will first wait until the logic segment of the system controller is not busy (L discrete set false). At that time it will check to see if any subsystems are eligible. This is accomplished by examining the 0 bit in the STATUS register. If the 0 bit is true (indicating no subsystems are eligible), the system has completed execution. The processor will therefore cycle awaiting an eligible subsystem which can only be enabled as the result of an external interrupt. If the 0 bit is false, indicating a subsystem is currently eligible, the READ and WRITE registers are obtained to set up to the data access linkages, and the EXECUTE register is obtained to set up control linkages. Control is passed to the specified subsystem using the EXECUTE register value. The subsystem may (in addition to whatever data processing activities are appropriate to it) compute a V register value. The entry transition procedures performed by the processor are the same as those performed in the multiprocessor case as shown in FIG. 21. The handling of these actions outside the processors is modified to the extent that the system controller is interfaced directly with the processor rather than with synchronization support provided by the multiport controller.

Exit Transition

When a subsystem exits, the processor will copy its V register value into the V register of the System Controller, and set the exit discrete, X in the STATUS register true to indicate a procedure is being exited. The processor will then activate the System Controller by setting the L discrete in the STATUS register true, and set itself into an exit request mode.

When the System Controller detects that a transition is to be initiated (by the L discrete in the STATUS register having been set), it will determine whether the entry, exit, or load transition has been specified. If the exit transition is specified, the value in the INDEX register is used to index into the data constructs, providing the data to incorporate the change in the system status vector caused by the exiting subsystem. The V register is accessed to perform this update. Then the System Controller indicates its readiness to honor further requests by resetting the L discrete in the STATUS register. These operations of the processor and System Controller are illustrated in FIGS. 21 and 23 respectively. (The TYPE and A constructs in FIG. 23 are not appropriate to this case).

Interrupts are handled by the interrupted processor by saving the processor state, loading a special dedicated value into INDEX, and loading a special V register value indicating the interrupt status. An exit transition is then initiated by the processor. When the exit transition completes, the salvaged state of the interrupted processor will be restored. This procedure is shown in FIG. 17.

Load Transition

When a load transition is initiated under software control, the processor will first wait until the logic segment of the System Controller is not busy (indicated by the L discrete in STATUS being set false). At that time the processor will store in the INDEX register the number of the row in the System Controller matrices which is to be loaded. The data to be loaded into each of the EXECUTE, READ, WRITE, R, T and F matrices will be placed into the corresponding interface registers and the initial S vector will be placed in the V register. The load procedure is essentially an application program that transfers the System Controller data constructs from processor main memory to the System Controller. The processor set the L discrete in the STATUS register true to indicate a load transition is being initiated and then activates the System Controller logic by setting the L discrete true in the STATUS register. The processor then resets itself into any one of the transition modes, entry, exit or load depending on which transition is required.

The algorithms for the processor logic and System Controller logic for the single processor embodiment are shown in FIGS. 36A and 36B respectively. A design language with self-explanatory syntax is used for ease of explanation.

SELECTED ALTERNATE IMPLEMENTATIONS OF THE SYSTEM CONTROLLER

The specific implementation and operation of the System Controller is dependent upon the specific objectives of the computing system. For example, three specific design objectives are:

(1) To implement a system controller to effect exploitation of inherent software productivity advantages even in a conventional uniprocessor or multiprocessor computing system.

(2) To implement a highly efficient central control mechanism to control a multiprocessor. The design of this device would be dependent on the type of processors being controlled (i.e. mainframes, minicomputers, or microcomputers).

(3) To implement a highly efficient central control mechanism for a conventional single processor which effectively reduces operating system overhead. The design of this device would again be dependent on the type of processor used.

The advantages associated with the first implementation objective have already been discussed. The advantages associated with the second and third implementation objectives are the result of a very efficient hardware implementation of a function for which an analogous function is typically implemented in software.

For some applications, all aspects of the System Controller need not be included. Many advantages of the concept of having a separate central controlling device can be realized with a partial implementation of the device described above. For example, to meet the third objective identified above a system controller device can be defined which includes only a subset of the complete system controller previously described. One version of a limited system controller is described in detail as an example of an alternate design for a controlling device which is based on the same basic concepts but requires only a subset of the system controller components.

System Controller to Support a Conventional Operating System

Conventional operating systems for major computing systems are typically implemented to process what is called a job control language. Thus, in order to run a job, a programmer imbeds job control statements throughout the programs, which effect calls to the operating system to perform resource or task control related functions. The performance of these functions by the operating system contributes greatly to program execution overhead (on the order of thirty percent), and is a very costly commodity particularly using large-scale mainframe systems.

In the alternate implementation described herein, programs which comprises the resource and task management aspects of the operating system are written as transition machine programs. The application programmer generated job control statements remain unchanged as well as the form of the application programs. A specialized System Controller having fewer data constructs is interfaced to or integrated into the architecture of the processor. The primary function to be performed by this special System Controller is to efficiently perform the task dispatch function for the conventional processor. This function is typically performed in software which results in a significant amount of overhead.

FIG. 37 represents the overall design of a specific implementation of the single processor System Controller 210. This version of the System Controller is seen to comprise a synchronization and control logic circuit 214, a data constructs section 216, and a procedure eligibility determination logic circuit 218. The data constructs section 216 herein contains only the R matrix and is thus a simplified version of the data constructs section 16 shown in FIG. 24. Similarly, the synchronization and control logic circuit 214 and the procedure eligibility determination logic circuit 218 are simplified versions of their counterpart circuits shown in FIGS. 25 and 29 respectively inasmuch as only the input and outputs shown in FIG. 37 need be utilized. FIG. 37 also shows the interconnection of each of these major circuit blocks with each other and with a plurality of processor/System Controller registers 212. These registers may be general purpose registers of the processor which is shown as a conventional computer 220. The conventional computer 220 is seen to comprise an operating system 222 which provides control for execution of the various subsystems and for a load logic section 224 and S vector update logic 226. The S vector update logic is thus performed as parts of a software executive routine. It is also to be noted that this embodiment of the invention does not require a complete program separation between data transformation and program control as suggested in the example program set forth above. Even with direct transfer of control (branching, etc) in the application programs, the hardware executive apparatus of the System Controller is effective for reducing the software executive overhead which would otherwise be required.

The structure and use of these processor/system controller registers 212 are similar to the interface registers set forth heretofore and are summarized in the following Table VI.

TABLE VI

| Descriptor | Definition |
|---|---|
| STATUS | - a two bit read/write register whose bits are labeled L and I and which contains the following information: |
| L | - a binary status indicator used to prevent the processors form accessing the processor/system controller registers while a system transition is in progress. When a processor requests a system transition, it loads the appropriate data values in the INDEX, R and S registers and sets the L discrete true. This requests execution of the System Controller which resets the L discrete (sets it false) when the required transition is completed. |
| I | - a binary status indicator used to indicate to the System Controller whether a normal or load transition is being requested. The I flag is set true by the processor when the system transition required is a load transition. The I bit remains true until the processor resets it upon load completion. |
| R | - a register which provides a method for the processor to load the R matrix of the System Controller. During load transitions the R register contains the vector to be loaded in the row of the System Controller's R matrix specified by INDEX. The R register is unused during entry and exit transitions. |
| INDEX | - During a load transition, INDEX is loaded by the processor with the System Controller row number of the row of the R matrix currently being loaded. INDEX is not used during entry transitions. |
| S | - a register which contains the current system status vector. This register is updated by the processor on completion of each subsystem to effect changes to the global status indications that occurred during execution of the subsystem. The content of the S register is used by the System Controller during each subsystem entry transition in combination with the R matrix to generate the new procedure eligibility vector E. |
| E | - a shift register which contains a vector indicating the eligibility |

TABLE VI-continued

| Descriptor | Definition |
|---|---|
| | status of every defined subsystem in the system. The E vector is generated one bit at a time by the procedure eligibility determination logic. As each bit is generated, the synchronization and control logic causes the E register to be shifted one position (by the SHIFT E control signal) which latches in the eligibility indicator of the current subsystem. The E register is not used during load transitions. |

Functional Operation

There are basically two types of allowed processor/System Controller interactions, namely the entry and the load transitions. For each type of interaction, the specific processor actions and the System Controller responses are described below.

Entry Transition

When a processor is in an idle state requesting an activity, it will first wait until the logic segment of the System Controller is not busy which is indicated by the L bit in the STATUS register being set false. At that time, the I bit in the STATUS register will be set false to indicate a procedure entry is being requested and the L discrete in the STATUS register will be set true to signal the System Controller to initiate a transition. The processor will then wait until the System Controller has completed its operation which is indicated by the L discrete in the STATUS register being reset false by the System Controller. (This procedure may be implemented as a macro instruction whose execution time matches the system controller delay.)

When the System Controller detects that a transition is to be initiated (by the L bit in the STATUS register having been set), it will determine whether an entry or load transition has been specified. If the entry transition is specified, the matrix dot product is performed with the S vector and the R matrix to obtain the new eligibility vector which is stored in the E register. Access authorization to the registers 212 is returned to the processor by resetting the L discrete in the STATUS register.

When the processor detects that access authorization has been given (by the L bit of the STATUS register being set false), it first checks to see if any subsystems are eligible. This is accomplished by examining the E vector contained in the E register. If the entire E vector is zero, indicating no subsystems are currently eligible, the system is either blocked until an external interrupt frees up resources or the associated job has completed. In the latter case the processor must initiate a System Controller load transition to bring in the next job to execute. If the E register is non-zero, the bit position index of the first non-zero entry in the E vector is used to obtain the task control information associated with the eligible subsystem. This bit in the E vector is then reset. Control is then passed to the specified subsystem. The subsystem may (in addition to whatever data processing activities are appropriate to it) modify the S register in a sense analogous to the update requirements discussed previously. On completion of the subsystem the processor examines the E register again to determine the next eligible subsystem. This cycle continues until all the eligible subsystems have been executed and the corresponding bits in the E register have been reset. At this time the processor activates the System Controller to perform another entry transition.

Load Transition

When a load transition is initiated under software control, the processor will first wait until the logic segment of the System Controller is not busy (indicated by the L discrete in STATUS being set false). At that time the processor will load in the INDEX register the number of the row in the System Controller R matrix which is to be loaded. The data to be loaded into the indexed row of the R matrix will be placed into the R interface register. The load procedure is essentially an application program that transfers the System Controller data constructs from processor main memory to the System Controller. The processor sets the I discrete in the STATUS register true to indicate a load transition is being initiated and then activates the System Controller logic by setting the L discrete true in the STATUS register. The processor then resets itself into the appropriate transition modes, entry or load.

Figure 39:
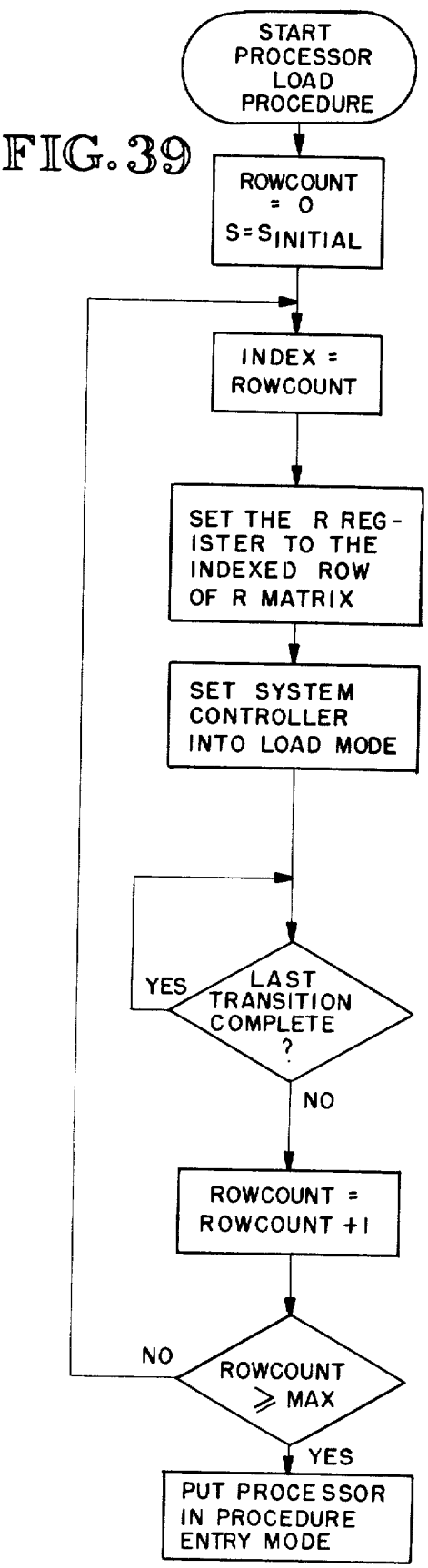
FIG. 39 is a flow diagram of the processor logic required to activate the load transition in the system controller of FIG. 37.
Figure 38:
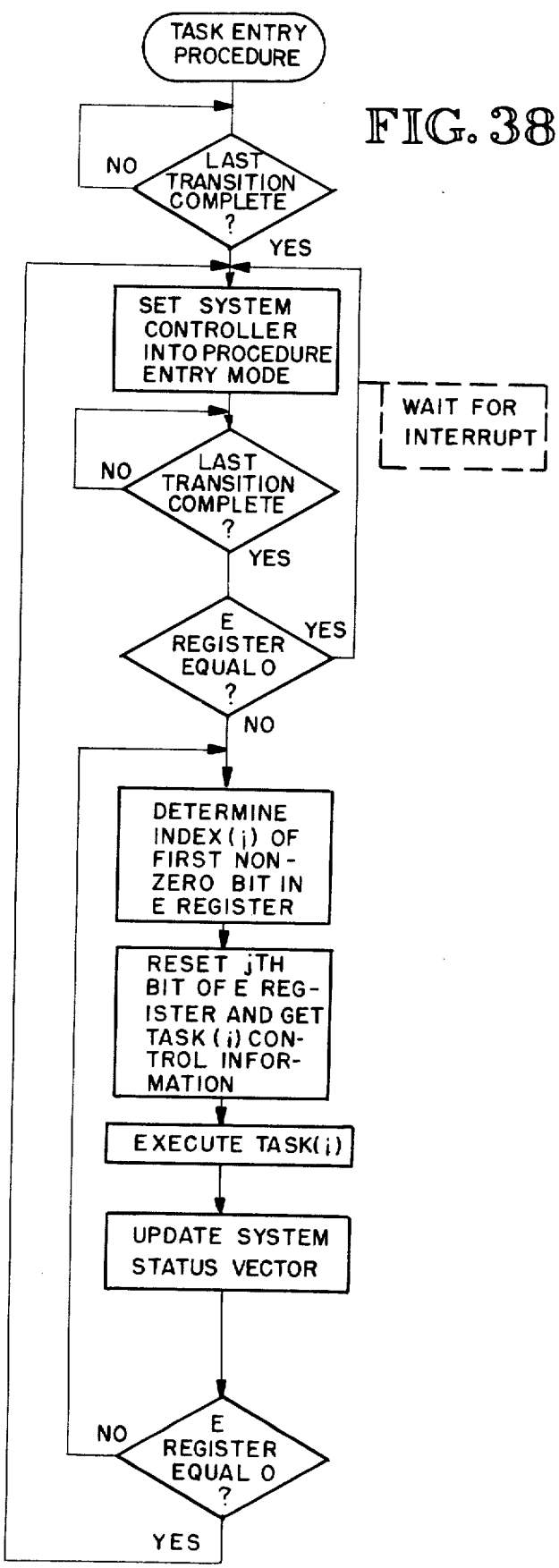
FIG. 38 is a flow diagram of the processor logic required to activate the entry transition in the system controller of FIG. 37.
Figure 40:
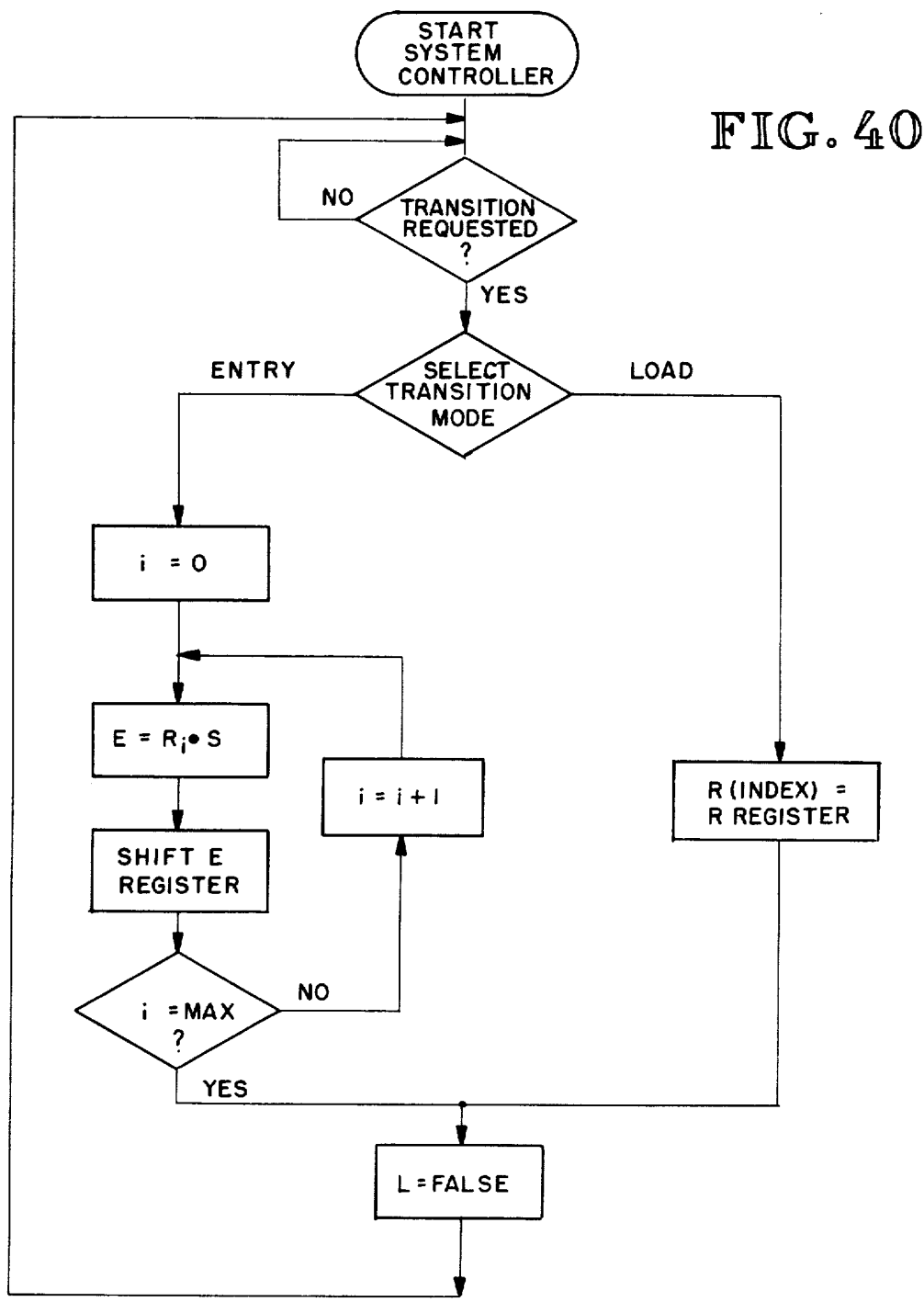
FIG. 40 is a flow diagram of the system controller logic required to effect the load and entry transitions for the operating system in the processor of FIG. 37.

FIG. 38 represents a processor operational flowchart for the entry transitions, and FIG. 39 is the processor operational flowchart for a load transition. FIG. 40 represents the System Controller operational flowchart including the entry and load transitions.

While the invention has been described in terms of preferred embodiments, it is clear that modifications and improvements may be made by those skilled in the art, and it is intended that the invention include all such modifications and improvements which fall within the spirit and scope of the invention.

APPENDIX A

In the implementation of the model of parallel computation, specific definitions are assigned to the set of constructs R, S and E and the matrix algebraic operation, "·" on these constructs with effect a transition system.

Definition A.1. The system status vector, S is a set of binary status indications on the data set d such that for every data condition there is an associated status indications, $S_j$ in S if and only if $S_j$ is relevant to enabling some procedure in the system. $S_j = 1$ if the associated data condition is met, $S_j = 0$ otherwise.

Definition A.2. The system eligibility vector, E is a set of binary status indications on the set of unary predicates, $R_i$, indicating whether $R_i$ is currently satisfied, enabling the associated procedure. $E_i = 1$ indicates the associated unary predicates are satisfied; $E_i = 0$ otherwise.

Definition A.3. A system status condition, $S_j$ is relevant to enabling procedure i if and only if the data condition whose status is indicated by $S_j$ is included in the unary predicates, $R_i$.

Proposition A.1. The unary predicates, $R_i$ can be represented as a set of binary relevance indications associated (and in conjunction) with each of the conditions whose status is maintained in S. This proposition follows directly from the previous definitions.

Definition A.4. The relevance matrix, R is comprised of binary relevance indications, $r_{ij}$ indicating the relevance of system status condition j to enabling procedure i. Relevance is indicated by $r_{ij} = 0$, irrelevance by $r_{ij} = 1$.

Definition A.5. The logical dot product, P of a matrix M times a vector, V with compatible dimensions is defined as the vector, P=M·V, where $$P_i = \bigwedge_{j=1}^{J} m_{ij} v V_j.$$

Proposition A.2. The system eligibility vector, E can be computed appropriate to a given state of the system by taking the logical dot product of the relevance matrix R and the system status vector, S.

Proof: From Definition A.5 it follows that:

$$[R \cdot S]_i = \bigwedge_{j=1}^{J} (r_{ij} v s_j).$$

From Definitions A.4 and A.1 it follows that $r_{ij}$ v $s_j = 1$ if and only if the condition j is either met or irrelevant to enabling procedure i. Then by proposition A.1 is follows that $[R\cdot S]_i = 1$ if and only if all conditions of the unary predicates $R_i$ are satisfied. Thus, $[R\cdot S]_i = E_i$ by Definition A.2, and it is proved that $E = R\cdot S$ as proposed.

APPENDIX B

Specific definitions are assigned to the constructs T, F, V and their functional relationship. The definitions which follow are used to restrict access of application programs.

Definition B.1. The $j^{th}$ element, $t_{ij}$ of the true condition vector, $T_i$ is a binary status indication associated with the procedure i and the system status condition, j such that $t_{ij}=1$ implies condition j is either satisfied or unchanged by the completion of procedure i.

Definition B.2. The $j^{th}$ element, $f_{ij}$ of the false condition vector, $F_i$ is a binary status indication associated with the procedure i and the system status condition, j. The element $f_{ij}=1$ implies the condition j is either not satisfied or unchanged by the completion of procedure i.

Definition B.3. The variable condition update vector, V is a set of binary status indications which can be set dynamically by the procedure running in a sequential processor. The component $V_j$ is set to 1 by the procedure to indicate that system status condition j is satisfied or $V_j$ is set to 0 to indicate condition j is not satisfied.

Proposition B.1. The four possible implications on change in system following completion of procedure i can be computed according to the formula:

$$S = (S \wedge T_i) \vee (\bar{F}_i \wedge V_i) \vee (T_i \wedge \bar{F}_i)$$

where the bar indicates the logical NOT operation.

Proof: The proof follows directly from the definitions of the associated vectors as shown in the Truth Table B.1 given below.

It should be noted that there are many forms which proposition B.1 could take. The expression used has the advantage of restricting the range of $V_i$ such that procedure i can only modify conditions for which it is authorized.

Proposition B.2. The range of V is restricted such that V modifies only a specified subset of the system status conditions, j. This subset is determined by $T_i$ and $F_i$ for procedure i such that $S_j$ is determined by $V_j$ if and only if $t_{ij}=0$.

Proof: The implied new values of $S_j$ for the various values of $t_{ij}$ and $f_{ij}$ from proposition B.1 are shown in Table B.2 taken from Table B.1 from which the proposition follows directly.

TABLE B.1

SYSTEM STATUS CONDITION TRANSITION TRUTH TABLE

| $S_{jOLD}$ | $f_{ij}$ | $t_{ij}$ | $V_j$ | $S_{jNEW}$ | EXPLANATION |
|---|---|---|---|---|---|
| 0 | 0 | 0 | 0 | 0 | S set variably false |
| 0 | 0 | 0 | 1 | 1 | S set variably true |
| 0 | 0 | 1 | 0 | 1 | S set true fixed |
| 0 | 0 | 1 | 1 | 1 | S set true fixed |
| 0 | 1 | 0 | 0 | 0 | S set false fixed |
| 0 | 1 | 0 | 1 | 0 | S set false fixed |
| 0 | 1 | 1 | 0 | 0 | S unchanged |
| 0 | 1 | 1 | 1 | 0 | S unchanged |
| 1 | 0 | 0 | 0 | 0 | S set variably false |
| 1 | 0 | 0 | 1 | 1 | S set variably true |
| 1 | 0 | 1 | 0 | 1 | S set true fixed |
| 1 | 0 | 1 | 1 | 1 | S set true fixed |
| 1 | 1 | 0 | 0 | 0 | S set false fixed |
| 1 | 1 | 0 | 1 | 0 | S set false fixed |
| 1 | 1 | 1 | 0 | 1 | S unchanged |
| 1 | 1 | 1 | 1 | 1 | S unchanged |

TABLE B.2

RESTRICTIONS ON THE RANGE OF V

| $t_{ij}$ | $f_{ij}$ | $S_{jNEW}$ | Implications to System Status |
|---|---|---|---|
| 1 | 1 | $S_{jOLD}$ | unchanged |
| 1 | 0 | 1 | set true |
| 0 | 1 | 0 | set false |
| 0 | 0 | $V_j$ | set variably |

APPENDIX C

In order to accommodate exclusive data access as well as prohibiting simultaneous activation of the same procedure in more than one processor, the single activation vector is extended so as to negate availability of data which is to be updated by a procedure. This will accommodate the equivalent of a single step function very useful in checkout phases in parallel programs. This can be done by defining a matrix whose row vectors are associated with procedures. Each $A_i$ is defined as a logical subset of the row in R associated with i. And so its definition follows from the definition of R (Appendix A) for any particular implementation.

Definition C.1. The vector $A_i$ is a set of binary status conditions $A_{ij}$, where the index j is associated with the conditions whose status is maintained in S. $A_{ij}=1$ if and only if the $j^{th}$ condition is a mutually exclusive data availability condition required at entry to procedure i; $A_{ij}=0$ otherwise. If $\bar{A}_i$ equals the $i^{th}$ row in R identically, then all such procedures with any entry conditions in common must execute sequentially.

Proposition C.1. Modifying the system status vector according to the formal $S = S \wedge \bar{A}_i$ prior to entry is sufficient to effect access protection for procedure i.

The proof of this proposition follows immediately from Definitions C.1, A.1, and A.4.

Proposition C.2. Modifying the system status vector according to the formula $S = S \vee A_i$ restores S to its original value.

Proof: The proof of this proposition follows directly from Definition C.1 and Proposition C.1 if there are no changes to S between entry and exit of the $i^{th}$ procedure. When there are other procedures initiated or terminated in the interval, the proof holds because no procedures can proceed in parallel if they are affected by or affect the same data availability condition covered by $A_i$. And therefore, for every condition for which $A_{ij}\neq 0$ there will have been no intermediate change to S and the proof is completed.

Proposition C.3. The change in system status following completion of procedure i can be computed according to the formula:

$$S = [(S \vee A_i) \wedge T_i)] \vee (\overline{F_i} \wedge V_i) \vee (T_i \wedge \overline{F_i})$$

The proof follows directly from the proofs of propositions B.1 and C.2.

What is claimed is:

1. A hardware executive apparatus for use in a multiprocessing system for concurrent operation of a plurality of data processors for solving an algorithm by a plurality of application programs and a control program, said data processors connected for accessing application program memory storage means for storing said application programs and data memory storage means for storing data associated with said application programs, said data memory storage means including at least a common data memory area accessible by said plurality of data processors, said plurality of data processors including means for generating variable status indications determined variably upon execution of said application programs, said hardware executive apparatus connected to said plurality of data processors and executing said control program and comprising:

(a) a status storage means for storing current status indications $S_j$ corresponding to data conditions defined on elements of a data set appropriate for determining eligibility of the application programs, whereby said stored status indications correspond to data conditions which are relevant for enabling execution of application programs by said plurality of processors which are utilized in solving said algorithm;

(b) relevance storage means for storing groups, i, of relevance indications $R_{ij}$ each group corresponding to the relevance of said status indications to the $i^{th}$ one of said application programs where i is an integer designating one of said groups and corresponding one of said application programs and j is an integer designating one of said status indications;

(c) means connected to said status storage means, and connected to receive said variable status indications from said data processors for updating said current status indications stored in said status storage means at the completion of execution of said application programs, each of said variable status indications having one value corresponding to and indicating satisfaction of a given one of said data conditions, and another value corresponding to and indicating non-satisfaction of said given one of said data conditions, said given data conditions being logical relationships involving at least one element of said data set, the value of said at least one element of said data set being determined by said data processors upon execution of said application programs, said updating means including means for modifying a plurality of said current status indications in response to completion of execution of at least one of said application programs;

(d) means connected to said relevance storage means and said status storage means for determining the eligibility of said application programs for execution by said plurality of processors; and (e) means responsive to said eligibility determining means and operatively connectable to said data processors for enabling execution of eligible application programs by said plurality of data processors whereby at least some of said application programs which are determined eligible may be executed concurrently.

2. A hardware executive apparatus as recited in claim 1, wherein said status storage means comprises a status register having bit storage positions corresponding to said current status indications.

3. A hardware executive apparatus as recited in claim 2, wherein each bit storage position of said status storage register corresponds to one current status indication.

4. A hardware executive apparatus as recited in claim 3, wherein said relevance storage means comprises a relevance matrix storage means wherein said groups form rows (columns) of said matrix storage means and individual relevance indications form columns (rows) of said matrix, each column (row) corresponding to one of said status indications on said data set.

5. A hardware executive apparatus as recited in claim 1 or 4, wherein said means for determining the eligibility of application program i comprises means for multiplying each status indications $S_j$ with each corresponding relevance indication $R_{ij}$ to form a logic state.

6. A hardware executive apparatus as recited in claim 5, wherein said application program eligibility determining means further comprises logic means for requiring the results of each multiplication to be a predetermined logic state whereby application program i is determined eligible if all current status indications $S_j$ corresponding to relevant indications $R_{ij}$ are in said predetermined logic state.

7. A hardware executive apparatus as recited in claim 6, wherein said means for updating said status indications comprises:

(a) means responsive to said data processors for sensing the completion of execution of each application program;

(b) means for storing fixed status indications (T,F) associated with each application program i, said fixed status indications determined by said algorithm independently of values associated with said data set;

(c) means for storing said variable status indications received from said data processors; and (d) said means for modifying including logic circuit means responsive to said stored current status indications, said fixed status indications and said variable status indications for generating update current status indications, said logic circuit means connected to said status storage means for storage of said update current status indications in said status storage means.

8. A hardware executive apparatus as recited in claim 7, wherein said fixed status indications (T,F) are stored in a matrix storage means, each row (column) thereof corresponding to one of said application programs, and each column (row) thereof corresponding to one of said status indications $S_j$, and said means for storing said variable status indications comprises a storage register V having bit positions corresponding to said current status indications of said status storage means.

9. A hardware executive apparatus as recited in claim 8, wherein said means for enabling execution of said eligible application programs comprises a plurality of entry-point address storage means for defining entry-point execution addresses for said application programs and a plurality of data access pointers corresponding to each of said application programs.

10. A hardware executive apparatus as recited in claim 9, wherein said entry-point address storage means comprises storage registers.

11. A hardware executive apparatus as recited in claim 9, wherein said apparatus further comprises an index register for storing application program identification data, said updating means responsive to said application program identification data of said index register for identifying said application program i.

12. A hardware executive apparatus as recited in claim 1, wherein said means for updating said status indications comprises:
  (a) means responsive to said data processors for sensing the completion of execution of each application program;
  (b) means for storing fixed status indications (T,F) associated with completion of each application program i, said fixed status indications determined by said algorithm independently of values associated with said data set;
  (c) means for storing said variable status indications; and
  (d) said means for modifying including logic circuit means responsive to said stored current status indications, said fixed status indications and said variable status indications for generating update current status indications, said logic circuit means connected to said status storage means for storage of said updated current status indications in said status storage means.

13. A hardware executive apparatus as recited in claim 12, wherein said fixed status indications are stored in a matrix storage means, each row (column) thereof corresponding to one of said application programs, and each column (row) thereof corresponding to one of said status indications $S_j$, and said means for storing said variable status indications comprises a storage register V having bit positions corresponding to said status indications of said status storage means.

14. A hardware executive apparatus as recited in claim 13, wherein said means for enabling execution of said eligible application programs comprises a plurality of entry-point address storage means for defining entry-point execution addresses for said application programs and a plurality of data access pointers corresponding to each of said application programs.

15. A hardware executive apparatus as recited in claim 14, wherein said entry-point address storage means comprises storage registers.

16. A hardware executive apparatus as recited in claim 15, wherein said apparatus further comprises an index register for storing application program identification data, said updating means responsive to said application program identification data of said index register for identifying said application program i.

17. A hardware executive apparatus as recited in claim 1, wherein said means for enabling execution of said eligible application programs comprises a plurality of entry-point address storage means for defining entry-point execution addresses for said application programs and a plurality of data access pointers corresponding to each of said application programs.

18. A hardware executive apparatus as recited in claim 17, wherein said entry-point address storage means comprises storage registers.

19. A hardware executive apparatus as recited in claim 18, wherein said apparatus further comprises an index register for storing application program identification data, said updating means responsive to said application program identification data of said index register for identifying said application program i.

20. A hardware executive apparatus as recited in claim 1 wherein said status storage means stores the status of data conditions including the status of at least one of the following conditions:
  (a) data available or non-available,
  (b) data updatable or non-updatable, and
  (c) data satisfies or does not satisfy a logical relationship.

21. A hardware executive apparatus as recited in claim 20 wherein said at least one data condition is the condition that data satisfies or does not satisfy a logical relationship.

22. A multiprocessing computing system for solving a computational problem by execution of a plurality of application programs and a control program, said system comprising:
  (a) a plurality of data processors connected for accessing application program memory storage means storing said plurality of application programs and data memory storage means storing data elements, said data memory storage means having at least a data memory area commonly accessible by said plurality of data processors, at least one of said plurality of data processors including means for generating at least one variable status indication determined upon execution of at least one of said plurality of application programs; and
  (b) a system controller operable for execution of said control program and including:
    (1) a status register for storing status indications of a plurality of data conditions appropriate for said computational problem to be solved by said computing system;
    (2) a relevance matrix store for storing indications of the relevance of each data condition to each of said plurality of application programs;
    (3) means connected to said status register and responsive to said at least one variable status indication for updating said status indications of said status register, said at least one variable status indication indicating satisfaction of a data condition, said data condition being a logical relationship involving at least one of said data elements, said at least one data element having a value determined by said at least one data processor upon execution of said at least one application program, said updating means including means for modifying a plurality of said status indications in response to completion of execution of one of said application programs;
    (4) means for storing a plurality of application program designation addresses corresponding to said plurality of application programs; and
    (5) means responsive to said status indications of said status register, said corresponding relevance indications of said relevance matrix store and said application program designation addresses of said application program designation address storing means for determining the eligibility of said plurality of application programs for execution by said plurality of data processors and for generating designation address from said application program designation address storing means for application programs determined to be eligible, wherein eligible application programs are executed concurrently in said plurality of data processors; whereby said system controller forms a hardware executive apparatus for said computing system.

23. A computing system as recited in claim 22, further comprising interface means connected between said plurality of data processors and said system controller.

24. A computing system as recited in claim 23, wherein said interface means comprises an execute register connected to said application program designation address storing means for storing said application program designation addresses generated by said system controller.

25. A computing system as recited in claim 24, wherein said interface means further comprises a busy/-not busy binary indicator register for indicating whether the system controller is busy/not busy upon request for access to said system controller by said data processors.

26. A computing system as recited in claim 22, wherein said application programs are event-driven programs without direct transfer of control therein or to other application programs and said status and relevance conditions solely establish the prerequisites for enabling execution of said application program.

27. A computing system as recited in claim 25, wherein said interface means comprises a binary mode indication register (X) loaded by said data processors for identifying entry and exit modes of operation and an index register for storing application program identifying data:

said system controller operable in said entry mode of operation in response to loading of said mode indication register by the kth one of said plurality of data processors for determining eligibility of the $i^{th}$ one of said plurality of application programs for execution by said $k^{th}$ data processor and for generating an application program designation address corresponding to said $i^{th}$ application program for storage in said execute register of said interface means for loading by said $k^{th}$ data processor whereby said $k^{th}$ data processor executes said $i^{th}$ application program; and said system controller operable in said exit mode in response to loading of said mode indication register by said $k^{th}$ data processor for receiving said application program identifying data of said $i^{th}$ application program loaded by said $k^{th}$ data processor into said index register of said interface means for enabling said updating means of said system controller to update said status register, wherein k is an integer designating one of said data processors and i is an integer designating one of said application programs.

28. A computing system as recited in claim 27, wherein said system controller further comprises:

means for storing fixed status indications (T,F), said fixed status indications determined by said computational problem to be solved independent of data values of said data elements computed in said $k^{th}$ data processor; and said interface means further comprising means for storing said variable status indications (V) associated with completion of said $i^{th}$ application program, said updating means receiving said fixed status indications and said variable status indications for determining updated binary status indications of said data conditions and for storing same in said status register.

29. A computing system as recited in claim 22, further comprising an interface means connected between said system controller and said plurality of data processors wherein said interface means comprises a binary mode indication register (X) loaded by said data processors for identifying entry and exit modes of operation;

said system controller operable in said entry mode of operation in response to loading of said mode indication register by the kth one of said plurality of data processors for determining eligibility of the $i^{th}$ one of said plurality of application programs for execution by said $k^{th}$ data processor and for generating an application program designation address corresponding to said $i^{th}$ application program for storage in said interface means for loading by said $k^{th}$ data processor whereby said $k^{th}$ data processor executes said $i^{th}$ application program; and said system controller operable in said exit mode in response to loading of said mode indication register by said $k^{th}$ data processor for receiving application program identifying data of said $i^{th}$ application program for enabling said updating means of said system controller to update said status register, wherein k is an integer designating one of said data processors and i is an integer designating one of said application programs.

30. A computing system as recited in claim 29, wherein said system controller further comprises:

means for storing fixed status indications (T,F), said fixed status indications determined by said computational problem to be solved independent of data values of said data elements computed in said $k^{th}$ data processor; and said interface means further comprising means for storing said variable status indications (V) associated with completion of said $i^{th}$ application program, said updating means receiving said fixed status indications and said variable status indications for determining updated binary status indications of said data conditions and for storing same in said status register.

31. A computing system as recited in claim 22, wherein said system controller further comprises a busy/not busy binary indicator register for indicating whether the system controller is busy/not busy upon request for access to said system controller by said data processors.

32. A computing machine operable for transitioning between different states for solving an algorithm and comprising:

(a) data processing means including means for computing data in accordance with application programs and means for generating at least one variable status signal corresponding to other than a program termination event and representing satisfaction of at least one logic condition dependent upon at least one non-predetermined value of data processed by said data processing means;

(b) memory storage means accessible by said data processing means for storing said application programs and for storing data for use with and resulting from execution of said application programs;

(c) hardware executive means operable for scheduling said application programs and comprising:

(i) status storing means for storing indications of the status of a plurality of data conditions including said at least one logic condition which collectively enable execution of said application programs;
(ii) means for storing indications of the relevance of each of said status indications corresponding to each of said application programs;
(iii) means connected to said status storing means and responsive at least to said variable status signal for updating said status indications upon execution of said application programs, said updating means including means for modifying a plurality of said status indications in response to completion of execution of at least one of said application programs; and
(iv) means for enabling execution of said application programs in response to said updated status indications and said corresponding relevance indications.

33. A computing machine as recited in claim 32 wherein said application programs are event-driven programs without direct transfer of control therein or to other application programs and said status and relevance indications solely establish the prerequisites for enabling execution of said application programs.

34. A computing machine as recited in claim 32, wherein said data processing means comprises a uniprocessor.

35. A computing machine as recited in claim 32, wherein said data processing means comprises a multiprocessor.

36. A computing machine as recited in claim 32, wherein said enabling means enables execution of said application programs which have "true" status indications of the data conditions for all relevant relevance indications corresponding to said application programs.

37. A computing machine as recited in claim 32 wherein said status storing means stores the status of data conditions pertaining to data in the data set including the status of at least one of the following conditions:
  (a) data available or non-available,
  (b) data updatable or non-updatable, and
  (c) data satisfies or does not satisfy a logical relationship.

38. A computing machine as recited in claim 37 wherein said at least one data condition is the logical relationship constants.

39. A method of operating a data processing system for executing an algorithm comprising the steps of:
  (a) performing data transformation in data processing means in accordance with data transformation programs;
  (b) storing said data transformation programs and data input to and output from said data processing means;
  (c) scheduling the execution of said data transformation programs in a hardware apparatus by:
    (i) storing indications of the status of a plurality of data conditions which collectively enable the execution of said data transformation programs utilized in solving said algorithm;
    (ii) storing indications of the relevance of each of said status indications corresponding to each of said data transformation programs;
    (iii) generating at least one variable status signal corresponding to other than a program termination event in response to satisfaction of at least one logic condition dependent upon at least one non-predetermined value of data processed by said data processing means;
    (iv) updating said status indications in response to said variable status signal by modifying a plurality of said status indications in response to completion of execution of one of said data transformation programs; and
    (v) enabling execution of said data transformation programs in response to said status indications including said updated status indications and said corresponding relevance indications.

40. A method of computing as recited in claim 39, wherein said step of enabling execution of said data transformation programs comprises multiplying said status indications and said relevance indications such that data transformation programs are enabled if all relevant relevance indications have associated "true" status indications.

41. A general purpose multi-processing computing machine operable for transitioning between states for solving an algorithm and comprising:
  (a) a plurality of data processors each including means for computing data values in accordance with application programs containing operation code designations defining data transformations and including means for generating variable status indications determined variably upon execution of said application programs, each of said variable status indications having one value corresponding to and indicating satisfaction of a data condition, and another value corresponding to and indicating non-satisfaction of said data condition, said data condition being a logical relationship involving at least one element of a data set, the value of said at least one element of said data set being determined by said data processors upon execution of said application programs;
  (b) data memory storage means having at least a portion thereof shared by said plurality of data processors;
  (c) application program memory storage means for storing said application programs said application programs accessible by said data processor for execution thereof; and
  (d) a hardware system controller for scheduling said application programs, said system controller connected to said plurality of data processors and including a relevance matrix storage means for storing relevance indications of each of said data conditions with respect to said application programs and means for determining the eligibility of at least one of said application programs in dependence upon said relevance matrix storage means and said variable status indication corresponding to at least one data condition other than a program termination event, said controller including means for storing status indications of said plurality of data conditions including said at least one data condition, and said controller further including means for modifying a plurality of said status indications upon execution of at least one application program and for enabling operation of different ones of said data processors for concurrent execution of said eligible application programs, whereby the execution and sequence of execution of said application programs is dependent upon said at least one data condition, and thus, on at least one of said data values.

42. A general purpose computing machine as recited in claim 41 wherein said system controller is operable for determining eligibility based on a plurality of unary predicates associated with the applicability of the transitions between states of said machine for solving said algorithm.

43. A general purpose computing machine as recited in claim 42 wherein said application programs are event-driven data transformation programs without direct transfer of control therein or to other application programs.

44. A method of utilizing a hardware executive apparatus and requirements-oriented programming for solving a computational problem comprising the steps of:
 (a) structuring the programming of said computational problem to be carried out by said computing system into a plurality of data transformation programs and a control program, said data transformation programs performing event-driven data computational steps and said control program scheduling execution of said data computational steps;
 (b) selecting a plurality of data conditions for enabling execution of all of said data transformation programs, forming status indications;
 (c) designating all of said data conditions which are relevant for enabling the execution of each of said data transformation programs, said designated data conditions forming a group of relevance indications corresponding to each data transformation program;
 (d) storing said data transformation programs in memory storage devices;
 (e) storing said control program in said hardware executive apparatus and scheduling said data transformation programs by:
  (i) maintaining a memory store of said status indications;
  (ii) maintaining a memory store of each group of relevance indications;
  (iii) determining eligibility of data transformation programs in response to said status and relevance memory stores wherein a given data transformation program is determined eligible for execution if all status indications which are relevant in the group of relevance indications corresponding to said given data transformation program are in a predetermined logic state;
  (iv) enabling said eligible data transformation programs for execution in data processing means;
  (v) executing in said data processing means said eligible data transformation programs;
  (vi) updating said memory storage of said status indications upon completion of execution of each data transformation program by modifying at least two of said status indications including modifying at least one of said two status indications variably in dependence upon the value of data transformed by said data transformation programs, whereby the execution and sequence of execution of said data transformation programs is data dependent; and
  (vii) repeating at least steps (iii) through (vi) until data transformation programs are no longer determined eligible whereby said computational problem is completed.

45. A general purpose hardware executive for use in a multiprocessing computing system having a plurality of data processors operable for executing a plurality of application programs in a parallel mode of operation, said hardware executive connected to said plurality of data processors and comprising:
 (a) a data construct section having means for storing:
  (i) status indications corresponding to data conditions which are prerequisite to enabling execution of said application programs;
  (ii) relevance indications corresponding to indications of the relevance of each of said data conditions to each of said application programs; and
  (iii) application program designation addresses transferrable to said data processors and corresponding to each of said plurality application programs;
 (b) a status update logic circuit means connected to said data construct section for receiving said status indications and connected to said data processors for receiving variable status indications which are variable and dependent upon data transformations executed by said application programs, said status update logic circuit means connected to said status storing means for providing updated status indications to said status storing means of said data construct section;
 (c) an eligibility determination circuit means connected to said data constructs section and responsive to said status indications and said relevance indications for determining the eligibility of said application programs for execution in said data processors; and
 (d) a synchronization and control logic circuit connected to said data construct section for selecting groups of said relevance indications corresponding to said application programs for feeding to said eligibility determination circuit means and for selecting application program designation addresses for eligible application programs for transfer of same to said data processors for execution of said application programs.

46. A computing system comprising:
 (a) a plurality of data processors connected for accessing application program memory storage means and data memory storage means, said data memory storage means having at least a data memory area commonly accessible by said plurality of data processors;
 (b) a system controller including:
  (1) a status register for storing binary status indications $S_j$ of a plurality of data conditions j appropriate for determining eligibility of a computational problem to be solved by said computing system, said computing system solving said computational problem by execution of a plurality of application programs stored in said application program memory storage means;
  (2) a relevance matrix store for storing binary indications $R_{ij}$ of the relevance of each data condition j to each application program i;
  (3) means responsive to said binary status indications $S_j$ and said data processors for updating at least two of said binary status indications of said status register in response to non-predetermined, data dependent changes of the binary status of at least one of said data conditions upon execution of said application programs;
  (4) means for storing a plurality of application program designation addresses corresponding to said plurality of application programs;

(5) means responsive to said binary status indications of said status register, said corresponding binary relevance indications of said relevance matrix store and said application program designation addresses of said application program designation address storing means for determining the eligibility of said plurality of application programs for execution by said plurality of data processors and for generating designation addresses from said application program designation address storage means for application programs determined to be eligible, wherein eligible programs are executed concurrently in said plurality of data processors; and (6) synchronization and control logic means connected to said eligibility determining means, said relevance matrix store and said application program designation address storing means for synchronizing and controlling operation of said system controller;

whereby said system controller forms a hardware executive apparatus for said computing system; and (c) interface means connected between said plurality of data processors and said system controller for interfacing operation of said data processors and system controller.

47. A computing system as recited in claim 46 wherein:

(a) said interface means comprises a type register for storing indications of the processor type requesting access to said system controller;

(b) said system controller further comprises a plurality of processor type storage means corresponding to said plurality of application programs, said processor type storage means storing indications of the type of data processor appropriate for executing said corresponding application programs; and (c) said means for determining eligibility of said application programs comprising means for comparing indications of the data processor type stored in said interface type register with said indications of said data processor type stored in said processor type storage means;

whereby said plurality of application programs may be executed by specific types of said plurality of data processors.

48. A computing system as recited in claim 47 wherein said means for determining the eligibility of application program i comprises:

(a) means for forming the product of each binary status indication $S_j$ with each corresponding binary relevance indication $R_{ij}$; and (b) logic means for requiring each of said products to be in a predetermined binary state such that application program i is eligible if all status indications $S_j$ corresponding to said relevant indications $R_{ij}$ are in said predetermined state, and said processor requesting access to said system controller is of the type appropriate for executing said application program.

49. A computing system as recited in claim 46 wherein said relevance matrix store comprises sequentially stored groups i of binary relevance indications $R_{ij}$ and said synchronization and control logic means sequentially selects groups of indications of said relevance matrix store for feeding same to said eligiblity determining means.

50. A computing system as recited in claim 49 wherein said synchronization and control logic means is operable for restarting said sequential selection of said stored groups i of binary relevance indications after an application program is determined eligible by said eligibility determining means, whereby the order of said storage of said binary indications in said relevance matrix store provides a priority selection mechanism for said application programs.

51. A computing system as recited in claim 46 further comprising means for preventing execution of the same application program in more than one of said plurality of data processors at the same time.

52. A computing system as recited in claim 51 wherein said execution preventing means comprises means for providing a predetermined status indication $S_j$ in said status register corresponding to those status indications utilized in determining eligibility of an application program currently being executed, whereby other application programs utilizing said predetermined status indications are not determined eligible by said eligibility determining means.

* * * * *